United States Patent
Wolf et al.

(10) Patent No.: US 10,195,778 B2
(45) Date of Patent: Feb. 5, 2019

(54) THREE-DIMENSIONAL PRINTER SYSTEMS AND METHODS

(71) Applicant: WOLF & ASSOCIATES, INC., Costa Mesa, CA (US)

(72) Inventors: Erick Packard Wolf, Corona del Mar, CA (US); Felisa Gamboa, Costa Mesa, CA (US); Phillip Joseph Trenerry, Fountain Valley, CA (US); Miles Tyler Craig, Costa Mesa, CA (US)

(73) Assignee: WOLF & ASSOCIATES, INC., Costa Mesa, CA (US)

( * ) Notice: Subject to any disclaimer, the term of this patent is extended or adjusted under 35 U.S.C. 154(b) by 94 days.

(21) Appl. No.: 15/029,197

(22) PCT Filed: Oct. 15, 2014

(86) PCT No.: PCT/US2014/060762
§ 371 (c)(1),
(2) Date: Apr. 13, 2016

(87) PCT Pub. No.: WO2015/057886
PCT Pub. Date: Apr. 23, 2015

(65) Prior Publication Data
US 2016/0236408 A1    Aug. 18, 2016

Related U.S. Application Data

(60) Provisional application No. 61/890,932, filed on Oct. 15, 2013, provisional application No. 62/028,276, filed on Jul. 23, 2014.

(51) Int. Cl.
*B29C 64/20* (2017.01)
*B29C 47/08* (2006.01)
(Continued)

(52) U.S. Cl.
CPC .......... *B29C 47/802* (2013.01); *B29C 64/106* (2017.08); *B29C 64/20* (2017.08);
(Continued)

(58) Field of Classification Search
CPC ....... B33Y 30/00; B29C 64/20; B29C 64/205; B29C 64/106; B29C 64/118; B29C 64/209; B29C 67/0055; B29C 67/0085
See application file for complete search history.

(56) References Cited

U.S. PATENT DOCUMENTS

| 5,340,433 A | 8/1994 | Crump |
| 5,503,785 A | 4/1996 | Crump et al. |

(Continued)

FOREIGN PATENT DOCUMENTS

| KR | 10-2010-0004475 | 1/2010 |
| WO | WO 2015/057886 | 4/2015 |

OTHER PUBLICATIONS

MIT Fundamentals of Design:Topic 9, Structural Connections & Interfaces (http://web.mitedu/2.75/fundamentals/FUNdaMENTALs%20Book%20pdf/FUNdaMENTALs%20Topic%209.PDF ; copyright 2008).*

(Continued)

*Primary Examiner* — Jason L Lazorcik
(74) *Attorney, Agent, or Firm* — Knobbe Martens Olson & Bear LLP

(57) ABSTRACT

Disclosed are embodiments of a three-dimensional (3D) printer for building 3D objects with layer based, additive manufacturing techniques. The 3D printer can have an extrusion assembly including a hot end for heating consumable material and depositing the consumable material in layers on a printing bed. The hot end can be moved in a (Continued)

horizontal plane parallel the printing bed while the printing bed can be moved perpendicular to the horizontal plane to print the 3D object.

18 Claims, 28 Drawing Sheets

(51) Int. Cl.
    *B29C 47/80*     (2006.01)
    *B33Y 30/00*     (2015.01)
    *B29C 64/106*     (2017.01)
    B29K 105/00     (2006.01)

(52) U.S. Cl.
    CPC ...... *B33Y 30/00* (2014.12); *B29K 2105/0058* (2013.01); *B29K 2827/18* (2013.01); *B29K 2855/02* (2013.01); *B29K 2875/00* (2013.01); *B29K 2877/00* (2013.01); *B29K 2995/0017* (2013.01)

(56) References Cited

U.S. PATENT DOCUMENTS

| | | | |
|---|---|---|---|
| 6,004,124 A | 12/1999 | Swanson et al. | |
| D446,826 S | 8/2001 | Dunn et al. | |
| D514,556 S | 2/2006 | Rising | |
| 7,168,935 B1 | 1/2007 | Taminger et al. | |
| 7,297,304 B2 | 11/2007 | Swanson et al. | |
| D565,648 S | 4/2008 | Egami | |
| 7,384,255 B2 | 6/2008 | LaBossiere et al. | |
| 7,604,470 B2 * | 10/2009 | LaBossiere | B29C 64/106 425/131.1 |
| 7,625,200 B2 | 12/2009 | Leavitt | |
| 7,706,910 B2 | 4/2010 | Hull et al. | |
| D616,045 S | 5/2010 | Tervo | |
| 7,731,887 B2 | 6/2010 | Hull et al. | |
| 7,771,183 B2 | 8/2010 | Hull et al. | |
| 7,896,209 B2 | 3/2011 | Batchelder et al. | |
| 7,931,460 B2 | 4/2011 | Scott et al. | |
| 7,938,351 B2 | 5/2011 | Taatjes et al. | |
| 8,105,066 B2 | 1/2012 | Sperry et al. | |
| 8,105,527 B2 | 1/2012 | Wahlstrom | |
| 8,119,053 B1 | 2/2012 | Bedal et al. | |
| 8,153,182 B2 | 4/2012 | Comb et al. | |
| 8,153,183 B2 | 4/2012 | Skubic et al. | |
| 8,185,229 B2 | 5/2012 | Davidson | |
| 8,215,371 B2 * | 7/2012 | Batchelder | C22C 43/00 164/155.1 |
| 8,222,908 B2 | 7/2012 | Paul et al. | |
| 8,226,395 B2 | 7/2012 | Pax et al. | |
| 8,252,223 B2 | 8/2012 | Medina et al. | |
| 8,282,380 B2 | 10/2012 | Pax et al. | |
| 8,285,411 B2 | 10/2012 | Hull et al. | |
| 8,287,794 B2 | 10/2012 | Pax et al. | |
| 8,287,959 B2 | 10/2012 | Batchelder | |
| D677,723 S | 3/2013 | Buel et al. | |
| 8,414,280 B2 | 4/2013 | Pettis | |
| 8,425,218 B2 | 4/2013 | Pettis | |
| D681,548 S | 5/2013 | Zhang et al. | |
| 8,465,689 B2 | 6/2013 | Sperry et al. | |
| 8,469,692 B2 | 6/2013 | Kritchman et al. | |
| D688,741 S | 8/2013 | Joyce | |
| 8,512,024 B2 | 8/2013 | Pax | |
| 8,521,320 B2 | 8/2013 | Silverbrook | |
| 8,529,240 B2 | 9/2013 | Mayer | |
| 8,562,324 B2 | 10/2013 | Pettis | |
| 8,609,204 B2 | 12/2013 | Kritchman | |
| 8,636,494 B2 | 1/2014 | Gothait et al. | |
| D698,869 S | 2/2014 | Strzelewicz et al. | |
| 8,642,692 B1 | 2/2014 | Stockwell et al. | |
| 8,647,098 B2 * | 2/2014 | Swanson | B29C 47/0002 264/176.1 |
| 8,647,102 B2 | 2/2014 | Swanson et al. | |
| 8,668,859 B2 | 3/2014 | Pettis | |
| D705,643 S | 5/2014 | Siboni et al. | |
| 8,718,522 B2 | 5/2014 | Chillscyzn et al. | |
| 8,747,097 B2 | 6/2014 | Pettis | |
| D711,463 S | 8/2014 | Costabeber | |
| D722,108 S | 2/2015 | Reches et al. | |
| D729,309 S | 5/2015 | Jun et al. | |
| D730,979 S | 6/2015 | Anantha et al. | |
| D732,587 S | 6/2015 | Hsu et al. | |
| D732,588 S | 6/2015 | Lin et al. | |
| D733,196 S | 6/2015 | Wolf et al. | |
| D734,814 S | 7/2015 | Yeh et al. | |
| D736,838 S | 8/2015 | Costabeber | |
| D737,345 S | 8/2015 | Anantha et al. | |
| D737,346 S | 8/2015 | Anantha et al. | |
| D739,885 S | 9/2015 | Lee et al. | |
| 9,126,367 B1 * | 9/2015 | Mark | B29C 70/20 |
| 9,138,940 B2 * | 9/2015 | Post | B29C 47/12 |
| D740,863 S | 10/2015 | Kemperle et al. | |
| 9,186,846 B1 * | 11/2015 | Mark | B33Y 70/00 |
| D745,069 S | 12/2015 | Kemperle et al. | |
| D745,903 S | 12/2015 | Armani | |
| 9,314,970 B2 * | 4/2016 | Elsworthy | B29C 67/0059 |
| D760,306 S | 6/2016 | Wolf | |
| 9,694,544 B2 * | 7/2017 | Mark | B29C 67/0088 |
| 9,808,986 B2 * | 11/2017 | Toh | B29C 64/106 |
| 9,815,268 B2 * | 11/2017 | Mark | B33Y 70/00 |
| 2012/0018924 A1 | 1/2012 | Swanson et al. | |
| 2013/0241102 A1 | 9/2013 | Rodgers et al. | |
| 2013/0327917 A1 | 12/2013 | Steiner et al. | |
| 2013/0329257 A1 | 12/2013 | Pettis et al. | |
| 2013/0329258 A1 | 12/2013 | Pettis et al. | |
| 2014/0034214 A1 | 2/2014 | Boyer et al. | |
| 2014/0035182 A1 | 2/2014 | Boyer et al. | |
| 2014/0036034 A1 | 2/2014 | Boyer et al. | |
| 2014/0039659 A1 | 2/2014 | Boyer et al. | |
| 2014/0039662 A1 | 2/2014 | Boyer et al. | |
| 2014/0039663 A1 | 2/2014 | Boyer et al. | |
| 2014/0042657 A1 | 2/2014 | Mulliken | |
| 2014/0042670 A1 | 2/2014 | Pettis et al. | |
| 2014/0043630 A1 | 2/2014 | Buser et al. | |
| 2014/0044822 A1 | 2/2014 | Mulliken | |
| 2014/0046473 A1 | 2/2014 | Boynton et al. | |
| 2014/0048970 A1 | 2/2014 | Batchelder et al. | |
| 2014/0070445 A1 | 3/2014 | Mayer | |
| 2014/0070461 A1 | 3/2014 | Pax | |
| 2014/0074274 A1 | 3/2014 | Douglas et al. | |
| 2014/0117575 A1 | 5/2014 | Kemperle et al. | |
| 2014/0117585 A1 | 5/2014 | Douglas et al. | |
| 2014/0120196 A1 | 5/2014 | Schmehl | |
| 2014/0121813 A1 | 5/2014 | Schmehl | |
| 2014/0129020 A1 | 5/2014 | Kroner et al. | |
| 2014/0129021 A1 | 5/2014 | Boynton et al. | |
| 2014/0129022 A1 | 5/2014 | Briscella et al. | |
| 2014/0328963 A1 * | 11/2014 | Mark | B29C 67/0088 425/143 |
| 2015/0037446 A1 * | 2/2015 | Douglass | B29C 67/0055 425/131.1 |
| 2015/0039113 A1 * | 2/2015 | Kanada | B29C 67/0055 700/98 |
| 2015/0147427 A1 * | 5/2015 | Lundwall | B29C 67/0085 425/375 |
| 2015/0165676 A1 * | 6/2015 | Chen | B29C 67/0085 425/170 |
| 2015/0375457 A1 * | 12/2015 | Mark | B29C 67/0088 425/166 |
| 2016/0067920 A1 * | 3/2016 | Fontaine | B29C 67/0088 264/255 |
| 2016/0067928 A1 * | 3/2016 | Mark | B29C 67/0088 264/401 |
| 2016/0107379 A1 * | 4/2016 | Mark | B29C 67/0055 264/308 |
| 2016/0192741 A1 * | 7/2016 | Mark | A43B 17/003 36/43 |
| 2016/0193778 A1 * | 7/2016 | Lee | B29C 59/026 425/378.1 |
| 2016/0311165 A1 * | 10/2016 | Mark | B33Y 10/00 |
| 2016/0339634 A1 * | 11/2016 | Fuller | B29C 67/0055 |

(56) References Cited

U.S. PATENT DOCUMENTS

| | | | |
|---|---|---|---|
| 2017/0120519 A1* | 5/2017 | Mark | B33Y 10/00 |
| 2017/0136690 A1* | 5/2017 | Kanematsu | B29C 67/0055 |
| 2017/0173868 A1* | 6/2017 | Mark | B29C 45/1418 |
| 2017/0190105 A1* | 7/2017 | Huang | H05B 3/44 |
| 2017/0291363 A1* | 10/2017 | Huang | B29C 64/118 |
| 2017/0297275 A1* | 10/2017 | Mark | B29C 67/0088 |
| 2017/0326802 A1* | 11/2017 | Mark | B29C 64/314 |

OTHER PUBLICATIONS

Heywood (Heywood, Mark, "J-Head MK-IV Hot End Clone Design Quick Review", published Jan. 23, 2013: https://airtripper.com/1236/j-head-mk-iv-hot-end-clone-design-quick-review/).*
International Search Report and Written Opinion dated Jan. 14, 2015 issued in PCT/US2014/060762, filed Oct. 15, 2014, 9 pages.
U.S. Appl. No. 29/565,645, filed May 23, 2016, Wolf.

* cited by examiner

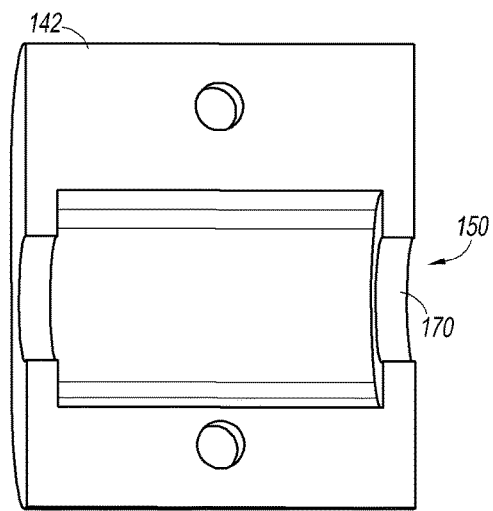
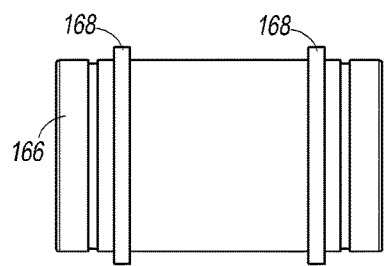
FIG. 6A
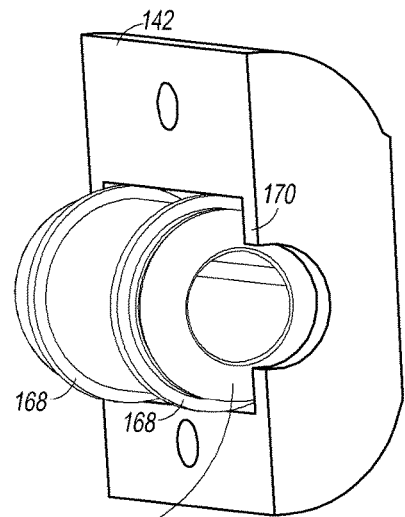
FIG. 6B

THREE-DIMENSIONAL PRINTER SYSTEMS AND METHODS

CROSS-REFERENCE TO RELATED APPLICATIONS

This application is the U.S. National Phase under 35 U.S.C. § 371 of International Application No. PCT/US2014/060762, filed Oct. 15, 2014, titled THREE-DIMENSIONAL PRINTER SYSTEMS AND METHODS, which claims the benefit under 35 U.S.C. § 119(e) as a nonprovisional of U.S. Provisional Application No. 61/890,932, filed Oct. 15, 2013, titled "HEATING COMPONENT OF A 3D PRINTER," and U.S. Provisional Application No. 62/028,276, filed Jul. 23, 2014, titled "THREE-DIMENSIONAL PRINTER SYSTEMS AND METHODS," the entirety each of which is incorporated by reference and made a part of this specification.

BACKGROUND

Field

The present disclosure generally relates to three-dimensional (3D) printers and in particular, to additive manufacturing systems for building 3D objects with layer based, additive manufacturing techniques.

Description of the Related Art

Three-dimensional (3D) printing is a process used for the printing of three-dimensional objects, for example, by printing or building parts of such objects in layers. Such 3D objects may be used, for example, for prototype parts. An additive manufacturing system (e.g., a fused deposition modeling (FDM) or extrusion-based additive manufacturing system) is used to build 3D objects, parts, or models from a digital representation of the 3D object (e.g., STL format files) using one or more additive manufacturing techniques such as layer-by-layer extrusion of a flowable part material. Movement of the extrusion head with respect to the substrate is performed under computer control, in accordance with build data that represents the 3D object. The build data is obtained by initially slicing the digital representation of the 3D object into multiple horizontally sliced layers. Then, for each sliced layer, the host computer generates a build path for depositing roads of modeling material to form the 3D object.

The part or modeling material is extruded through an extrusion tip carried by an extrusion/print head (e.g., a hot end) and is deposited as a sequence of roads on a substrate in an x-y plane. The extruded part material fuses to previously deposited modeling material, and solidifies upon a drop in temperature. The position of the extrusion head or other components relative to the substrate is then incremented along a z-axis (perpendicular to the x-y plane), and the process is repeated to form a 3D part resembling the digital representation. The extrusion temperature usually ranges from about 170 to 270 degrees Celsius, depending on factors such as material, speed, and nozzle diameter. The materials can include ABS (acrylonitrile butadiene styrene), PLA (polylactic acid), PVA (polyvinyl alcohol), HIPS (high impact polystyrene), Nylon, polycarbonate, and other thermoplastics, polymers, hybrid materials, and in some cases metals. The deposited layers may vary in thickness, but generally range from about 0.1 to 0.4 millimeters for most FDM printing.

Extrusion heads designed for relatively fast extrusion and multiple material compatibility may have a heating component and a cooling component. The heating component is used to soften the material for 3D layering, while the cooling component keeps the material below melting temperature prior to entering the heating component to ensure the material is correctly extruded.

In known extrusion heads such as the Lulzbot Budaschnozzle, the heating components are comprised of a number of parts such as threaded extenders, bases, nozzles, resistors, and thermistors. Heat generally transfers from the resistor through the base of the heating component to the threaded extender and also through the base to the top of the nozzle. The thermistor reports the temperature to a control unit which regulates power to a heating element, therefore regulating extrusion temperature.

In the Budaschnozzle, the heating component is coupled to a cooling component to form the extrusion head. The cooling component may include a PEEK isolator for minimizing heat transfer from the heating component to the filament being fed into the hot end. The cooling component may also include a brass bell to radiate heat, an aluminum spacer or fins to radiate heat, and a PTFE tube to guide the filament into the heating component.

If the extrusion head is not correctly assembled, heat transfer from the resistor to the nozzle may be impaired and extrusion may be inhibited. In some cases, the threaded extender may act as a heat barrier or thermal isolator, causing heat to radiate away from the extrusion head. Further, material may expand inside the extrusion head and cause blockage in the path of extrusion. In some cases, material such as PLA may seep out from the threads if the connection is not properly sealed.

In some cases, the threaded extender, base, and nozzle may be made from aluminum. Extra care must be taken to properly lubricate the threads with high temperature anti-seize to prevent galling. Even so, it is relatively easy to damage the heating component during disassembly if the components are connected too tightly, not properly sized, or if the anti-seize is not properly applied. Even with correct assembly and disassembly, the anti-seize may pose problems by leaking into the nozzle's orifice and jamming the nozzle.

Another issue is that the configuration of the hot end and numerous components is usually so complicated that it does not allow for easy assembly or ease of maintenance and replacement of parts, particularly to customers new to 3D printing.

Relatedly, the extrusion head needs to be supported (e.g., by a carriage) on the 3D printer away from a bed upon which the objection is being printed on. The carriage also needs to provide a mechanism for supplying the modeling material to the extrusion head. A balance between performance, precision, accuracy, and weight for the extrusion head needs to be achieved to reach a desired printed quality of a 3D object.

What is needed is a 3D printer with a hot end and supporting component that in combination provide improved accuracy, precision, reliability/longevity, thermal conductivity, ease of maintenance and replacement, and a configuration less likely to clog.

SUMMARY

Various embodiments of this disclosure relate to an extrusion assembly for a three-dimensional printer configured to build three-dimensional objects from layered consumable material. The extrusion assembly can include the following: an extrusion housing configured to connect to a support configured to move the extrusion housing; and a hot end assembly configured to connect to the extrusion housing, the hot end assembly comprising. The hot end assembly can include the following: a tip comprising a tip connecting surface and an internal conduit configured to extrude consumable material through the tip, the tip having a first heat transfer rate, the tip connecting surface extending directly from the tip internal conduit; a base comprising a base connecting surface and a base internal conduit configured to direct the consumable material through the base to the tip and heat the consumable material, the base connected to the tip and in direct thermal communication with tip via the base connecting surface being in direct contact with the tip connecting surface, the base connecting surface extending directly from the base internal conduit, the base housing a heating element configured to heat the base to a predetermined temperature, the base having a second heat transfer rate that is substantially equal to the first heat transfer rate of the tip; and a sleeve comprising a sleeve conduit configured to direct the consumable material through the sleeve to the base, the sleeve connected to the base, the sleeve having a third heat transfer rate that is less than the first and second heat transfer rates. When layering the consumable material to build a three-dimensional object while the hot end assembly is moved via the first and second supports moving the extrusion housing connected to the hot end assembly, the heating element generates heat that is conducted through the base and the tip to the consumable material passing through the base internal conduit and the tip internal conduit while the sleeve mitigates heat transfer to the consumable material passing through the sleeve conduit.

In some embodiments, the extrusion assembly can include one or more of the following: at least a portion of a wall forming the base internal conduit directly contacts the consumable material while the consumable material passes through the base internal conduit; a diameter of the base internal conduit is sized correspond to a diameter of a filament of the consumable material such that the base internal conduit guides the filament through the base internal conduit along an extrusion direction of the consumable material through the hot end assembly; a diameter of the base internal conduit is substantially same as a diameter of the tip internal conduit at the top connecting surface; a diameter of the sleeve conduit is substantially same as the diameter of the base internal conduit; the tip internal conduit tapers to have a diameter that decreases along an extrusion direction of the consumable material through the hot end assembly to promote flow of the consumable material; the base comprises a boss opening extending into the base, the boss opening concentric with the base internal conduit; the sleeve comprises a boss extending into the boss opening, thereby concentrating the heat transferred to the consumable material in the base internal conduit toward a downstream portion of the base along an extrusion direction of the consumable material through the hot end assembly and mitigating heat transfer to the consumable material in an upstream portion of the base along the extrusion direction where the boss extends into the boss opening; the boss opening of the base and the boss of the sleeve are correspondingly threaded for the boss to tightly engage the boss opening; the base comprises a support flange at the downstream portion of the base, the support flange extending inwardly toward the base internal conduit, the support flange directly contacting the boss to form a seal mitigating extrusion of the consumable material onto the support flange; the sleeve conduit is sized to accept a filament tube within the sleeve conduit through at least a part of a length of the sleeve conduit along an extrusion direction of the consumable material through the hot end assembly, the filament tube configured to direct the consumable material into the sleeve; the sleeve comprises a sleeve flange extending into the sleeve conduit, the sleeve flange configured to limit a length of the filament tube in the sleeve conduit along the extrusion direction; the sleeve flange physically separates the filament tube from the base along the extrusion direction; an internal tube positioned within the sleeve conduit downstream of the filament tube along the extrusion direction, the internal tube configured to direct the consumable material along the sleeve conduit toward the base; the internal tube has a higher melting or glass transition temperature relative to the filament tube and has a lower coefficient of friction against consumable material relative to the sleeve; the internal tube comprises a same material as a material of the filament tube; the sleeve comprises a sleeve flange extending into the sleeve conduit, the sleeve flange supporting the internal tube at a predetermined position within the sleeve conduit along the extrusion direction; the sleeve flange physically separates the internal tube from the base along the extrusion direction; a heat exchanger disposed about the filament tube and in thermal communication with the filament tube, the heat exchanger configured to transfer heat away from the filament tube; the extrusion housing comprises a flow control device and a flow conduit configured to direct a cooling fluid to the heat exchanger for the heat exchanger to transfer heat from the filament tube to the cooling fluid when the hot end assembly is connected to the extrusion housing; the flow control device comprises a fan, and the cooling fluid comprises air; the fan directs the air through the fluid conduit over the heat exchanger to cool the filament tubes via forced convection; the flow conduit branches to direct the cooling fluid to cool the three-dimensional object while the three-dimensional object is being built; a thermal isolating layer positioned about the sleeve and extending outwardly from the sleeve, the thermal isolating layer configured to inhibit heat transfer to the heat exchanger from the base; a heat transfer layer positioned about the sleeve and extending outwardly from the sleeve, the heat transfer layer positioned upstream of the thermal isolating layer along the extrusion direction and in thermal communication with the thermal isolating layer, the heat transfer layer configured to transfer heat from the thermal isolating layer toward the heat exchanger; the sleeve comprises a support flange extending radially outward from the sleeve, the support flange engaging the heat transfer layer to secure the heat transfer layer in a predetermined position along the extrusion direction; a thermal isolating layer positioned about the filament tube and extending outwardly from filament tube, the thermal isolating layer configured to inhibit heat transfer from the heat exchanger to the extrusion housing; a material of the sleeve is capable of being heated above 300 degrees Celsius without deforming the sleeve, the material of the sleeve comprising a thermoplastic; the tip and the base are connected together via a fastener positioned along an extrusion direction of the consumable material through the hot end assembly such that upon securing the fastener, the tip connecting surface and the base connecting surface form a seal to mitigate extrusion of the consumable material between the tip connecting surface and the base connecting surface; the fastener comprises a screw extending along the extrusion direction at least partially through the tip and at least partially through the base; an other hot end assembly configured to connect to the extrusion housing; the other hot end including an other tip comprising an other internal conduit configured to extrude the consumable material through the other tip, the other tip having the first heat transfer rate; the other hot end including an other sleeve comprising an other sleeve conduit configured to direct the consumable material through the other sleeve toward the other tip, the other sleeve having the third heat transfer rate that is less than the first and second heat transfer rates; the base of the hot end assembly is connected to the other tip and the other sleeve of the other hot end assembly to heat the consumable material passing through the other tip; the extrusion housing comprises a leveling mechanism configured to level the hot end assembly with the other hot end assembly in an y-z plane of the extrusion assembly, the y-z plane substantially parallel to an extrusion direction of the consumable material through the hot end assembly and the other hot end assembly, with an z-axis of the y-z plane parallel to the extrusion direction; the extrusion housing comprises a clamp configured to removably engage the support for the support to move the extrusion housing in an x-y plane that is substantially perpendicular to the extrusion direction; the clamp comprises a leveling wall disposed at an angle relative to the support when the clamp is engaged with the support; movement of the leveling wall along a y-axis of the y-z plane relative to the support tilts the extrusion housing in the y-z plane to level the hot end assembly with the other hot end assembly when the extrusion housing is connected to the hot end assembly and the other hot end assembly; the support comprises a rod and a bearing, the rod extending along the y-axis beyond a perimeter of the clamp in the y-z plane, the bearing positioned within the perimeter of the clamp when the clamp is engaged with the support; the hot end assembly and the other hot end assembly are connected to the extrusion housing with the tip and the other tip aligned along the y-axis; moving the leveling wall in the y-axis relative to the bearing changes a contact point on the leveling wall with the bearing to level the hot end assembly and the other hot end assembly in the y-z plane when the clamp is engaged with the support; the extrusion housing comprises an other clamp configured to removably engage an other support for the other support to move the extrusion housing in the y-axis while the support is configured to move the extrusion housing along an x-axis when the extrusion housing is connected to the support and the other support; an x-y plane is substantially perpendicular to the extrusion direction; and/or the other clamp comprises a level wall to engage the other support at substantially a same level along an x-z plane upon engagement and reengagement of the other clamp with the other support, the x-z plane substantially parallel to the extrusion direction.

Various embodiments of this disclosure relate to a hot end for building three-dimensional objects from layered consumable material. The hot end can include the following: an extruder comprising an extrusion channel configured to direct consumable material through the extruder; a base comprising a base channel configured to direct the consumable material to the extruder, the base connected to the extruder, the base having a heating element configured to heat the base; at least a portion of a wall forming the base channel is in direct contact with the consumable material passing through the base; and an isolator comprising an isolator channel configured to direct the consumable material to the base, the isolator connected to the base, the isolator being less thermally conductive relative to the base and the extruder. When layering the consumable material to build a three-dimensional object, the heating element generates heat that is conducted through the base and the extruder to the consumable material passing through the base channel and the extrusion channel while the isolator mitigates heat transfer to the consumable material passing through the isolator channel.

In some embodiments, the hot end can include the one or more of the following: the extruder and the base are in direct thermal communication via an extruder surface of the extruder directly contacting a base surface of the base where the extruder connects to the base; the extruder surface radially extends from the extrusion channel; the base surface radially extends from the base channel; the extruder and the base are connected together via a fastener positioned along an extrusion direction of the consumable material through the hot end such that upon securing the fastener, the extruder surface and the base surface form a seal to mitigate extrusion of the consumable material between the extruder surface and the base surface; the fastener comprises a screw extending along the extrusion direction at least partially through the extruder and at least partially through the base; a diameter of the base channel is sized correspond to a diameter of a filament of the consumable material such that the base channel guides the filament through the base channel along an extrusion direction of the consumable material through the hot end; a diameter of the base channel is substantially same as a diameter of the extrusion channel where the extruder and the base connect; a diameter of the isolator channel is substantially same as the diameter of the base channel; the extrusion channel tapers to have a diameter that decreases along an extrusion direction of the consumable material through the hot end to promote flow of the consumable material; the base comprises a cutout extending into the base, the cutout concentric with the base channel; the isolator comprises an extension projecting into the cutout, thereby concentrating the heat transferred to the consumable material in the base channel toward a downstream portion of the base along an extrusion direction of the consumable material through the hot end and mitigating heat transfer to the consumable material in an upstream portion of the base along the extrusion direction where the extension projects into the cutout; the cutout of the base and the extension of the isolator are correspondingly threaded for the extension to tightly engage the cavity; the base comprises a support flange at the downstream portion of the base, the support flange extending inwardly toward the base channel, the support flange directly contacting the extension to form a seal mitigating extrusion of the consumable material onto the support flange; the isolator is sized to accept a filament tube within the isolator channel through at least a part of a length of the isolator channel along an extrusion direction of the consumable material through the hot end, the filament tube configured to direct the consumable material into the isolator; the isolator comprises an isolator flange extending into the isolator channel, the isolator flange configured to limit a length of the filament tube in the isolator channel along the extrusion direction; the isolator flange physically separates the filament tube from the base along the extrusion direction; an internal tube positioned within the isolator channel downstream of the filament tube along the extrusion direction, the internal tube configured to direct the consumable material along the isolator channel toward the base; the internal tube has a higher melting or glass transition temperature relative to the filament tube and has a lower coefficient of friction against consumable material relative to the isolator; the internal tube comprises a same material as a material of the filament tube; the isolator comprises an isolator flange extending into the isolator channel, the isolator flange supporting the internal tube at a predetermined position within the isolator channel along the extrusion direction the isolator flange physically separates the internal tube from the base along the extrusion direction; a heat exchanger disposed about the filament tube and in thermal communication with the filament tube, the heat exchanger configured to transfer heat away from the filament tube; a thermal isolating layer positioned about the isolator and extending outwardly from the isolator, the thermal isolating layer configured to inhibit heat transfer from the base to the heat exchanger; a heat transfer layer positioned about the isolator and extending outwardly from the isolator, the heat transfer layer positioned upstream of the thermal isolating layer along the extrusion direction and in thermal communication with the thermal isolating layer, the heat transfer layer configured to transfer heat from the thermal isolating layer toward the heat exchanger; the isolator comprises a support flange extending radially outward from the isolator, the support flange engaging the heat transfer layer to secure the heat transfer layer in a predetermined position along the extrusion direction; a material of the isolator is capable of being heated above 300 degrees Celsius without deforming the isolator, the material of the isolator comprising a thermoplastic; an other extruder comprising an other extruder channel configured to extrude the consumable material through the other extruder; an other isolator comprising an other isolator channel configured to direct the consumable material through the other isolator toward the other extruder; and/or the base is connected to the other extruder and the other isolator to heat the consumable material passing through the other extruder.

Various embodiments of this disclosure relate to a hot end for building three-dimensional objects from layered consumable material. The hot end can include the following: an extruder comprising an extrusion channel configured to direct consumable material through the extruder; a heating element in thermal communication with the extruder, the heating element configured to heat the consumable material passing through the extruder; an isolator comprising an isolator channel configured to direct the consumable material toward the extruder, the isolator being less thermally conductive relative to the extruder; and a lining positioned within the isolator channel following a perimeter of the isolator channel, the lining configured to direct the consumable material along the isolator channel toward the extruder, the lining having a lower coefficient friction with the consumable material relative to the isolator. When layering the consumable material to build a three-dimensional object, the heating element generates heat that is conducted through the extruder to the consumable material passing through the extrusion channel while the isolator mitigates heat transfer to the consumable material passing through the isolator channel.

In some embodiments, the hot end can include the one or more of the following: the extrusion channel tapers to have a diameter that decreases along an extrusion direction of the consumable material through the hot end to promote flow of the consumable material; the isolator comprises an extension projecting toward the extruder, thereby concentrating the heat transferred to the consumable material toward the extruder and mitigating heat transfer to the consumable material not within the extrusion channel; the isolator comprises an isolator flange extending into the isolator channel, the isolator flange supporting the lining at a predetermined position within the isolator channel along the extrusion direction; the isolator is sized to accept a filament tube within the isolator channel through at least a part of a length of the isolator channel along an extrusion direction of the consumable material through the hot end, the filament tube configured to direct the consumable material into the isolator; the isolator comprises an isolator flange extending into the isolator channel, the isolator flange configured to limit a length of the filament tube in the isolator channel along the extrusion direction; the lining has a higher melting or glass transition temperature relative to the filament tube and having a lower coefficient of friction against consumable material relative to the isolator; the lining comprises a same material as a material of the filament tube; a heat exchanger disposed about the filament tube and in thermal communication with the filament tube, the heat exchanger configured to transfer heat away from the filament tube; a thermal isolating layer positioned about the isolator and extending outwardly from the isolator, the thermal isolating layer configured to inhibit heat transfer from the extruder to the heat exchanger; a heat transfer layer positioned about the isolator and extending outwardly from the isolator, the heat transfer layer positioned upstream of the thermal isolating layer along the extrusion direction and in thermal communication with the thermal isolating layer, the heat transfer layer configured to transfer heat from the thermal isolating layer toward the heat exchanger; the isolator comprises a support flange extending radially outward from the isolator, the support flange engaging the heat transfer layer to secure the heat transfer layer in a predetermined position along the extrusion direction; a material of the isolator is capable of being heated above 300 degrees Celsius without deforming the isolator, the material of the isolator comprising a thermoplastic; an other extruder comprising an other extruder channel configured to extrude the consumable material through the other extruder; an other isolator comprising an other isolator channel configured to direct the consumable material through the other isolator toward the other extruder; and/or the heating element is in thermal communication with the both the extruder and the other extruder to generate heat that is conducted through the extruder and the other extruder to the consumable material passing through the extrusion channel and the other extrusion channel.

Various embodiments disclosed herein are directed to a heated component for use with a 3D printer and material for 3D layering. The heated component can include a base having a characteristic heat transfer rate, a top end, a threaded extender disposed on the top end, generally opposing sides having a first hole adapted to receive a thermal sensor and the first hole extending through the sides, a second hole adapted to receive a heating element and the second hole extending through both sides, a bottom end generally disposed opposite of the top end and having at least one receptacle for receiving a screw, a feed hole extending through the extender into the top end and through the bottom end for receiving material for 3D layering. The heated component can include a tip having a characteristic heat transfer rate substantially that of the heat transfer rate of the base, a top end and the top end having a surface such that when the top end is in contact with the bottom end of the base there is formed a seal that is resistant to leaking of the material for 3D layering, at least one hole for receiving a screw, a bottom end and a nozzle disposed on the bottom end, the nozzle having a tapering internal cavity, and a hole extending through the top end, bottom end, and nozzle. The tip can be removably attached to the base by the use of at least one screw extending through the top end and bottom end of the tip and being secured in the receptacle in the base and thus the tip and base form a seal that is resistant to leaking of the material for 3D layering. The heated component can be coupled to a 3D printer and can receive material for 3D layering and the material is heated to a liquid like state and directed out the tip to a surface to receive the material.

The foregoing is a summary and contains simplifications, generalization, and omissions of detail. Those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of any subject matter described herein.

The summary is provided to introduce a selection of concepts in a simplified form that are further described below in the Detailed Description. This summary is not intended to identify key features or essential features of any subject matter described herein.

BRIEF DESCRIPTION OF THE DRAWINGS

The foregoing and other features of the present disclosure will become more fully apparent from the following description, taken in conjunction with the accompanying drawings. Understanding that these drawings depict only some embodiments in accordance with the disclosure and are, therefore, not to be considered limiting of its scope, the disclosure will be described with additional specificity and detail through use of the accompanying drawings.

FIGS. 6A and 6B illustrate an outer holder bracket of a rod holder and a bearing.

DETAILED DESCRIPTION

Figure 1:
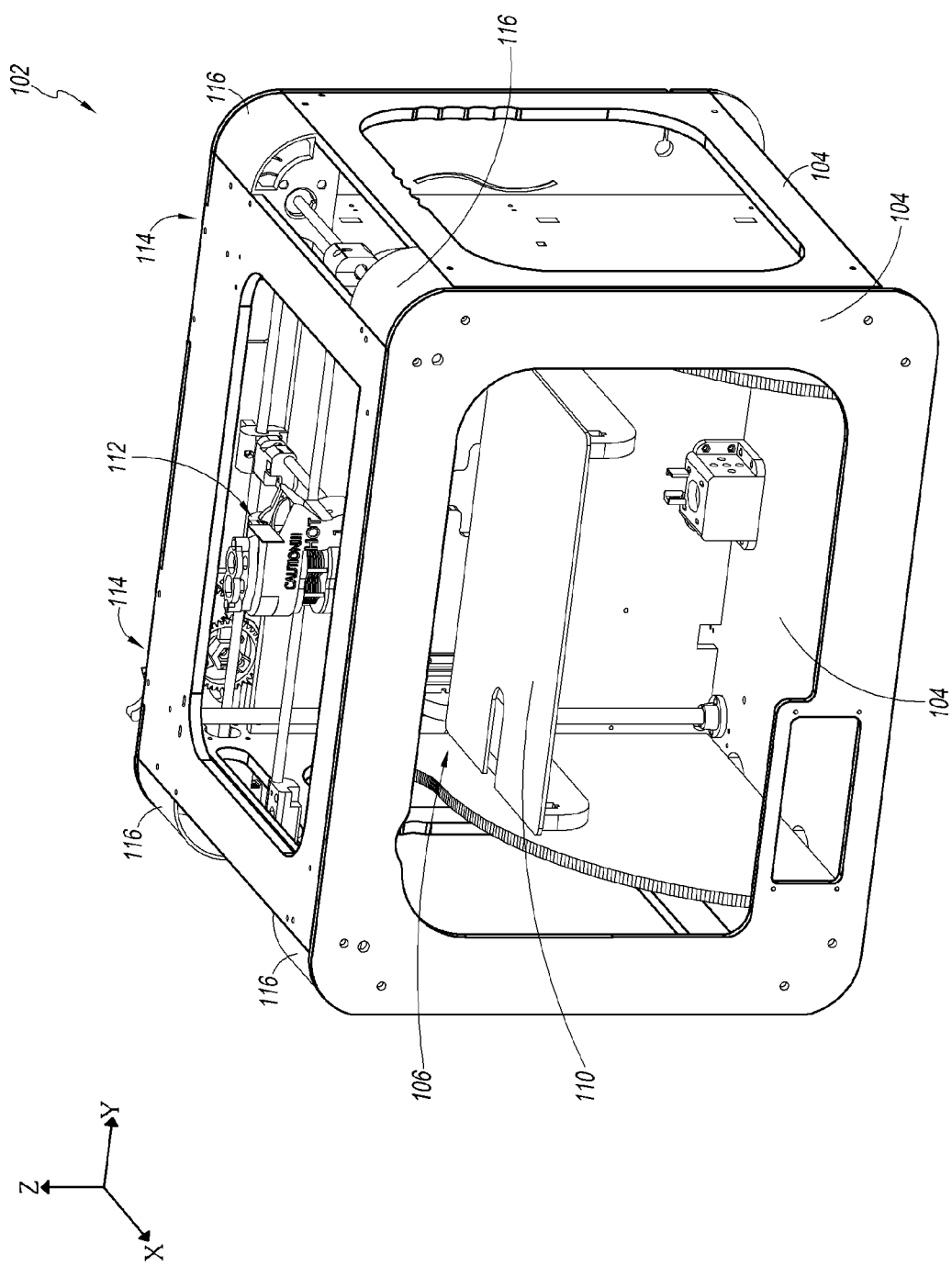
FIG. 1 illustrates a side, top, perspective view of an embodiment of a three-dimensional (3D) printer.

In the following detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be utilized, and other changes may be made, without departing from the spirit or scope of the subject matter presented here. It will be readily understood that the aspects of the present disclosure, as generally described herein, and illustrated in the figures, may be arranged, substituted, combined, and designed in a wide variety of different configurations, all of which are explicitly contemplated and made a part of this disclosure.

In particular, embodiments disclosed herein pertain to devices, including printers and print head assemblies, which provide improved accuracy, precision, reliability/longevity, thermal conductivity, ease of maintenance and replacement, and a configuration less likely to clog/jam.

FIG. 1 illustrates a side, top, perspective view of an embodiment of a three-dimensional (3D) printer 102. As illustrated in FIG. 1, the printer 102 can have an enclosure or frame 104. The enclosure 104 can define the outer boundaries (e.g., perimeter) of the printer 102. The enclosure 104 can be made for any suitable material that provides desired or predetermined rigidity for the printer 102 and support of the components and build object (e.g., 3D printed part) as discussed herein. The materials can include polymers such as integrally thermoformed plastic, for example, acrylic, polycarbonate, acrylonitrile butadiene styrene (ABS), or other materials with sufficient or desired level of impact resistance, toughness, and heat resistance.

The enclosure 104 can define and support a build chamber 106. The build chamber 106 can contain a bed 110 (e.g., a printing bed or printing surface) and an extrusion assembly 112 for building a 3D model, object, or part. The bed 110 is a platform on which 3D object is built and can move along a vertical z-axis as illustrated in FIG. 1 based on signals provided from a computer-operated controller. The bed 110 may include a heat plate and a printing surface such as borosilicate glass. The glass may be coated with polyethylene terephthalate (PET) tape, Kapton tape, blue painter's tape, or a solution to enhance adhesion between the printed part (e.g., 3D object) and the bed 110. The extrusion assembly 112 may include one or more extrusion heads as discussed herein for melting successive portions of filaments during a build operation with the printer 102. The consumable material can be supplied by feeder assemblies 114 to the extrusion assembly 112 as discussed herein. Movement of the extrusion assembly 112 can be supported by corner brackets 116 connected to the enclosure 104. The extrusion assembly 112 can move along a horizontal x-y plane based on signals provided from a computer-operated controller. The controller can be one or more processor-based controllers, which may communicate with parts or components of the printer 102 to a build a 3D object as discussed herein.

The horizontal x-y plane is a plane defined by an x-axis and a y-axis as illustrated in FIG. 1, where the x-axis, the y-axis, and the z-axis are orthogonal to each other. The z-axis is orthogonal to the x-y plane. In some embodiments, the bed 110 may be configured to move in the horizontal x-y plane within build chamber 106, and the extrusion assembly 112 may be configured to move along the z-axis. Other similar arrangements may also be used such that one or both of the bed 110 and the extrusion head assembly 112 are moveable relative to each other.

As illustrated in FIG. 1, the build chamber 106 is partially open to ambient conditions. In some embodiments, the build chamber 106 may be omitted and/or replaced with different types of build environments. For example, the build chamber 106 may substantially closed or sealed from the environment. The build chamber 106 may be enclosed with suitable structures (e.g., flexible curtains) as desired. In some embodiments, the build chamber 106 may also be heatable in a variety of manners (e.g., with heated circulating air, heat lamps, and the like) to, for example, reduce the rate at which the 3D object solidifies after being extruded and deposited (e.g., to reduce distortions, cracking and curling). Alternatively, or in combination, the bed 110 may be heated to reduce the rate at which the 3D object solidifies after being extruded and deposited as discussed herein.

Figure 2:
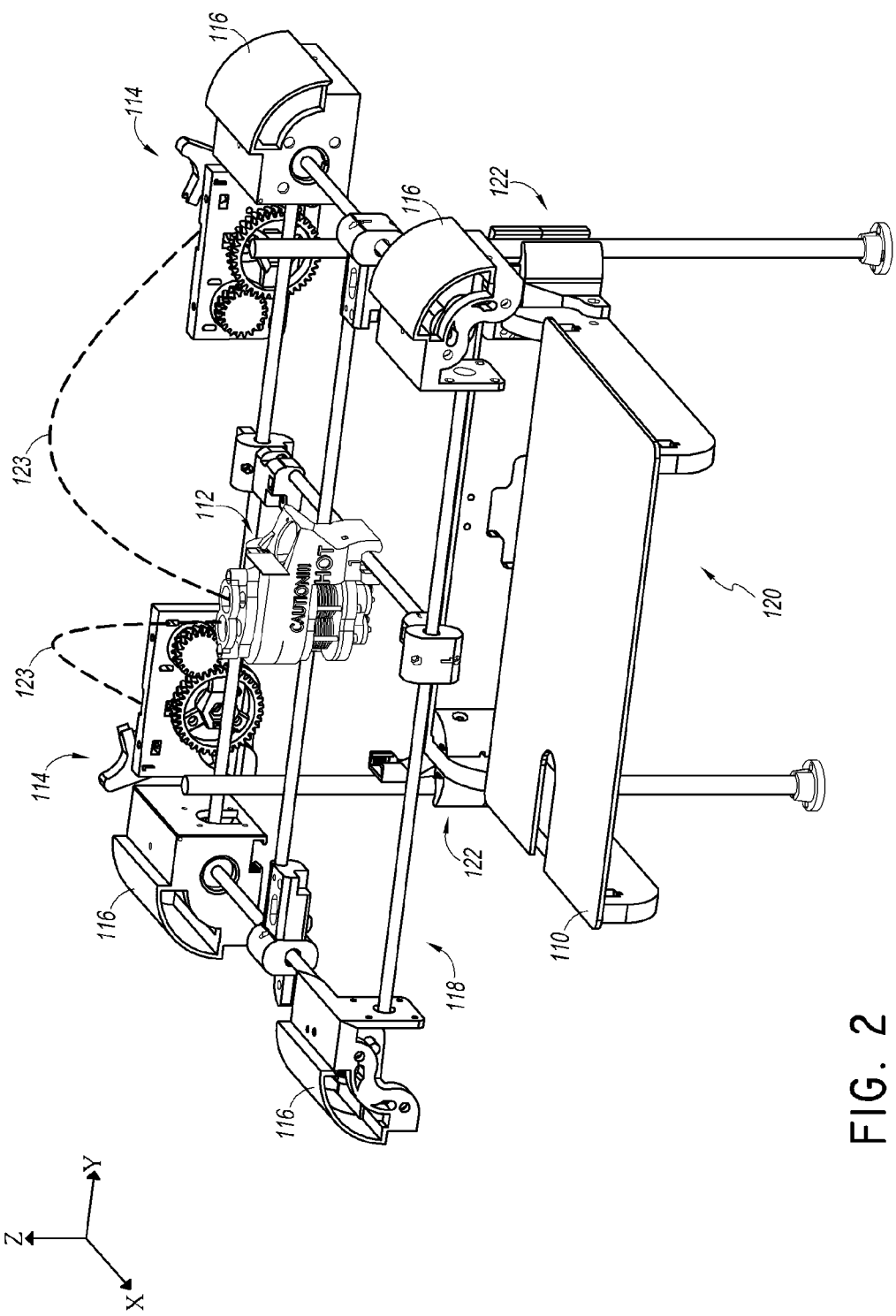
FIG. 2 illustrates a side, top, perspective view of embodiments of various assemblies of the printer.

FIG. 2 illustrates a side, top, perspective view of embodiments of various assemblies of the printer 102. As illustrated in FIG. 2, the extrusion assembly 112 can be supported and guided by an extrusion guide assembly 118, which includes corner brackets 116 as discussed herein. The bed 110 can be supported and guided by a bed guide assembly 120, which includes bed bracket assemblies 122 supporting the bed 110 in, for example, a cantilevered position as discussed herein.

The feed assemblies 114 can supply consumable material to the extrusion assembly 112 via tubes, tubing, or conduits positioned along the feed lines 123 illustrated in FIG. 2 in a Bowden-style arrangement. The feed assembly 114 can push, extrude, propel, drive, or feed consumable material filament through the tubes along the feed lines 123 to the extrusion assembly 112 to build the 3D object as discussed herein. Two feed lines 123 are illustrated in FIG. 2. The feed assemblies 114 can be configured to push and pull back consumable material as needed. For example, when one of the print heads (e.g., nozzles 214) is printing/extruding as discussed herein, the associated feed assembly 114 can push consumable material to the print head at a desired extrusion rate. The other feed assembly 114 associated with the print head that is not printing pulls back the consumable material from the heating zone as discussed herein to inhibit or substantially prevent the consumable material that is not being used from melting (e.g., heating up beyond it glass transition temperature). When the first print head is no longer printing, the feed assembly 114 associated with the first print head pulls back the consumable material. At the same time, a fan may be turned on to cool a portion of the print head to further prevent the consumable material not being used from melting as discussed herein, and in particular, for cooled portions of the extrusion assembly 112 and/or hot end assembly 174. The feed assembly 114 for the other print head may push consumable material when the other print head is printing. This concept of alternating between print heads and associated feed assemblies can be applied to three or more print heads.

Suitable diameters for inner diameter of the tubes along the feed lines 123 (e.g., filament tubes 238 as discussed herein) may vary depending on the average diameter of the intended consumable material filament. For example, with filament having an average diameter of about 2.85 millimeters (0.112 millimeters), tubing with an average inner diameter of about 3.175 millimeters (0.125 inches) strikes a desirable balance between free movement of the filament in the feed line and precise control of the filament over the length of the feed line. Relatedly, the tubes can have a substantially uniform wall thickness. In this example, tubing with an outer diameter of about 6.35 millimeters (0.250 inches) provides a wall thickness of about 1.588 millimeters (0.063 inches). In other embodiments, thinner or thicker filament can also be used in the Bowden-style arrangement with similar considerations to free movement and control over the extruded filament.

The consumable materials may be provided to extrusion assembly 112 in an extrusion-based additive manufacturing system in a variety of different media. The consumable material can be supplied in the form of a continuous filament. Examples of suitable average diameters for the filament strands of the modeling materials range from about 1.27 millimeters (about 0.050 inches) to about 3.0 millimeters (about 0.120 inches), including 1.75 millimeter (about 0.069 inches). The consumable materials may be provided to the feeder assemblies 114 from removable and replaceable container devices configured to retain supplies of the consumable materials for building 3D objects. The container devices may be supported by the sides or at exterior of the printer 102 (e.g., enclosure 104) for ease of access and replacement.

The tubes along the feed lines 123 can be made of any suitable material flexible material to contain the consumable material filament while having low coefficients of friction, such as fluorinated polymers (e.g., perfluoropolymers). In some embodiments, suitable materials for the tubes along the feed lines 123 include polytetrafluoroethylenes (PTFE) having low static coefficients of friction. Examples of suitable commercially available fluorinated polymers include PTFE available under the trade designation "TEFLON" from E.I. du Pont de Nemours and Company, Wilmington, Del.

Accordingly, as illustrated in FIG. 2, the feed assemblies 114 are not positioned on top of the extrusion assembly 112. Rather, the feed assemblies 114 are connected to or positioned on the enclosure 104 of the printer 102. With the feed assemblies not on the extrusion assembly 112, the extrusion assembly 112 weighs less relative to if the feed assembly (or assemblies) 114 is positioned on the extrusion assembly 112. Accordingly, when the extrusion assembly 112 is moved in the x-y plane as discussed herein, less weight is moved by the extrusion guide assembly 118 (FIG. 3) as discussed herein. Moving less weight reduces the wear and tear (reduction of stress and shear forces on components of the extrusion guide assembly 118 or other components of the printer 102). For example, the extrusion assembly 118 can be moved by a system with belts 156 as discussed herein, and for example, as discussed in reference to FIG. 4. Over a lifetime of the printer 102 or the belts 156 themselves, the belts 156 have to move and change momentum of an extrusion assembly 112 that weighs relatively less. By moving or changing momentum of relatively less weight, stretching forces on the belts 156 are reduced and accordingly, elongation (or even tearing) of the belts 156 is reduced. As such, accuracy and precision of extrusion assembly 112 placement in the x-y plane to print a 3D object is maintained over a longer time period for operating the printer 102. In combination with light weight components of the extrusion assembly 112, the reduction of mass that has to be moved around by the extrusion guide assembly 118 reduces the inertial forces that are generated when moving extrusion assembly 112 around in the horizontal x-y plane (e.g., in raster patterns), thereby improving the response time and control of the extrusion guide assembly 118 and also reducing wear on the components of the extrusion guide assembly as well as the extrusion assembly 112. In some embodiments, the belts are GT2 profile with 2 millimeter teeth spacing. Other belts with suitable teeth spacing may be used, including between about 0.5 millimeter to 5 millimeters, including ranges bordering therein and the foregoing values.

Figure 7:
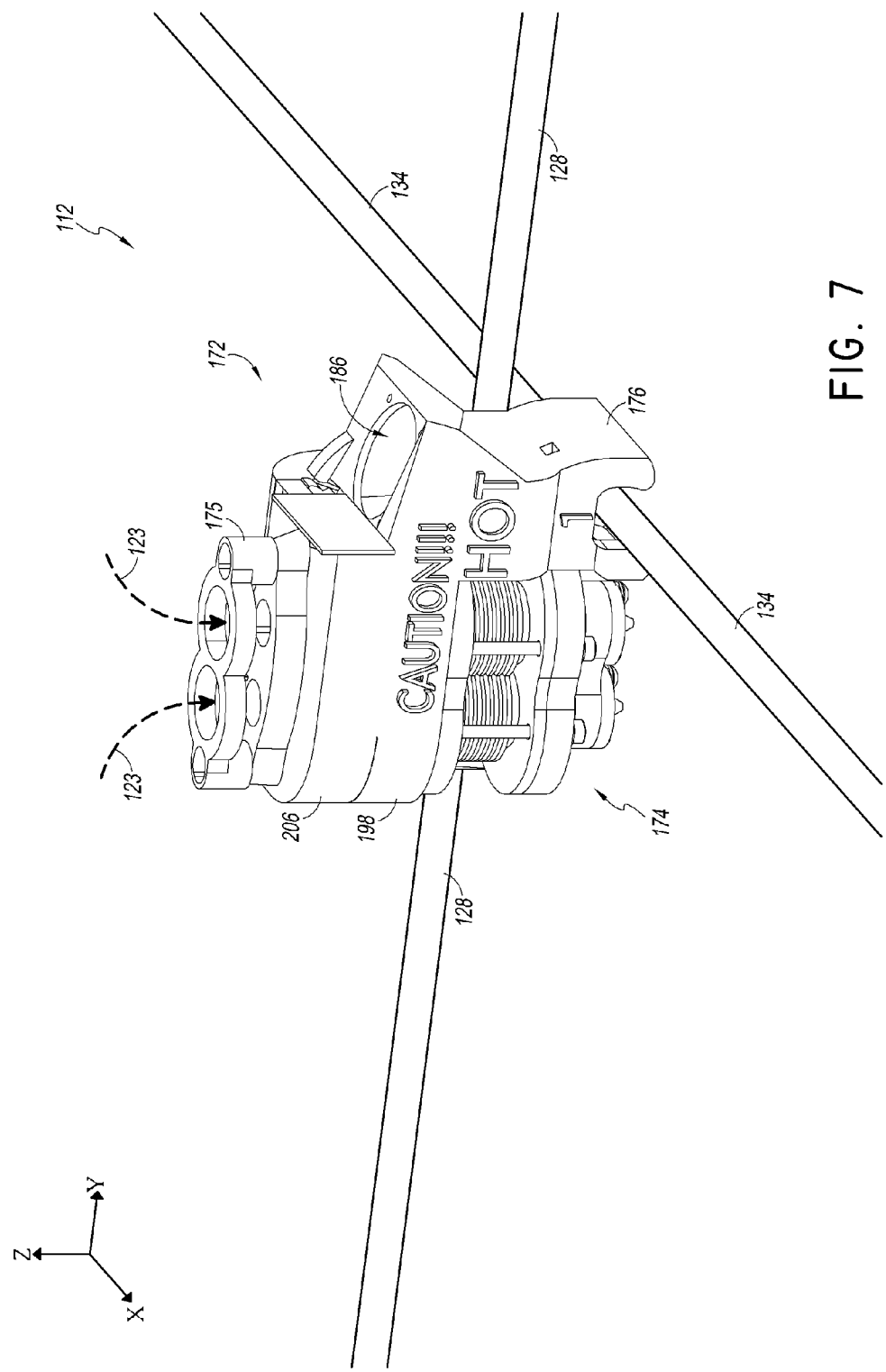
FIG. 7 illustrates a side, top, perspective view of an embodiment of an extrusion assembly.

Similarly, less wear and tear can be imparted on other components of the printer 102. For example, the motors moving the belts 156 as discussed herein have to move less weight while printing a 3D object, resulting in less stress placed on the motors to potentially prolong the life, accuracy, and precision of the motors. As another example, less weight on the extrusion assembly 112 reduces wear and tear on the extrusion housing 172 (FIG. 7). As discussed herein, the extrusion housing 172 houses and moves the hot end assembly 174 to build a 3D object. As the 3D object is being printed, the extrusion housing 172 connected to x, y-extrusion rods 124, 130 (FIG. 3) has to move relatively less weight, reducing stress and shearing forces on the extrusion housing 172. Accordingly, possible warping or deformation of the extrusion housing 172 can be reduced over the lifetime of the printer 102 or lifetime of the extrusion housing 172 to potentially prolong the life, accuracy, and precision of the motors. In some embodiment, the motors can be precision stepper motors. Other alternative motors can also be used that achieve a desired or predetermined level of control of placement of the extrusion assembly 112 as discussed herein, such as servo motor and motors incorporating rotary encoders. In some embodiments, the rods are 8 millimeter diameter precision ground steel rods. Other rods with suitable diameters may be used, including about 2 to 16 millimeters, including ranges bordering therein and the foregoing values.

Figure 3:
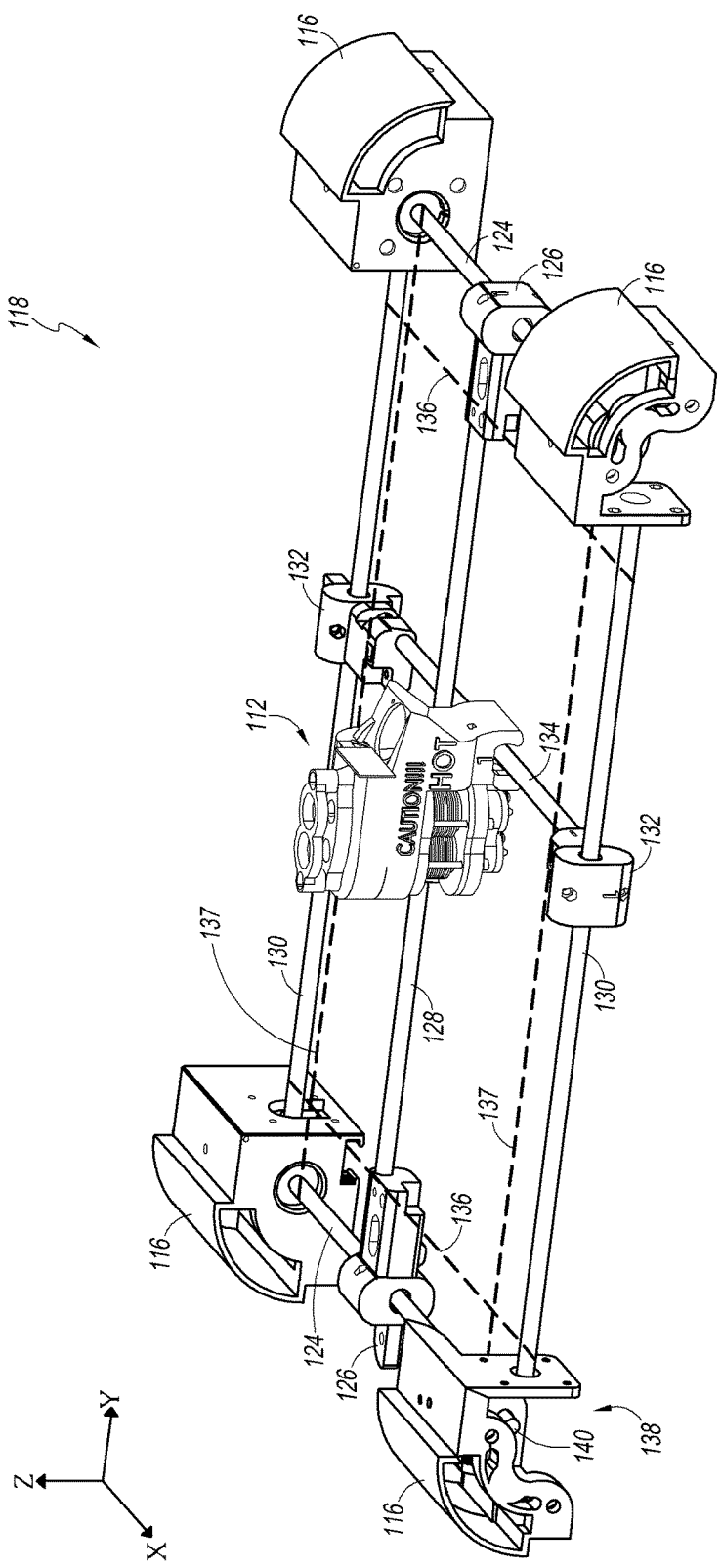
FIG. 3 illustrates a side, top, perspective view of an embodiment of an extrusion guide assembly.

FIG. 3 illustrates a side, top, perspective view of an embodiment of the extrusion guide assembly 118. The extrusion guide assembly 118 can include one or more x-side rods 124 supported by two corner brackets 116 as illustrated in FIG. 3. The x-side rods 124 can support and guide one or more y-rod holders 126. The y-rod holders 126 can support and guide a y-extrusion rod 128 (e.g., a support or support rod). The extrusion guide assembly 118 can also include one or more y-side rods 130 supported by two corner brackets 116 as illustrated in FIG. 3. The y-side rods 130 can support and guide one or more x-rod holders 132. The x-rod holders 132 can support and guide an x-extrusion rod 134 (e.g., a support or a support rod). The y-extrusion rod 126 and x-extrusion rod 134 can support and guide the extrusion assembly 112 as discussed herein.

The y-rod holders 126 and x-rod holders 132 can move, slide, or translate on the x-side rods 124 and y-side rods 130, respectively. For example, the y-rod holder 126 and x-rod holder 132 can move along a longitudinal length of the x-side rods 124 and y-side rods 130. The y-rod holder 126 and x-rod holder 132 can be substantially leveled and straight (e.g., within predetermined tolerances) to maintain or keep the y-rod holder 126 and x-rod holder 132 in a predetermined x-y plane. The y-rod holder 126 and x-rod holder 132 can be made of any suitable material including metal such as die cast or stamp-pressed aluminum, including aluminum alloys. Other suitable materials can include any suitable form or alloy of cast or wrought iron or carbon steel, including stainless steel.

Movement of the y-rod holder 126 and x-rod holder 132 can be provided by belts 156 (FIG. 4) or other suitable flexible attachment mechanism along belt lines 136, 137. X-belt lines 136 illustrate a path along which belts 156 (e.g., a toothed belt) between the y-side rods 130 can be suspended. Each x-belt line 136 illustrated in FIG. 3 can have a belt suspended along the x-belt line 136. Accordingly, two belts 156 can be suspended around the y-side rods 130 illustrated in FIG. 3. Ends of the belts 156 along the x-belt lines 136 can be connected to form a complete and continuous loop about the y-side rods 130 such that belts 156 can be continuously rotated about the y-side rods 130 as discussed herein.

The y-side rods 130 can be fixedly connected to, for example, pulleys at the x-belt lines 136. The belts 156 along the x-belt lines 136 can be positioned (e.g., suspended) around or about the pulleys on the y-side rods 130 that mate with corresponding teeth on the belt to move the belts 156 along the x-belt lines 136 as the y-side rods 130 are rotated, and the pulleys on the rods are correspondingly rotated. In some embodiments, the belts 156 along x-belt lines 136 can be suspended directly around or about the y-side rods 130. For example, the y-side rods 130 can be notched and corresponding teeth can mate with the notches. The belts 156 along x-belt lines 136 can be connected to the y-rod holders 126 to impart movement to the y-rod holder 126 as discussed herein. In a preferred embodiment the pulleys are GT2 profile with 2 millimeter teeth spacing and 8 millimeter bores. Other pulleys can be used to correspond to the other belts as discussed herein.

The belts 156 along the x-belt lines 136 can wrap around the y-side rods 130. The y-side rods 130 can be rotated to move the belts 156 along the x-belt lines 136. As the belts 156 move along the x-belt lines 136 substantially parallel to the x-side rods 124, the y-rod holders 126 connected to the belts 156 moves along the x-side rods 124 in the x-axis.

As illustrated in FIG. 3, two x-belt lines 136 indicate desired or possible positions for two belts 156 along the x-belt lines 136. With the two belts 156 connected to two solid rods (i.e., y-side rods 130), the movement of the two y-rod holders 126 can remain synchronized. Stated differently, when at least one of the y-side rods 130 are rotated, both of the belts 156 along x-belt lines 136 move in a synchronized manner to move both of the y-rod holders 126 in a synchronized manner in the same direction and substantially the same distance along the x-axis. Accordingly, when the belts 156 are attached to the y-rod holders 126 as discussed herein at predetermined positions along the x-axis, movement imparted to the y-rod holders 126 via the belts 156 keeps the y-rod holders 126 moving along the y-axis in a substantially synchronized manner to substantially inhibit or prevent changing the slope of the y-extrusion rod 128 in the x-y plane or the angle of the y-extrusion rod 128 relative to the x-axis or the y-axis. The y-rod holders 126 can be initially positioned and attached to the belts 156 such that the y-extrusion rod 128 is substantially parallel to the y-side rods 130 or substantially perpendicular to the x-side rods 124. As the y-rod holders 126 moves via the belts 156, the y-extrusion rod 128 maintains its relative angle (e.g., parallel or perpendicular) to the side rods 124, 130.

With continued reference to FIG. 3, y-belt lines 137 illustrate a path along which belts 156 (e.g., a toothed belt) between the x-side rods 124 can be suspended. Each y-belt line 137 illustrated in FIG. 3 can have a belt suspended along the y-belt line 137. Accordingly, two belts 156 can be suspended around the x-side rods 124 illustrated in FIG. 3. Ends of the belts 156 along the y-belt lines 137 can be connected to form a complete and continuous loop about the x-side rods 124 such that belts 156 can be continuously rotated about the x-side rods 124 as discussed herein.

The x-side rods 124 can be fixedly connected to, for example, pulleys at the y-belt lines 137. The belts 156 along the y-belt lines 137 can be positioned (e.g., suspended) around or about the pulleys on the x-side rods 124 that mate with corresponding teeth on the belt to move the belts 156 along the y-belt lines 137 as the x-side rods 124 are rotated, and the pulleys on the rods are correspondingly rotated. In some embodiments, the belts 156 along y-belt lines 137 can be suspended directly around or about the x-side rods 124. For example, the x-side rods 124 can be notched and corresponding teeth can mate with the notches. The belts 156 along y-belt lines 137 can be connected to the x-rod holders 132 to impart movement to the x-rod holders 132 as discussed herein.

The belts 156 along the y-belt lines 137 can wrap around the x-side rods 124. The x-side rods 124 can be rotated to move the belts 156 along the y-belt lines 137. As the belts 156 move along the y-belt lines 137 substantially parallel to the y-side rods 130, the x-rod holders 132 connected to the belts 156 moves along the y-side rods 130 in the y-axis.

As illustrated in FIG. 3, two y-belt lines 137 indicate desired or possible positions for two belts 156 along the y-belt lines 137. With the two belts 156 connected to two solid rods (i.e., x-side rods 124), the movement of the two x-rod holders 132 can remain synchronized. Stated differently, when at least one of the x-side rods 124 are rotated, both of the belts 156 along y-belt lines 137 move in a synchronized manner to move both of the x-rod holders 132 in a synchronized manner in the same direction and substantially a same distance along the y-axis. Accordingly, when the belts 156 are attached to the x-rod holders 132 as discussed herein at predetermined positions along the y-axis, movement imparted to the x-rod holders 132 via the belts 156 keeps the x-rod holders 132 moving along the y-axis in a substantially synchronized manner to substantially inhibit or prevent changing the slope of the x-extrusion rod 134 in the x-y plane or the angle of the x-extrusion rod 134 relative to the x-axis or the y-axis. The x-rod holders 132 can be initially positioned and attached to the belts 156 such that the x-extrusion rod 134 is substantially parallel to the x-side rods 124 or substantially perpendicular to the y-side rods 130. As the x-rod holders 132 moves via the belts 156, the x-extrusion rod 134 maintains its relative angle (e.g., parallel or perpendicular) to the side rods 124, 130.

The corner brackets 116 can house or support the side rods 124, 130 as discussed herein. In some embodiments, the corner brackets 116 operatively connect to the side rods 124, 130 as illustrated in FIG. 3. The corner brackets 116 can have bearings positioned in the corner brackets at predetermined locations to position and level the side rods 124, 130 in the x-y plane as discussed herein. The bearings can allow rotational movement of the side rods 124, 130 while maintaining the desired or predetermined position of the side rods 124, 130. As illustrated in FIG. 3, the brackets 116 and bearings supported by the brackets can be configured for at least one of the ends of the of side rods 124, 130 to protrude or extend past a wall of the corner bracket 116 into an opening or cavity 138 of a corner bracket 116. The opening 138 of the corner bracket 116 can house a motor. The motor can be operatively connected to or mated with an end 140 of the x-side rod 124. The motor can be configured to rotate the x-side rod 124 according to signals received from a computer controller to build a 3D object as discussed herein. Similarly, another motor can be housed in a bracket 116 to rotate a y-side rod 130 according to signals received from a computer controller to build a 3D object as discussed herein. In some embodiments, the stepper motors are coupled to the x-side and y-side rods 124, 130 with flexible couplings to help account for misalignment. The stepper motors used can be 200 step per revolution stepper motors. In some embodiments, the stepper motors in the x-y plane and for the feeder assemblies 114 may be Kysan 1124090 motors and for z-axis may be Kysan 1124062 for a lower profile assembly.

As illustrated in FIG. 3, the extrusion assembly 112 can be connected to the side rods 124, 130. The connection between the extrusion assembly 112 and the side rods 124, 130 can allow for the linear translation or sliding of the extrusion assembly 112 on the side rods 124, 130. Accordingly, when the y-extrusion rod 128 is moved along the y-axis as discussed herein, the y-extrusion rod 128 moves the extrusion assembly 112 along the y-axis with the extrusion assembly 112 linearly translating or sliding on the x-extrusion rod 134 (e.g., guided along the x-extrusion rod 134). When the x-extrusion rod 134 is moved along the x-axis as discussed herein, the x-extrusion rod 134 moves the extrusion assembly 112 along the x-axis with the extrusion assembly 112 linearly translating or sliding on the y-extrusion rod 128 (e.g., guided along the y-extrusion rod 128). The extrusion rods 128, 134 can be moved along the x-y plane to correspondingly move the extrusion assembly 112 along the x-y plane while the extrusion assembly 112 places roads of material as needed to build the 3D object. For example, the consumable materials are heated and then deposited onto the bed 110 to build the 3D object using layer-based additive manufacturing as discussed herein.

Figure 4:
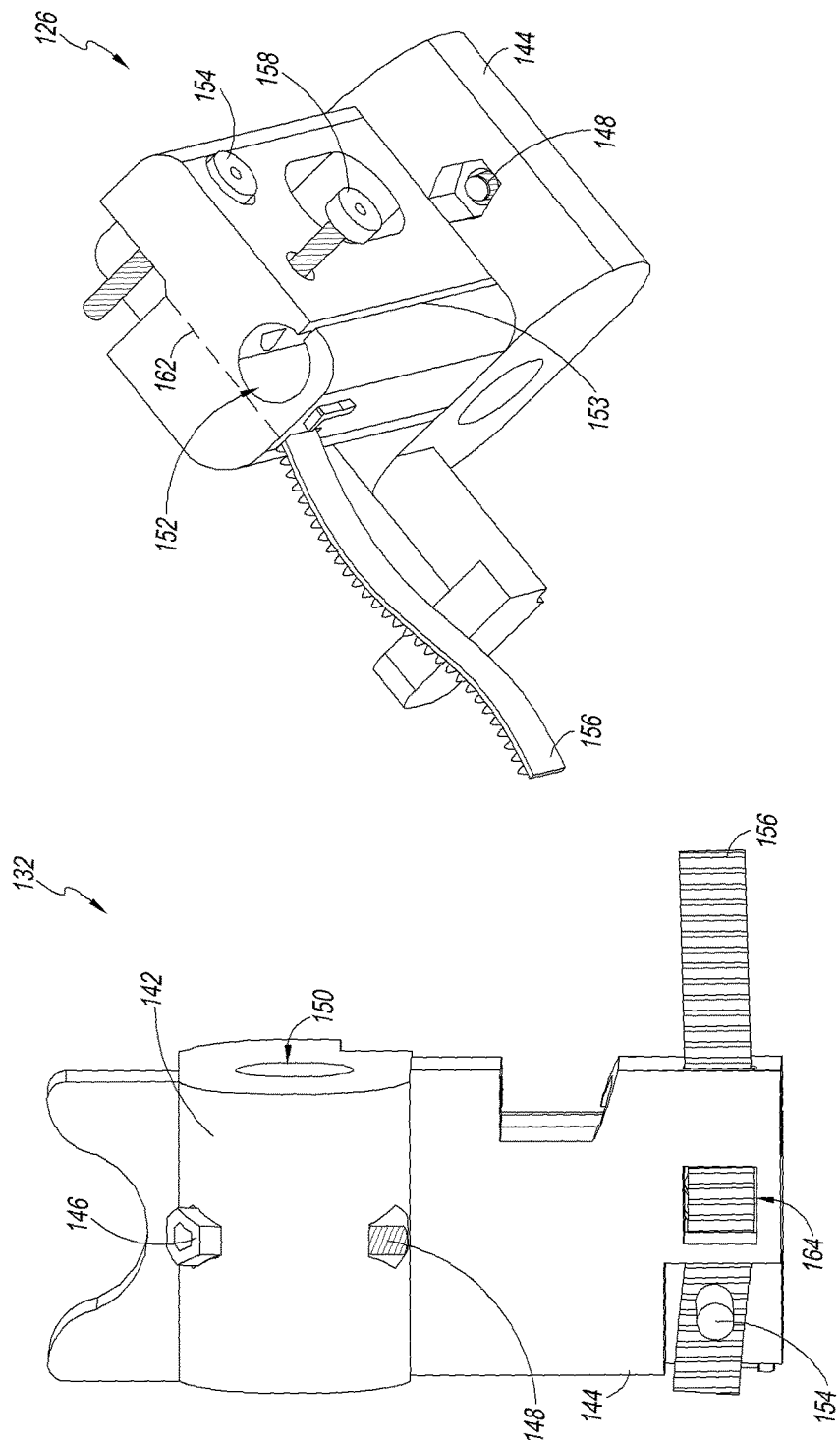
FIG. 4 illustrates views of embodiments of rod holders 126.

FIG. 4 illustrates views of embodiments of a y-rod holder 126 and an x-rod holder 132. As illustrated in FIG. 4, the holders 126, 132 can be made or assembled from an outer holder bracket 142 and an inner holder bracket 144. The outer holder bracket 142 and inner holder bracket 144 can be connected together via a bolt 146 and a nut assembly 148. When connected or assembled, the holder brackets 142, 144 can form a side-rod opening 150 through which side rods 124, 130 project through or pass through to guide the holders 126, 132 as discussed herein.

The inner holder bracket 144 can have an extrusion-rod opening 152. The extrusion-rod openings 152 can connect to and house the extrusion rods 128, 134 as discussed herein. For example, as illustrated in FIG. 3, the y-extrusion rod 128 can be connected to or between two y-rod holders 126 via extrusion-rod openings 152. Accordingly, when the y-rod holders 126 are moved as discussed herein, the y-extrusion rod 128 is moved. Similarly, the x-extrusion rod 134 can be connected to or between two x-rod holders 132 via extrusion-rod openings 152. Accordingly, when the x-rod holders 132 are moved as discussed herein, the x-extrusion rod 134 is moved.

The extrusion-rod openings 152 can be sized to connect to, mate with, or secure the extrusion rods 128, 134 via a friction fit between the extrusion-rod openings 152 and the extrusion rods 128, 134. In some embodiments, the extrusion-rod openings 152 can be sized to connect to, mate with, or secure the extrusion rods 128, 134 using any suitable connection mechanism, such as, for example, interference fit mechanisms, snap fit mechanisms, and/or the like, which can include using male and female mating parts (e.g., tongue-and-groove corresponding parts). As illustrated in FIG. 3, when the extrusion rods 128, 134 are connected to rod holders 126, 132, the extrusion rods 128, 134 are securely connected within the extrusion guide assembly 118 to move the extrusion assembly 112 as discussed herein. The slotted opening or channel 153 in the rod holders 126, 132 permits the extrusion-rod opening 152 to expand slightly and firmly retain a rod (e.g., friction or interference fit) upon insertion.

Figure 5:
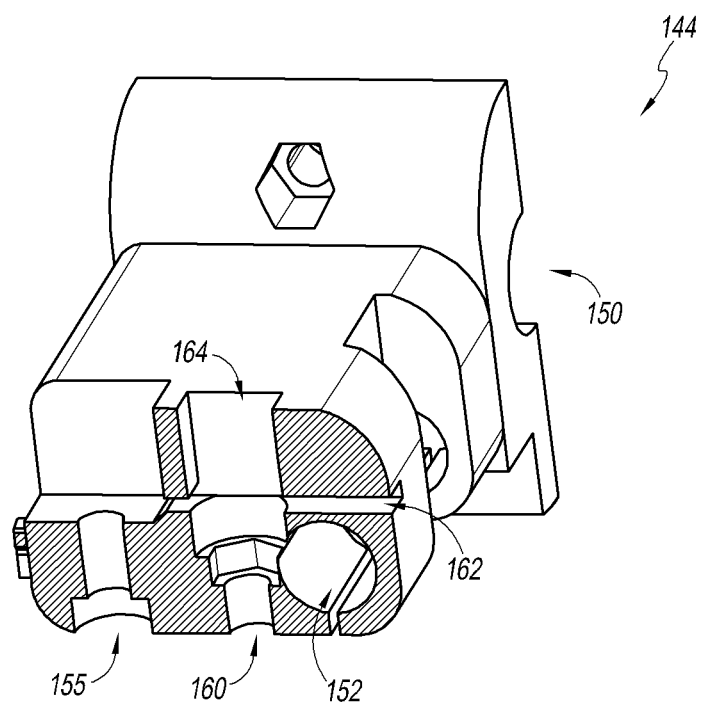
FIG. 5 illustrates a side, top, perspective cross-sectional view of an embodiment of an inner holder bracket.

FIG. 5 illustrates a side, top, perspective cross-sectional view of an embodiment of an inner holder bracket 144. With reference to FIGS. 4 and 5, the inner holder brackets 144 can accept a fixing bolt 154 through a fixing opening 155. The fixing bolt 154 can pass through a predetermined position of the inner holder bracket 144 (e.g., the fixing opening 155 that is, for example, threaded) as well as a belt 156 (e.g., belts 156 positioned along the belt lines 136,137) to fix the belt 156 relative to the inner holder bracket 144. Accordingly, when the extrusion guide assembly 118 is assembled, the belts 156 can be fixedly secured to the rod holders 126, 132. With such an arrangement, the belts 156 remain fixed or do not slip relative to the rod holders 126, 132 when the belts 156 are moved by the side rods 124, 130 as discussed herein. The belts 156 may be secured to the holder brackets 126, 132 with any other suitable mechanism that fixes the belts 156 at a desired or predetermined position relative to the holder brackets 126, 132.

The inner holder brackets 144 can accept tightening bolts 158 through a tightening opening 160. A tightening bolt 158 can be turned in the tightening opening 160 that is, for example, threaded to adjust the tension of the belts 156. As illustrated in FIGS. 4 and 5, a belt 156 can pass through a guide path 162 (e.g., an opening along a direction of the belt lines 136, 137 discussed herein). Along the guide path 160, the inner holder brackets 144 can have a tension opening 164 that aligns along with the tightening opening 160. As the tightening bolt 158 is turned in the tightening opening 160, the tightening bolt 158 moves in and out of the tension opening 164.

As illustrated in FIG. 4, the tightening bolt 158 does not pass through the belt 156. As the tightening bolt 158 moves into the tensioning opening 164, the belt 156 is pushed into the tensioning opening 164 (e.g., to form a bulge of belt material in the tensioning opening 164). When the belt 156 is pushed into the tensioning opening 164, the length of the belt 156 along one of the belt lines 136, 137 is shortened, increasing the tension of the belt 156 about one of the side rods 124, 130. When the tightening bolt 158 moves out of the tensioning opening 164, the material of the belt 156 that may be in the tensioning opening 164 can move out of the tensioning opening 164 to increase the length of the of the belt 156 along one of the belt lines 136, 137, decreasing the tension of the belt 156 about one of the side rods 124, 130. Accordingly, the tension of the belts 156 about the belt lines 136, 137 can be adjusted to a desired or predetermined tension about the side rods 124, 130. In some embodiments, other suitable mechanisms may be used to adjust the tension of the belts 156 about the side rods 124, 130, such as, for example, crimping, twisting, bending along a predetermined path, or the like, of the belts 156.

FIGS. 6A and 6B illustrate an outer holder bracket 142 of one of the rod holders 126, 132 and a bearing 166. As illustrated in FIG. 6B, the bearing 166 can be positioned in the side-rod opening 150. The bearing 166 can be configured to linearly translate or slide along the side rods 124, 130 to allow for movement of the rod holders 126, 132 as discussed herein. Further, the bearing 166 can be configured to allow for the rotational movement of the side rods 124, 130 to move the belts 156 as discussed herein. In some embodiments, the bearing 166 can be a linear bearing with a friction-reducing 8 millimeter inner bore such as those made by PBC Linear (FJC08) and IGUS. The bearing should be suitable for slight misalignment between the rods to account for variances in machine dimensions and environmental factors.

The bearing 166 can have ribs 168 (e.g., circular ribs or O-rings) that circumscribe or partially circumscribe the bearing 166. The side-rod opening 150 can be sized to engage or mate with the bearing 166 in a substantially fixed position relative to the rod holders 126, 132. As illustrated in FIGS. 6A and 6B, the side-rod opening 150 can be sized to engage or mate with the ribs 168 of the bearing 166. Further, the side-rod opening 150 can have flanges 170 that extend inwardly into the side-rod opening 150. The flanges 170 can be sized to inhibit or prevent movement of the bearing 166 from the side-rod opening 150 when the assembled rod holders 126, 132 are moving along the side rods 124, 130 as discussed herein. In some embodiments, the ribs 168 are made from thermoplastic elastomer (TPE).

Figure 8:
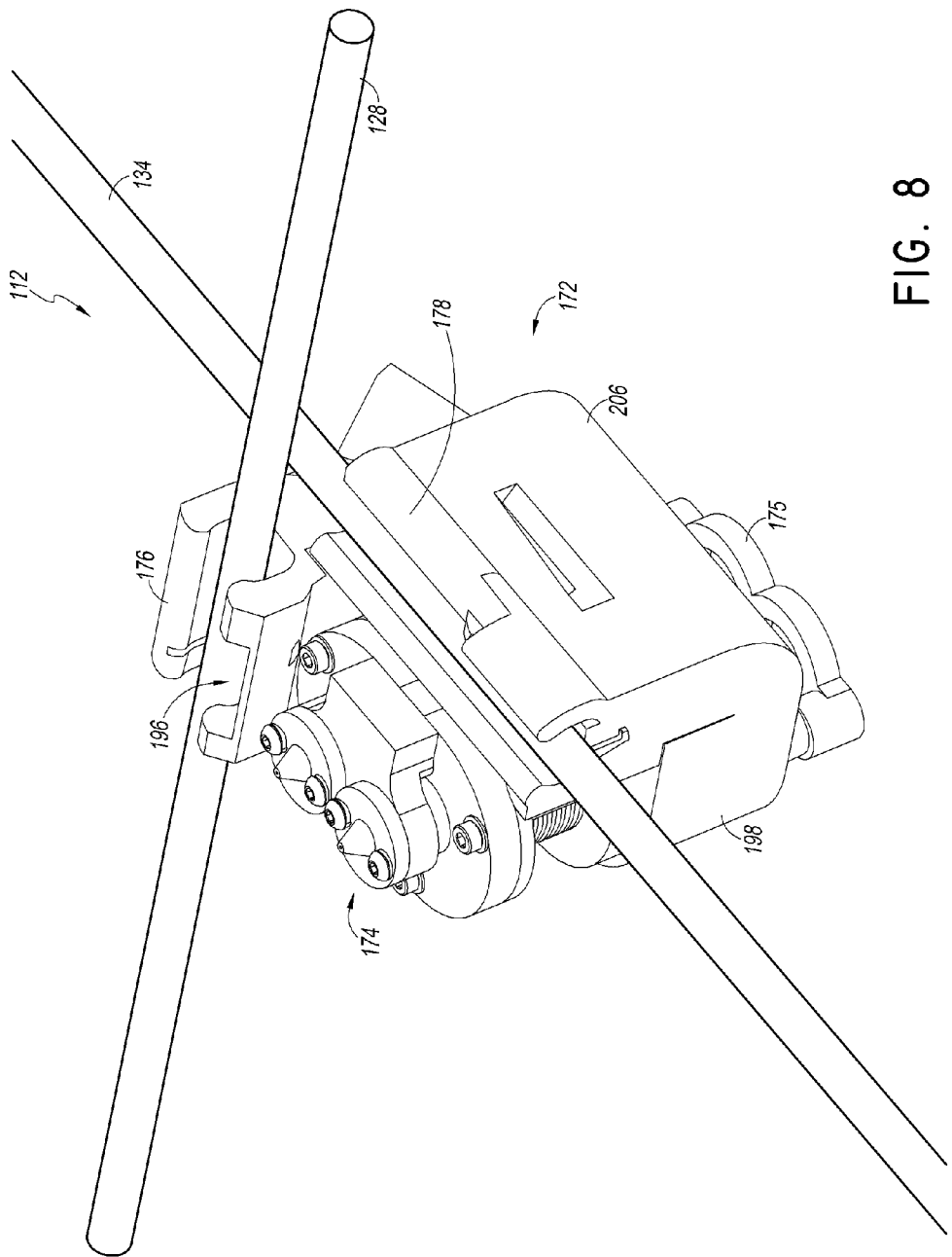
FIGS. 8 and 9 illustrate side, bottom, perspective views of an embodiment of an extrusion assembly.
Figure 9:
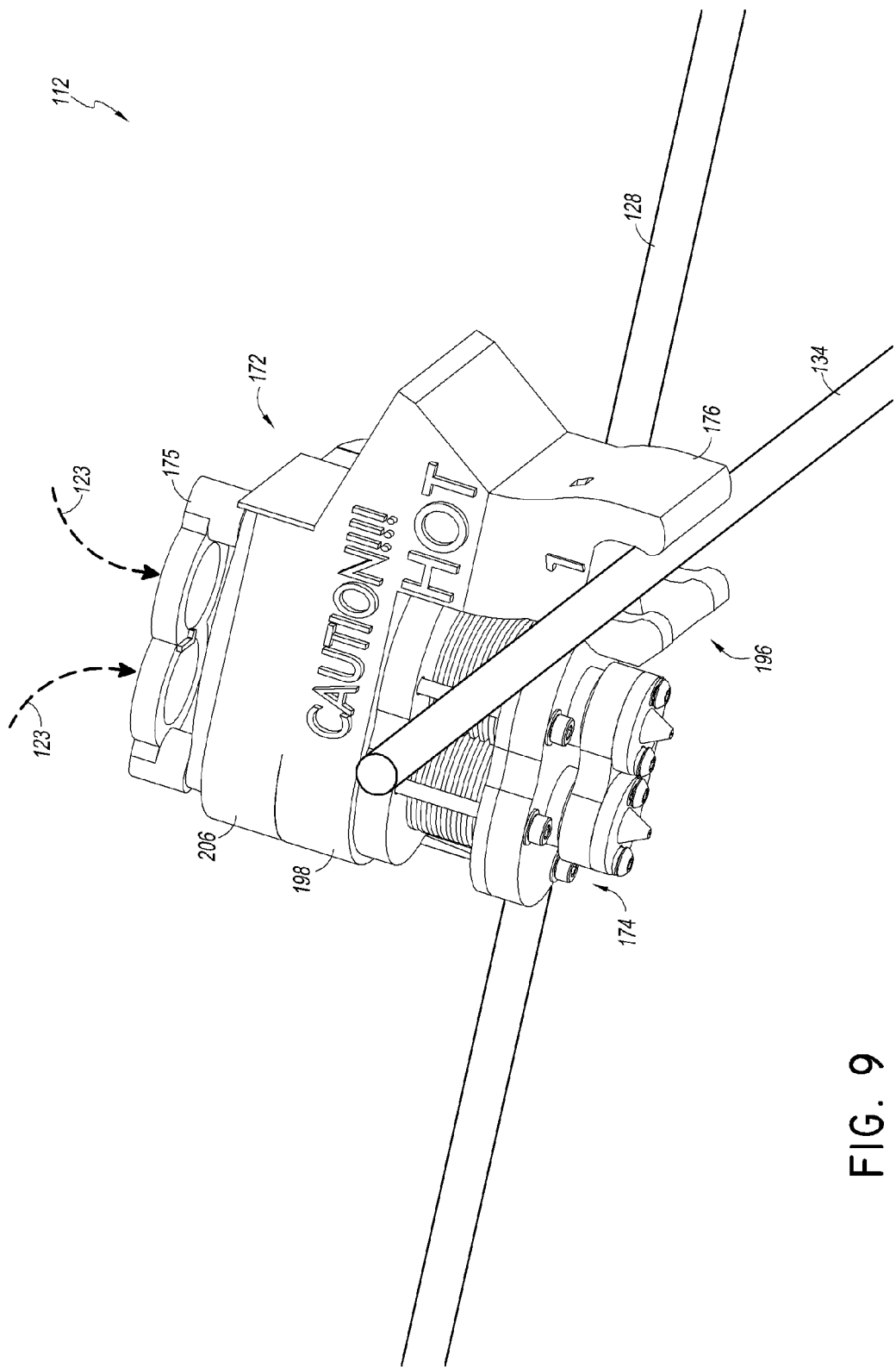

FIG. 7 illustrates a side, top, perspective view of an embodiment of the extrusion assembly 112. FIG. 8 illustrates a side, bottom, perspective view of an embodiment of the extrusion assembly 112. FIG. 9 also illustrates a side, bottom, perspective view of an embodiment of the extrusion assembly 112.

As illustrated in FIGS. 7-9, the extrusion assembly 112 can include an extrusion housing 172 supporting a hot end assembly 174 for heating and extruding consumable material to build a 3D object. The extrusion housing can be made from any material that has a desired weight (e.g., relative light weight) as well as exhibiting desired or predetermined mechanical and thermal properties to move and support the extrusion assembly 112 without deformation at elevated temperatures as discussed herein. Suitable materials can include thermoplastics as discussed herein, including ABS. In higher heat applications as discussed herein (e.g., above 260 degrees Celsius), polycarbonate materials can be used that exhibit the desired or predetermined mechanical and thermal properties to move and support the extrusion assembly 112 without deformation at the further elevated temperatures as discussed herein.

The extrusion housing 172 can have a feed bracket 175. The feed bracket 175 can connect, engage, mate with, or attach to other components of the extrusion housing 172 (e.g., y-housing bracket 206 as discussed herein). The feed bracket 175 can attach to extrusion housing 172 via a nut and bolt assembly. Other suitable attachment mechanisms can be used alternatively or in combination, including interference fit mechanisms, snap fit mechanisms, and/or the like, which can include using male and female mating parts (e.g., tongue-and-groove corresponding parts). The feed bracket 175 can, for example, engage flanges, nuts, or other protruding components on ends tubes or conduits positioned along the feed lines 123 as discussed herein. Accordingly, the feed bracket 175 can maintain a connection between the tubes along the feed lines 123 delivering consumable material to the hot end assembly 174 while the extrusion assembly 112 is moved to print a 3D object as discussed herein. In some embodiments, the feed bracket 175 retains two push-to-connect fittings sized to retain the tubes.

As discussed herein, the extrusion assembly 112 can be positioned on a y-extrusion rod 128 and on an x-extrusion rod 134. The extrusion housing 172 can include an x-rod clamp 176 that connects to, engages, and/or mates with the x-extrusion rod 134 to move the extrusion assembly 112 in the y-axis while allowing for the x-rod clamp 176 to linearly translate or slide on the x-extrusion rod 134 when the extrusion assembly 112 is moved in the x-axis. The extrusion housing 172 can also include a y-rod clamp 178 that connects to, engages, and/or mates with the y-extrusion rod 128 to move the extrusion assembly 112 in the x-axis while allowing for the y-rod clamp 178 to linearly translate or slide on the y-extrusion rod 128 when the extrusion assembly 112 is moved in the y-axis.

Figure 10:
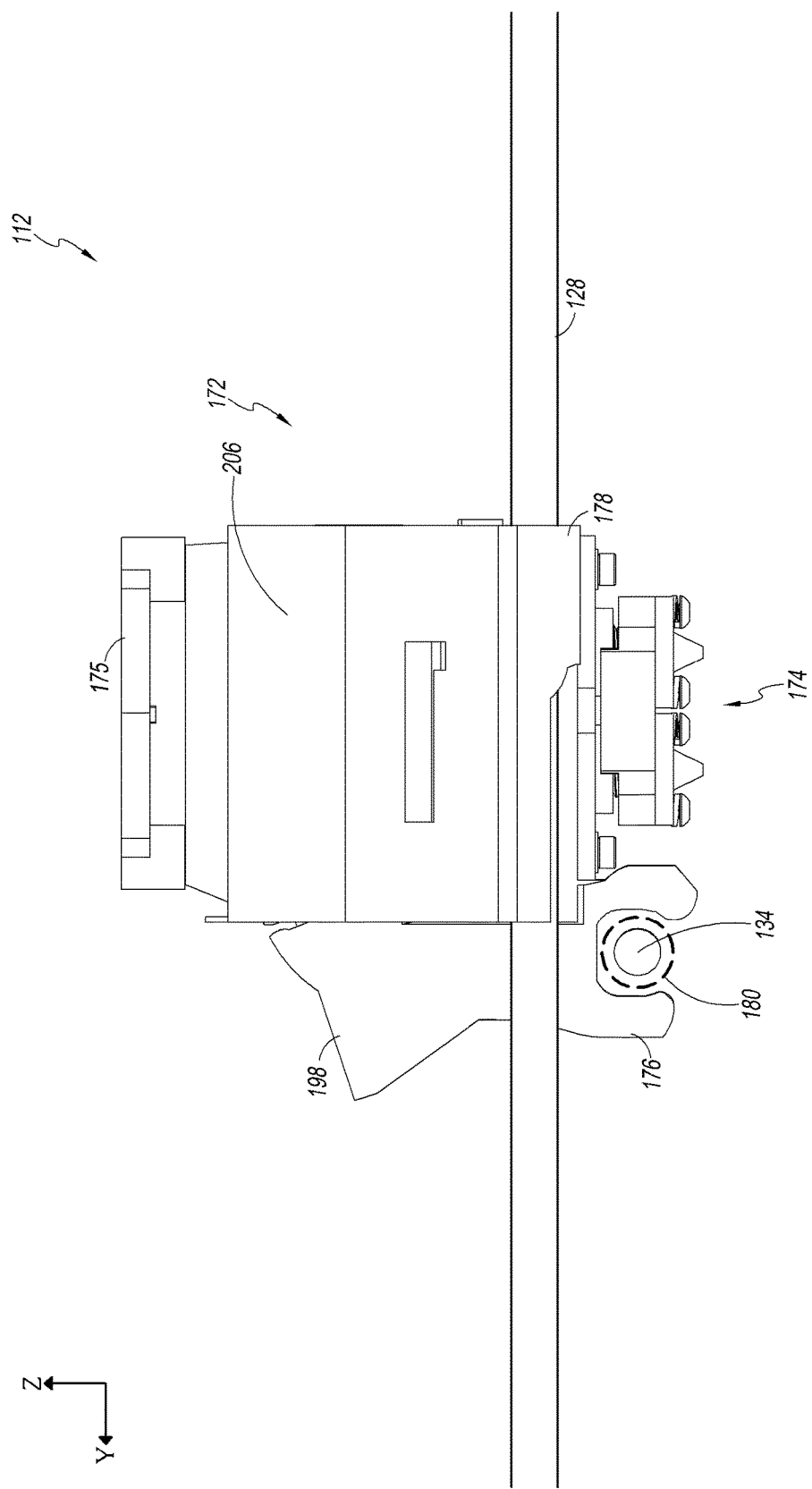
FIG. 10 illustrates a side view of an embodiment of an extrusion assembly.

FIG. 10 illustrates a side view of an embodiment of an extrusion assembly 112. As illustrated in FIG. 10, the x-rod clamp 176 can be sized to be larger than an outer diameter of the x-extrusion rod 134. The x-rod clamp 176 can be sized to accept, engage, mate with, or connect to a bearing 180. The bearing 180 can be configured to securely engage the x-extrusion rod 134 while allowing linear translation or sliding of the bearing 180 on the x-extrusion rod 134. Secure engagement to the x-extrusion rod 134 can include maintaining or substantially maintaining a desired level of the extrusion assembly 112 in the x-y plane (e.g., the extrusion assembly does not wobble, change slope or angle, in the x-z plane). Correspondingly, the engagement of the x-rod clamp 176 to the bearing 180 can include maintaining or substantially maintaining a desired level of the extrusion assembly 112 in the x-y plane (e.g., the extrusion assembly does not wobble, change slope or angle, in the x-z plane). The x-rod clamp 176 can be sized and shaped such that the extrusion housing 172 can be engaged with and removed from the x-extrusion rod 134 without requiring disassembly or adjustment of any parts of the x-rod clamp 176 and extrusion housing 172. In some embodiments, the bearing 180 is an LM8LUU linear ball bearing.

Figure 11:
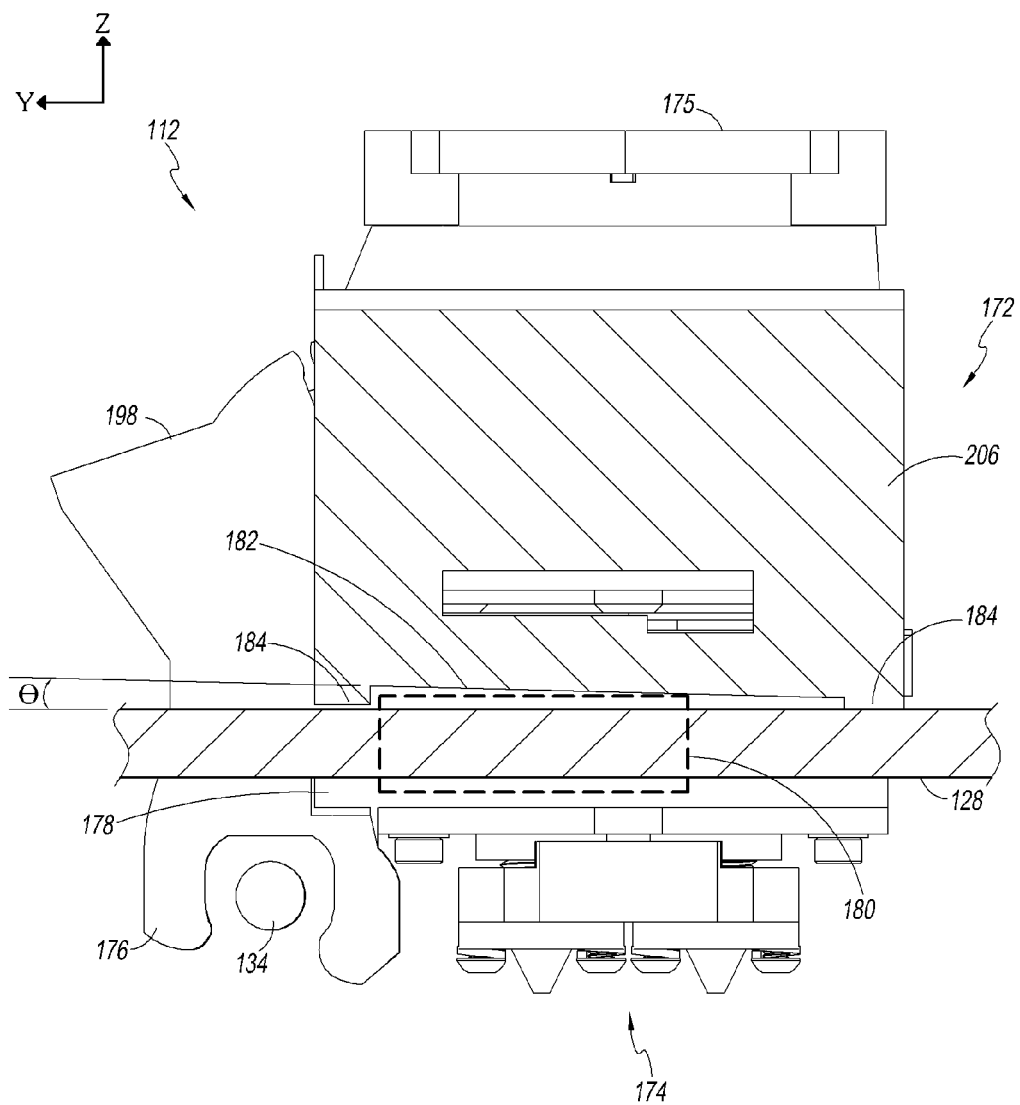
FIGS. 11 and 12 illustrate side cross-sectional views of an embodiment of an extrusion assembly.

FIG. 11 illustrates a side cross-sectional view of an embodiment of an extrusion assembly 112. As illustrated in FIG. 11, the y-rod clamp 178 can be sized to be larger than an outer diameter of the y-extrusion rod 128. The y-rod clamp 178 can be sized to accept, engage, mate with, or connect to a bearing 180. The bearing 180 can be the bearing 166 as discussed in reference to FIG. 10. The bearing 180 can be configured to securely engage the y-extrusion rod 128 while allowing linear translation or sliding of the bearing 180 on the y-extrusion rod 128. Secure engagement to the y-extrusion rod 128 can include maintaining or substantially maintaining a desired level of the extrusion assembly 112 in the x-y plane (e.g., the extrusion assembly does not wobble, change slope or angle, in the y-z plane). Correspondingly, the engagement of the y-rod clamp 178 to the bearing 180 can include maintaining or substantially maintaining a desired level of the extrusion assembly 112 in the x-y plane (e.g., the extrusion assembly does not wobble, change slope or angle, in the y-z plane). The y-rod clamp 178 can be sized and shaped such that the extrusion housing 172 can be engaged with and removed from the y-extrusion rod 128 without requiring disassembly or adjustment of any parts of the y-rod clamp 178 and extrusion housing 172.

The x-rod clamp 175 and the y-rod clamp 178 desirably inhibit or substantially prevent the hot end assembly 174 from shifting relative on the extrusion rods 128, 134 to attain such high-resolution features in the 3D object. The hot end assembly 174 prevents unintentional shifting of print heads relative to, for example, the extrusion housing 172, in the horizontal x-y plane. Otherwise, even small amounts of unintentional shifting in the horizontal x-y plane or in the z-axis may result in deposition road errors in the formed layers of 3D object.

With continued reference to FIG. 11, the y-rod clamp 178 can have an inner wall 182 (e.g., a leveling wall or surface) that is at angle θ (e.g., sloped in the y-z plane). The y-rod clamp 178 can be sized and shaped such that the bearing 180 is less in length (e.g., longitudinal length) along the y-axis than the y-rod clamp 178. Accordingly, the position of the y-rod clamp 178 can be adjusted on the on the bearing 180. The angle θ or slope of the extrusion assembly 112 in the y-z plane can be adjusted by adjusting the position of the y-rod clamp 178 on the bearing, and accordingly, the level of the extrusion assembly 112 in the x-y plane can be adjusted. Stated differently, by moving the extrusion assembly 112 (e.g., extrusion housing 172) along the y-axis to determine a relative position of the y-rod clamp 178 and bearing 180, the angle or slope of the extrusion assembly 112 (e.g., level or tilt) in the y-z plane changes depending on where the bearing 180 contacts, engages, or mates with the inner wall 182 (e.g., at a desired contact point to impart a desired level to the extrusion housing 172 along the y-axis). For example, if the extrusion housing 172 is moved in the positive y-axis direction (e.g., to the left as illustrated in FIG. 11), the bearing 180 contacts the inner wall 182 at a point that has less distance along the z-axis between the inner wall 182 and the y-extrusion rod 128. Accordingly, the extrusion housing 172 tilt decreases upwardly, and the angle θ or slope of the extrusion housing 172 increases in the y-z plane. If the extrusion housing 172 is moved in the negative y-axis direction (e.g., to the right as illustrated in FIG. 11), the bearing 180 contacts the inner wall 182 at a point that has more distance along the z-axis between the inner wall 182 and the y-extrusion rod 128. Accordingly, the extrusion housing 172 tilt decreases downwardly, and the angle θ or slope of the extrusion housing 172 decreases in the y-z plane. In some embodiments, a similar arrangement of an inner wall having an angle θ can be used with the x-rod clamp 176.

The arrangement of the inner wall 182 of the y-rod clamp 178 having an angle θ can allow for level adjustment of the hot end assembly 174 (e.g., a leveling mechanism for the hot end assembly 174). In particular, an angle θ of dual nozzles 214 of a hot end assembly 174 as discussed herein can be adjusted in the y-z plane. As desired or needed, the level of the dual nozzles 214 in the x-y plane can be adjusted by moving the extrusion housing 172 on the bearing 180 as discussed herein without requiring disassembly or adjustment of components of the extrusion assembly 112. The extrusion housing 172 may be simply removed from the y-extrusion rod 128 (and x-extrusion rod 134 if needed) by disengaging the y-rod clamp 178, shifting the extrusion housing in the y-axis to achieve a desired level or angle θ, and reengaging the y-rod clamp 178 with the y-extrusion rod 128. Accordingly, the level of the dual nozzles 214 can be adjusted in the x-y plane to help ensure a substantially same level of the dual nozzles 214 above the bed 110 to help ensure a proper build of the 3D object without, for example, one of the dual nozzles 214 being too vertically distant (e.g., in the z-axis) from the 3D object or one of the dual nozzles 214 pressing into the 3D object while printing. In some embodiments, rather than a slope, or in connection with a slope, the y-rod clamp 178 can have ridges or stair steps at one or both ends of the y-rod clamp 178. Accordingly, the extrusion housing can be slid about the bearing 180 to make minor adjustment to angle θ within a certain amount of fore and aft movement similar to above. However, at the ends of the y-rod clamp 178, the ridges can provide a greater range of adjustment (e.g., leveling) to make more substantial changes to the angle θ.

Figure 12:
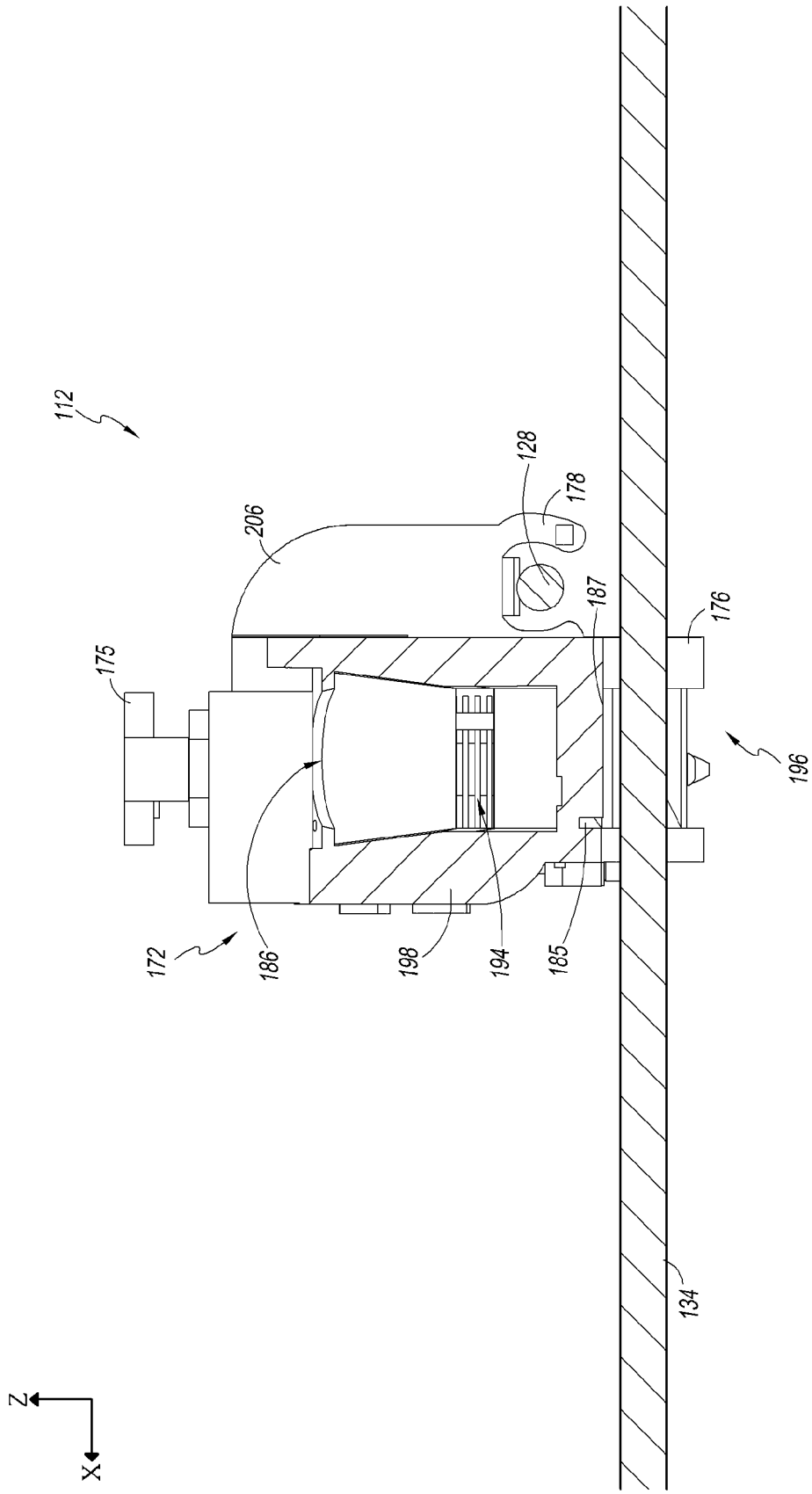

FIG. 12 illustrates a side cross-sectional view of an embodiment of an extrusion assembly 112. As illustrated in FIG. 12, the rod clamps can utilize another bearing retention mechanism. For example, x-rod clamp 176 can have a retention notch or cutout 185. The retention notch 185 can be configured to connect, engage, or mate with a protruding component or rib of a bearing. The notch 185 can be configured to engage a retaining ring fastened to the bearing to retain at a desired or predetermined position of the bearing relative to the extrusion housing 178.

As illustrated in FIG. 12, the x-rod clamp 176 can have a level wall 187 that is substantially level or extends parallel to a central axis of the x-extrusion rod 134. Accordingly, when the x-rod clamp 176 connects, engages, or mates the x-extrusion rod 134 (or a bearing as discussed herein such as for example, bearing 180), the extrusion housing 172 can remain at substantially a same level, angle, or tilt relative to the x-extrusion rod 134 in the x-z plane.

Figure 13:
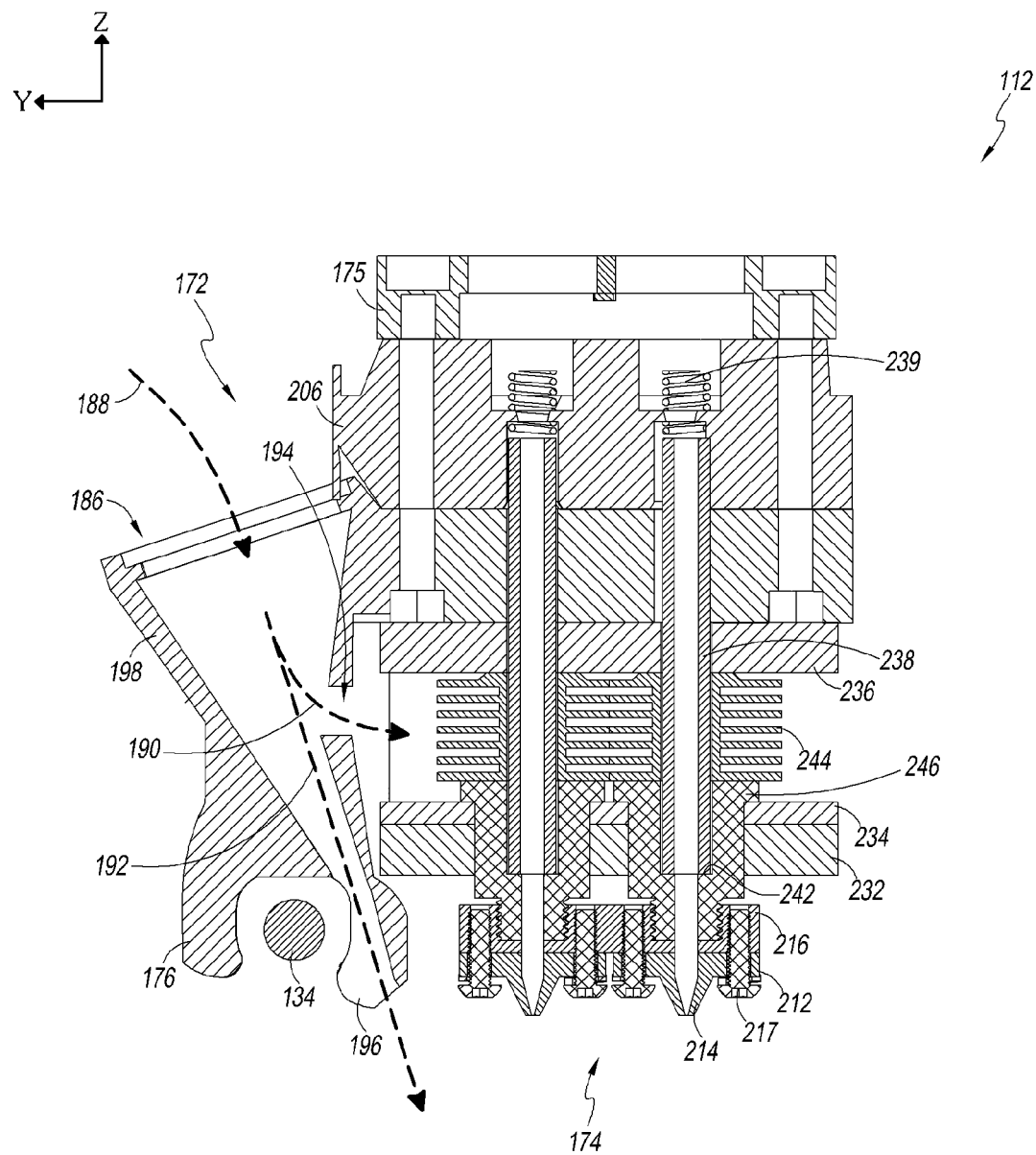
FIG. 13 is a side cross-sectional view of an embodiment of an extrusion assembly.

FIG. 13 is a side cross-sectional view of an embodiment of an extrusion assembly 112. With reference to FIGS. 7 and 12, the extrusion housing 172 can have a vent opening 186. The vent opening 186 can provide airflow or other cooling medium flow to cool the hot end assembly 174 and 3D objecting during operation of the printer 102. The vent opening 186 can accommodate a fluid moving device such as, for example, a blower or fan that can be mounted on, at, or near vent opening 186 to provide cooling through forced convection.

As illustrated in FIG. 13 and with reference to FIGS. 8 and 9, the extrusion housing 172 can have openings and conduits (e.g., flow conduits or channels) to provide fluid paths along fluid cooling lines 188, 190, 192. The fluid cooling line 188 indicates a possible fluid path through the vent opening 186. The fluid cooling line 188 passes through an area for mounting a fan. The fluid cooling line 190 passes through a heat exchanger opening 194. The heat exchanger opening 194 can provide a fluid path to the hot end assembly 174 to provide cooling to the hot end assembly 174 as discussed herein. The fluid cooling 192 pass through a clamp cutout 196 formed in x-rod clamp 176. The clamp cutout 194 can provide a fluid path to an end or periphery of the extrusion housing 172 to, at, or nearby a 3D object being printed to provide cooling to the 3D object.

Accordingly, openings or cutouts 186, 194, 196 providing fluid cooling lines 188, 190, 192 along with fluid moving device are configured to create and direct air flows into hot end assembly 174. The forced fluid (e.g., air) flows to cool the internal components of hot end assembly 174 and prevent or inhibit the consumable materials from prematurely melting as discussed herein. In some instances it may be preferable to block off cooling line 192 so that the fluid path from a fan is directed continuously through path 190 to cool the upper component of the hot end assembly. This may be preferable when printing with ABS which, when printing with two nozzles, tends to drip less from the non-active nozzle 214 when the upper or upstream components of the hot end assembly 174 are cooled. However, path 192 may not be desirable as ABS tends to have stronger layer-to-layer adhesion without active cooling on the printed surface of the 3D object. In some embodiments, other types of cooling mechanisms and arrangements may be used, which may be fan-based units or non-fan-based units (e.g., refrigeration-based units).

Figure 14:
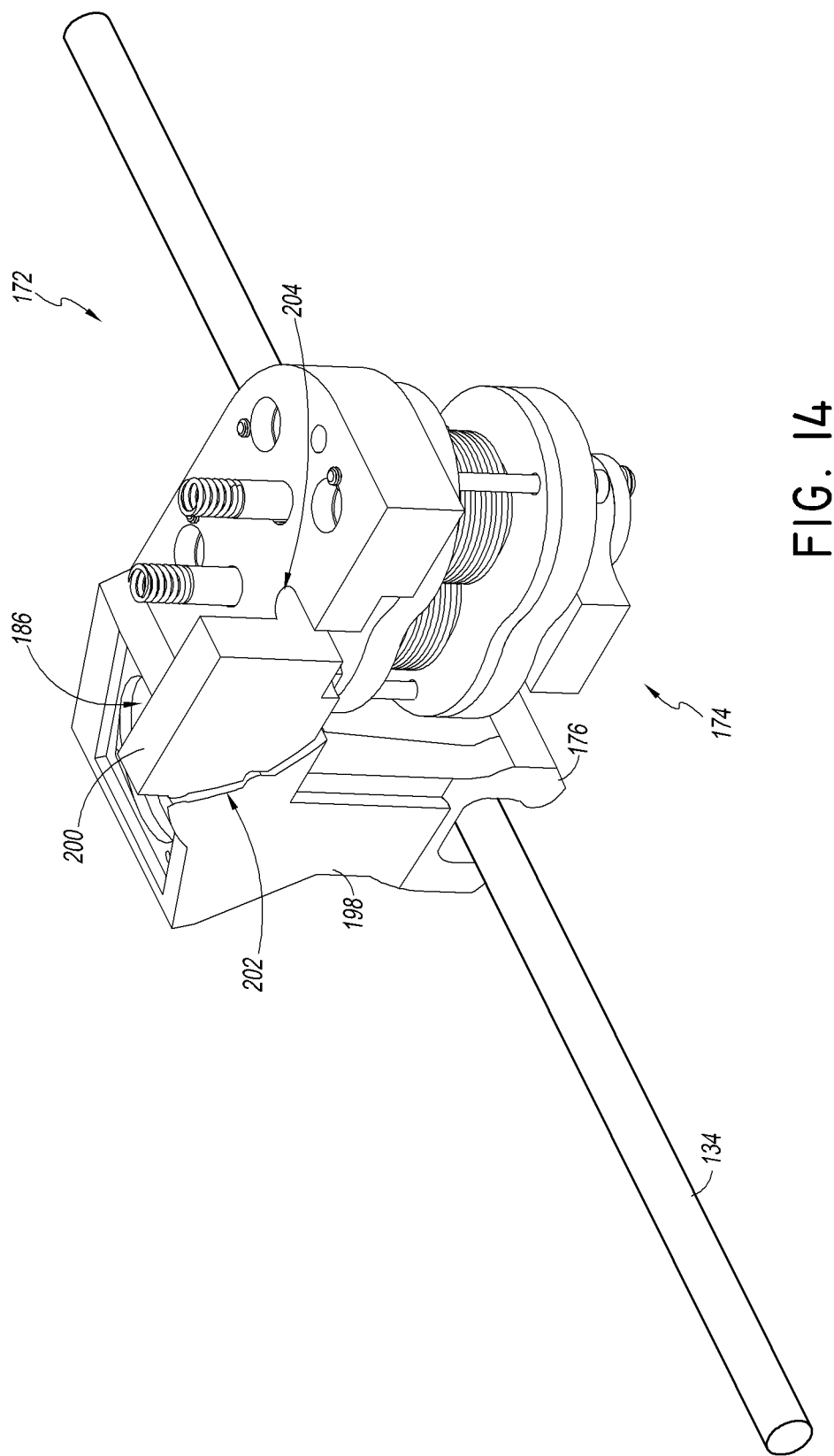
FIGS. 14 and 15 illustrate side, top perspective views of an embodiment of a bracket of an extrusion housing.

FIG. 14 illustrates a side, top perspective view of an embodiment of an x-housing bracket 198 of an extrusion housing 172. The x-housing bracket 198 can form a part of the extrusion housing 172. The x-housing bracket 198 can include the x-rod clamp 176 to engage the x-extrusion rod 134 as discussed herein. The x-housing bracket 198 can have a connecting rib or projection 200. The connecting rib 200 can be sized and positioned to connect to, engage, or mate with connecting notch 185 of the y-housing bracket 206 as discussed herein.

As illustrated in FIG. 14, the x-housing bracket 198 can have a fan wire conduit 202 to accommodate and position wires to power, for example, a fan positioned in the vent opening 186 as discussed herein. The x-housing bracket 198 can also have a wire conduit 204 to accommodate and position wires for the hot end assembly 174 and the fan in the vent opening 186. The wire conduit 204 can be sized and positioned such that when the x-housing bracket 198 is assembled with the y-housing bracket 206 as discussed herein, the opening or conduit formed by the wire conduit 204 remains sufficiently open or not obtruded for power and sensor wires to pass through wire conduit 204 as needed. Further, the x-housing bracket 198 can also have other openings to accommodate components of the hot end 178 as discussed herein, as well as openings to fixedly secure the hot end 178 to the extrusion housing 172 (e.g., x-housing bracket 198) via, for example, a nut and bolt assembly.

Figure 15:
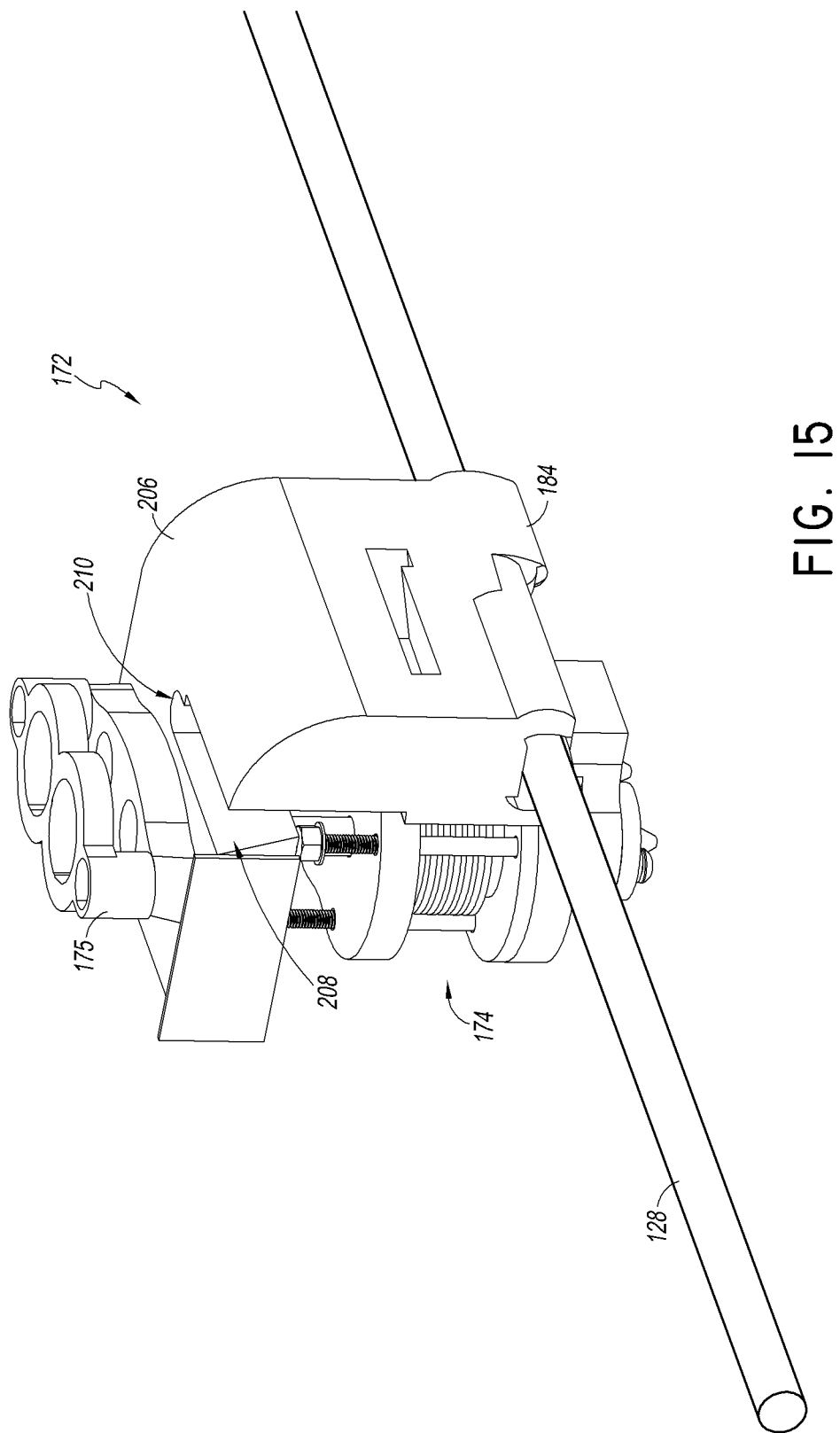

FIG. 15 illustrates a side, top perspective view of an embodiment of a y-housing bracket 206 of an extrusion housing 172. The y-housing bracket 206 can form a part of the extrusion housing 172. The y-housing bracket 206 can include the y-rod clamp 184 to engage the y-extrusion rod 128 as discussed herein. The y-housing bracket 206 can have a connecting cutout or conduit 208. The connecting cutout 208 can be sized and positioned to connect to, engage, or mate with connecting rib 200 of the x-housing bracket 198. For example, when the x-housing bracket 198 and the y-housing bracket 206 are assembled to at least form a part of the extrusion housing 172, the connecting rib 200 can move into or slide into the connecting cutout 208 to securely engage the x-housing bracket 198 and the y-housing bracket 206. Suitable attachment mechanisms between the connecting rib 200 and the connecting cutout 208 can be interference fit mechanisms, snap fit mechanisms, and/or the like, which can include using male and female mating parts (e.g., tongue-and-groove corresponding parts).

The y-housing bracket 206 can also have a wire conduit 210 to accommodate and position wires for the hot end assembly 174 and the fan in the vent opening 186. The wire conduit 210 can be sized and positioned such that when the y-housing bracket 206 is assembled with the x-housing bracket 198, the opening or conduit formed by the wire conduit 210 remains sufficiently open or not obtruded and corresponds to wire conduit 204 for power and sensor wires to pass through wire conduit 204, 210 as needed. Further, the y-housing bracket 206 can also have other openings to accommodate components of the hot end 178 as discussed herein, as well as openings to fixedly secure the hot end 178 to the extrusion housing 172 via, for example, a nut and bolt assembly. Similarly, the y-housing bracket 206 can also have further openings to fixedly secure the feed bracket 175 via, for example, a nut and bolt assembly.

Figure 16:
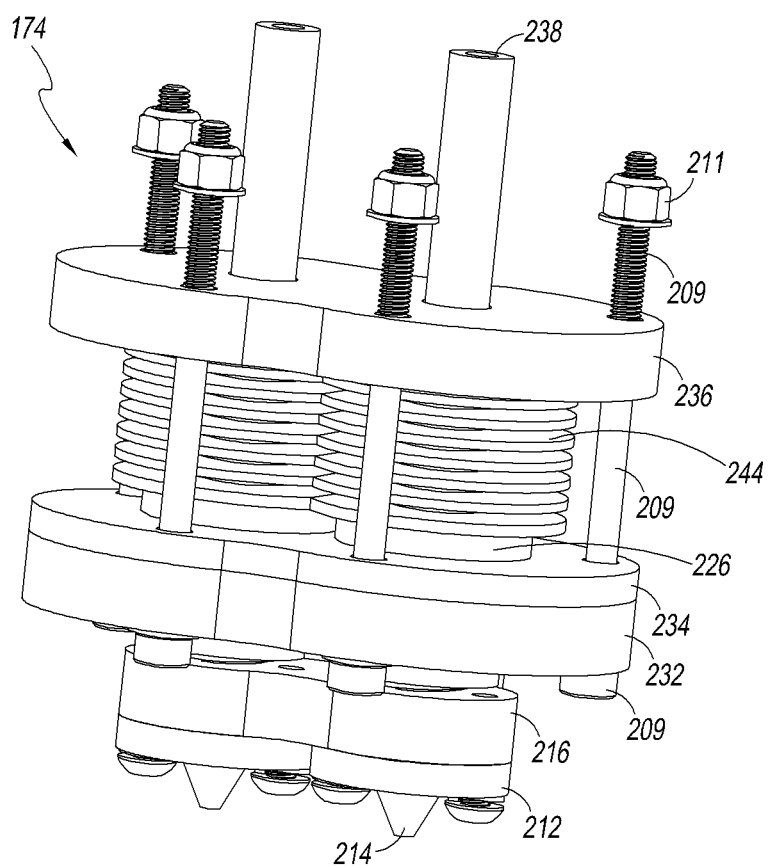
FIG. 16 illustrates a side, top, perspective view of an embodiment of a hot end assembly.
Figure 17:
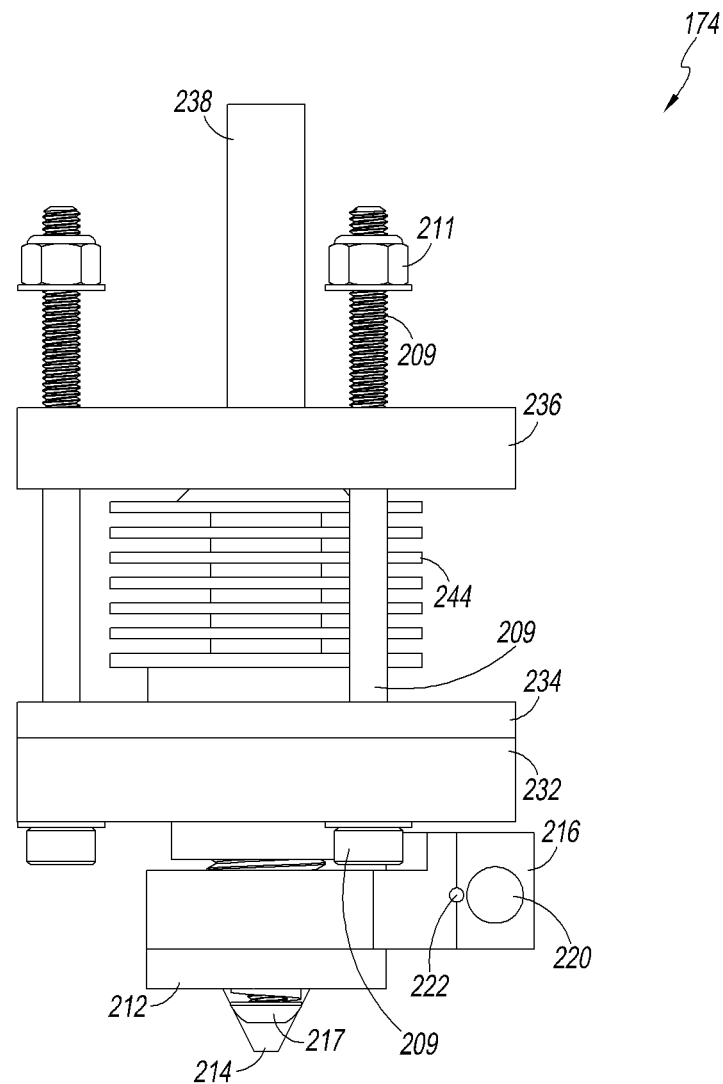
FIG. 17 illustrates a side view of an embodiment of a hot end assembly.
Figure 18:
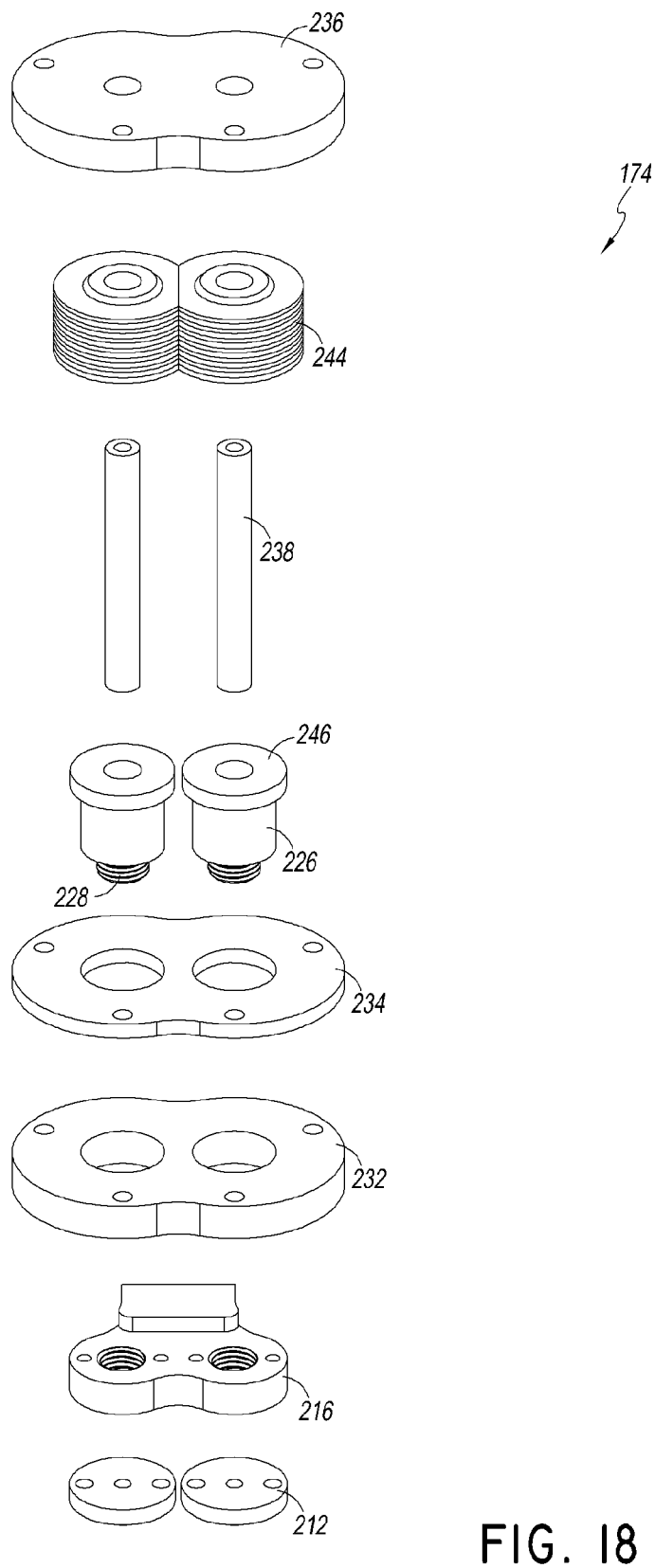
FIG. 18 illustrates an exploded, side, top, perspective view of an embodiment of a hot end assembly.
Figure 19A:
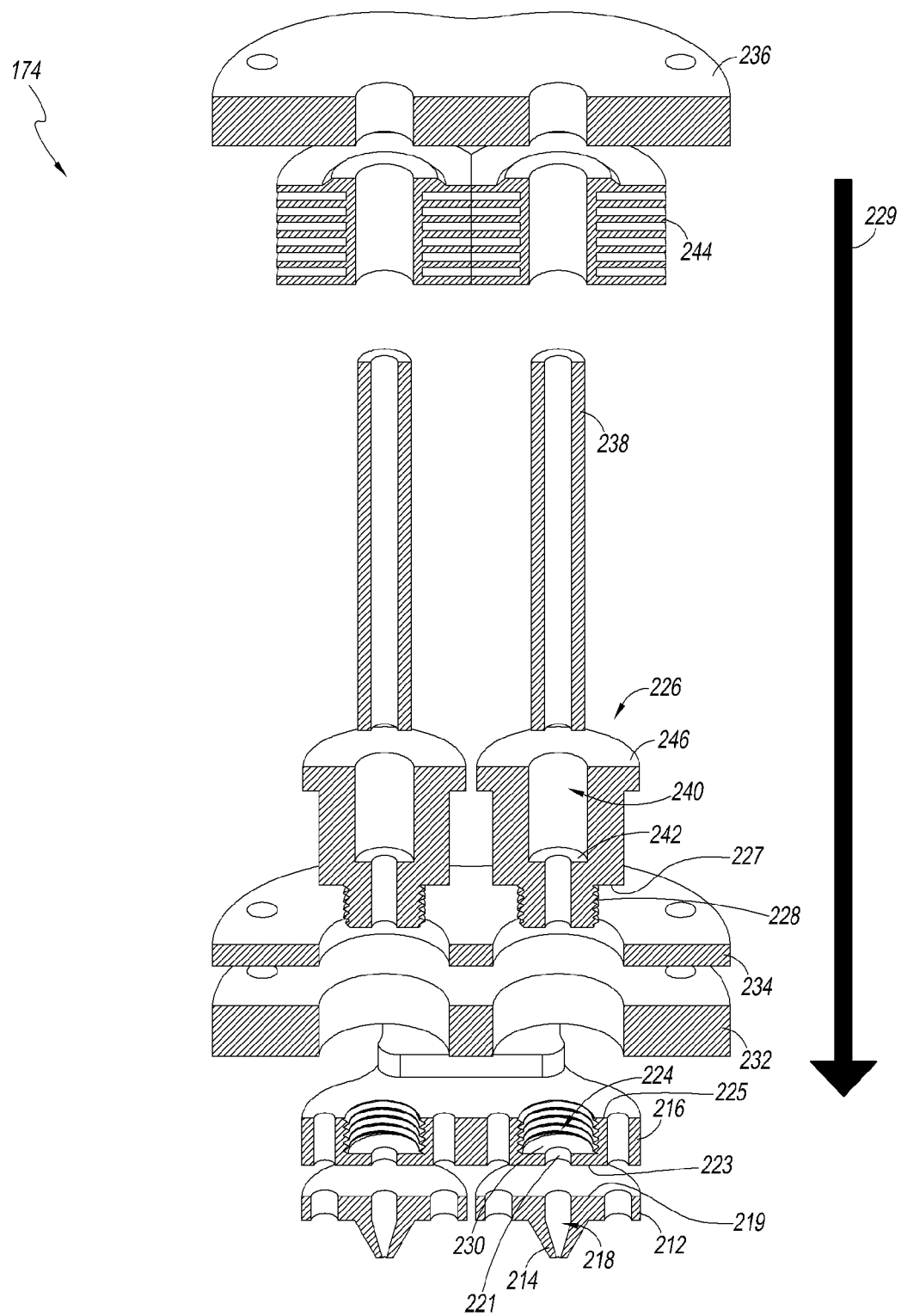
FIG. 19A illustrates an exploded, side, top, perspective, cross-sectional view of an embodiment of a hot end assembly.

FIG. 16 illustrates a side, top, perspective view of an embodiment of a hot end assembly 174. FIG. 17 illustrates a side view of an embodiment of a hot end assembly 174. FIG. 18 illustrates an exploded, side, top, perspective view of an embodiment of a hot end assembly 174. FIG. 19A illustrates an exploded, side, top, perspective, cross-sectional view of an embodiment of a hot end assembly 174. Returning to FIG. 13, FIG. 13 also illustrates a side cross-sectional view of an embodiment of a hot end assembly 174 positioned in an extrusion housing 172.

FIGS. 13, 14, 16, and 17 illustrate that the hot end assembly 174 discussed herein can be assembled and/or connected to, for example, the extrusion housing 172 with a bolt 209 and nut 211 assembly. Other suitable connection mechanisms can be used for the features and connection discussed herein for the hot end assembly 174 such as, for example, interference fit mechanisms, snap fit mechanisms, and/or the like, which can include using male and female mating parts (e.g., tongue-and-groove corresponding parts). As illustrated in FIGS. 13, 18, 19A, 21, and 22, the various openings, conduits, or channels of features of, for example, the tip 212, the base 216, the sleeve 226, and/or the filament tube 238 can be positioned to be concentric along extrusion direction 229 (FIG. 19A) to smoothly and efficiently direct the consumable material along, for example, a straight line or path, through the various components of the hot end assembly 174 as discussed herein.

FIGS. 13 and 16-19 illustrate an embodiment of a dual head hot end assembly. While features of the hot end assembly 174 may be discussed singularly, the features can be mirrored or applied to a hot end assembly 174 that has dual print heads (e.g., two nozzles 214). In some embodiments, the features and concepts discussed herein can be applied to multiple print head assemblies (e.g., three or more nozzles 214). The hot end assembly 189 creates a heating zone for the filament consumable material. The heating zone can be varied as discussed herein.

As illustrated in FIGS. 13 and 16-19, the hot end assembly 174 can have a tip 212 (e.g., an extrusion end or extruder) having a nozzle 214 (e.g., an extrusion conduit). The tip 212 can be secured to a base 216 via screws 217 or other suitable attachment mechanisms. The base 216 can be made from a single or same piece of material to promote heat transfer to the tip 212. Threaded connections between heating elements and the heating zone for the consumable material may impede efficient or desired heat transfer and promote inaccuracy and wasted heat. Heat transfer may be compromised because threaded connections between heat conducting components, particularly the base, threaded extender, and nozzle are inefficient thermal conductors. These losses in efficiency may cause thermal inconsistencies throughout the extrusion assembly 178 and related inconsistent extrusion.

The tip 212 can be secured to base 216 with a connection that is substantially leak free. For example, the tip 212 and the base 216 can have corresponding planar surfaces that in contact inhibit or substantially prevent fluid communication between external environment and internal conduits of the hot end assembly 174 as discussed herein. As illustrated in FIGS. 18, 19A, 21, and 22, the tip 212 can have a top or upstream surface/side 219 (e.g., a tip connecting surface) that is planar. The upstream surface 219 can extend directly from the internal conduit 218 of the tip 212 (e.g., a perimeter or periphery of the internal conduit 218). The base 216 can have a bottom or downstream surface/side 223 (e.g., a base connecting surface) that is planar. The downstream surface 223 can extend directly from the internal conduit 221 of the base 216 (e.g., a perimeter or periphery of the internal conduit 221). The upstream, downstream surfaces 219, 223 can be correspondingly curved or other shapes to sufficiently engage and form a desired connection between the tip 212 and base 216 as discussed herein. As illustrated in FIGS. 18, 19A, 21, and 22. The direct contact, connection, mating, or engagement of the upstream, downstream surfaces 219, 223 places the tip 212 and the base 216 in direct thermal communication with each other.

A thermal paste and/or sealing paste can be applied between surfaces 219, 223 of the tip 212 and the base 216 to further promote a leak-free seal. Such an arrangement of the tip 212 and the base 216 can help ensure, for example, that consumable material heated by the tip 212 and/or the base 216 does not leak out between the tip 212 and the base 216 while promoting efficient heat transfer between the tip 212 and the base 216 as discussed herein.

The tip 212 and/or the base 216 can be made or formed from a solid piece or block of material to promote efficient heat transfer between a heating element, the base 216, and the tip 212. Any suitable material can be used with good heat transfer characteristics while maintaining desired or predetermined material properties at elevated temperatures necessary for high-quality 3D printing. For example, the tip 212 and the base 216 can be made of aluminum or aluminum alloys, which has sufficient heat transfer characteristics while also having the benefit of being light weight. The tip 212 can the base 216 can be made from other metals or alloys, such as stainless steel.

The tip 212 and nozzle 214 can form a tip internal conduit 218 (e.g., channel or opening) to direct heated consumable material for layering. The internal conduit 218 can be tapered to promote the flow of the material from the tip 212 to the location for material layering. For example, a non-tapered internal conduit in the tip may lead to resistance as the consumable material impacts the inner surface of the internal conduit. As the internal conduit size is decreased for finer printing, this resistance can increase significantly, causing extrusion problems. Accordingly, the internal conduit 218 may be tapered to mitigate resistance during extrusion. In some embodiments, the tip measures approximately 8.2 millimeters (0.322 inches) from the top surface to the bottom of the tip 212. The bore of the tip 212 (e.g., internal conduit 218) measured at the top surface can be approximately 3 millimeters (0.118 inches) and tapers down to approximately 0.5 millimeters (0.020 inches) at the outlet of the tip 212 (e.g., nozzle 214). As illustrated in FIGS. 13 and 19A, the internal conduit 218 can begin to taper about halfway through the internal conduit 218 (e.g., half the vertical height and/or central axis of the tip 212 along the extrusion direction 229). For example, the internal conduit 218 can begin to taper approximately 4 millimeters from the top surface (e.g., upstream surface 219) of the tip 212. In some embodiments, the internal conduit 218 can begin to taper at other locations along the extrusion direction 229 such as for example, about a third or about two-thirds along the central axis through the internal conduit 218 (e.g., height along the extrusion direction 229). At the nozzle 214, the 0.5 millimeter internal conduit 218 can extend for approximately 0.635 millimeters (0.025 inches) to the point where the filament is extruded (e.g., a 0.5 millimeter diameter bore extending about 0.635 millimeters (0.025 inches) to where the filament is extruded out of the nozzle 214).

As illustrated in FIG. 17, the base 216 can have a heating opening 220 and a thermal sensor opening 222. As illustrated in FIG. 18, both the heating opening 220 and the thermal sensor opening 222 can project or extend through en entirety of the base 216 (e.g., open on both ends of the openings. In some embodiments, the heating opening 220 and/or the thermal sensor opening 222 can project or extend partially through the base 216 (e.g., one-sided openings) depending on the printing application (e.g., consumable material used and desired rate or printing).

The heating opening 220 can engage or house a heating element, such as a resistor, in a desired position in the base 216. The heating element can generate thermal energy (e.g., heat) when powered. The generated heat can travel through the base 216 and the connected tip 212 with the nozzle 214 to heat and melt the consumable material to a desired temperature for material deposition as discussed herein. The heating element may also be thermally coated to promote more efficient heat transfer and enhanced safety by reducing external temperatures of the hot end assembly 174.

The thermal sensor opening 222 can engage or house a thermal sensor, such as a thermistor, or thermocouple, to measure temperature of the base 216 during heat generation by the heating element. Based on temperature measurements from the thermal sensor, a controller can determine or approximate the temperature of the consumable material through the base 216, tip 212, and nozzle 214. The controller can adjust the thermal energy being generated by the heating element to achieve a desired or predetermined temperature of the consumable material.

As illustrated in FIG. 19A, the base 216 can have a threaded portion 224. The threaded portion 224 can extend into the base 216 (e.g., to form a cavity, cutout, or opening). The threaded portion 224 can accept, connect to, engage, or mate with a sleeve or isolator 226. The sleeve 226 can have a threaded extension or extender 228 (e.g., a projection, protrusion, boss, or knob) that engages the threaded portion 224 of the base 216. The sleeve 226 can be made of material that can act as an excellent thermal insulator. For example, the sleeve 226 can be made of a suitable thermoplastic having high thermal resistance and a high glass-transition temperature (e.g., to not melt during while the base 216 is heated by the heating element as discussed herein). Example materials can include a thermoplastic known under the trade name of Meldin® which exhibits desired performance properties, including dimensional stability at high temperature, and longer life with high stress applications.

The sleeve 226, which exhibits good thermal insulation properties, can help inhibit heat transfer upstream of the hot end assembly 174 (e.g., components 238, 244, and 236 as discussed herein). FIG. 19A illustrates an extrusion direction 229 for a filament of consumable material along the hot end assembly 174. The extrusion direction 229 indicates a downstream direction for filament extrusion; accordingly, upstream is a direction opposite extrusion direction 229 as discussed herein.

As illustrated in FIG. 19A, with the threaded portion 224 extending into the base 216 and the threaded extension 228 extending likewise into the base, heat transfer from the heating element is concentrated toward the tip 212. The base 216 can have a sleeve flange 230 (e.g. a sleeve support flange) that extends internally to form an internal conduit 221 (e.g., a channel or opening). The sleeve flange 230 can provide a surface area for heat transfer between the base 216 and the nozzle 214. The sleeve flange 230 can also act to concentrate the area of heat transfer in the base 216 when the consumable material is passing through the internal conduit 221. The sleeve flanges 230 can also act as a stop for the sleeve 226. Stated differently, the sleeve 226 that is threaded cannot be engaged with the base 216 beyond the sleeve flange 230.

As illustrated in FIGS. 18 and 19A, the base 216 can have an upstream or top surface/side 225 (e.g., a base connecting surface) that extends directly from the opening of the threaded portion 224 (e.g., a perimeter or periphery of the opening of the threaded portion 224). The upstream surface 225 can come in contact with a downstream or bottom surface/side 227 of the sleeve 226 (e.g., a sleeve connecting surface). The downstream surface 227 can extend directly from the threads of the threaded extension 228 of the sleeve 226 (e.g., an outer perimeter or periphery of the threaded extension 228). The upstream and downstream surfaces 225, 227 can be substantially flat or planar to tightly come in contact with each other to form a compact assembly 174 and reduce wear on the assembly 174 (as well as mitigate possible leaks of consumable material). In some embodiments, the upstream and downstream surfaces 225, 227 can be correspondingly curved or other shapes to sufficiently engage and form a desired connection between the base 216 and the sleeve 226.

With the arrangement of the base 216 and sleeve 226 as discussed herein, the possible or potential heating temperature of the consumable material may be increased. For example, the sleeve 226 made of a thermoplastic having desired performance characteristics at high temperatures as discussed herein that will not degrade under predetermined elevated temperatures. Further, the sleeve 226 acting as a desired thermal insulator can mitigate or inhibit heat transfer to other upstream components of hot end assembly 174. For example, heat transfer to the extrusion housing 172 can be mitigated to help prevent melting and/or deformation of the extrusion housing 172 under the elevated temperature conditions for extrusion.

With the illustrated arrangement of the base 216 and the sleeve 226, heating temperatures over 300 degrees Celsius are possible. The heating temperatures can range from 175 to 315 degrees Celsius, or higher depending on material including the foregoing values and the ranges bordering therein. Accordingly, at such elevated temperatures, the consumable material used for building a 3D part can include polycarbonate materials that have high melting temperatures (e.g., approximately 300 degrees Celsius). Other materials can include, but are not limited to polycarbonate/ABS and forms of Nylon including Nylon 645 and Bridge Nylon. The illustrated hot end assembly 174 can also be used at other, lower temperatures, such as, for example, between about 175 to 260 degrees Celsius. Accordingly, at such temperatures, the consumable material that used for building a 3D part can include thermoplastics that have relatively lower melting temperatures (e.g., below 300 degrees Celsius such as ABS, polylactide (PLA), or aliphatic polyamides or nylon).

Additionally, heat transfer to the consumable material filament upstream in the hot end assembly 174 can be mitigated to help inhibit premature melting of the consumable material in the hot end assembly 174. As discussed herein, the consumable material can be supplied to the nozzle 214 in filament form. Accordingly, as roads of material are deposited on the work piece, feed assemblies 114 apply pressure to the filament to drive the consumable material through the hot end assembly 174 and ultimately through the nozzle 214. If the consumable material substantially melts prematurely in the hot end assembly 174 (e.g., before reaching the base 216 and the nozzle 214), the molten consumable material may not properly extrude from the nozzle as more pressure is applied to the filament of the consumable material by the feed assemblies 114. Such a build of material not only can lead to reduced detailed and quality of the printed 3D objected, the pooled (e.g., melted material) may cause jamming in the hot end assembly 174.

Relatedly, when one or both of the nozzles 214 of the dual head hot end assembly 174 are not printing (e.g., not layering material associated with the particular nozzle 214), the filament of the consumable material has to be pulled back from the base 216 and nozzle 214 a shorter distance to remove the consumable material from the heat transfer area associated with the base 216 and nozzle 214 for melting the consumable material. Further, less consumable material is melted or pooled near the base 216 and nozzle 214 during printing, potentially resulting in less undesired dripping or depositing of consumable material that is not being printed (e.g., liquefied material dripping or leaving the nozzle 214 even though pressure to the filament is not being applied via the feed assemblies 114). Accordingly, such an arrangement allows for the filament of the consumable material be pulled back relatively shorter distance in the hot end assembly 174 for an idle print head (e.g., nozzle not being used for layering material at a given point in time). In some embodiments, the filament may be pulled back from the end of the nozzle 214 (e.g., point of material extrusion from the nozzle 214 or point where the material leaves the internal conduit 218) between about 5 to 25 millimeters, including about 10 to 20, and about 10 to 15 millimeters, including the foregoing values and ranges bordering therein. For example, the filament may be pulled back into the sleeve 226, which can provide sufficient thermal isolation to mitigate melting of the consumable material over an extended period of time while the base 216 and nozzle 214 remain primed or are maintained at a desired or predetermined printing temperature. Utilizing a fan to cool the upper end of the hot end assembly 174 also helps to cool the filament material therein and lessen undesirable dripping.

With reference to FIGS. 13 and 16-19, the hot end assembly 174 can have a first isolating layer 232 (e.g., thermal isolating layer). The first isolating layer 232 can be any suitable material to provide structural integrity to the hot end assembly 174 while thermally isolating the upstream components of the hot end assembly 174. Suitable materials for the first isolating layer 232 can include treated wood materials exhibiting desired or predetermined heat transfer or isolation characteristics. In some embodiments, Goncalo Alves wood is used for the first isolating layer. Other materials can include thermoplastics exhibiting desired heat transfer isolation characteristics.

The hot end assembly 174 can have a heat transfer layer 234 adding structural integrity to the hot end assembly 174 while providing desired heat transfer of the heat that may radiate from the first isolating layer 232. For example, while the first isolating layer 232 may be a thermal isolating layer, some heat may still transfer through the first isolating layer 232 to upstream components of the hot end assembly 174. Accordingly, the heat transfer layer 234 can absorb and transfer to the environment heat transferred through the first isolating layer 232 via, for example, forced air convection as discussed herein through the heat exchanger opening 194 as discussed herein. Accordingly, layering the heat transfer layer 234 can facilitate removing heat that may still transfer through the first isolating layer 232 to inhibit further heat transfer to upstream components of the hot end assembly 174. In some embodiments, the heat transfer layer 234 is made from stainless steel or aluminum.

The hot end assembly 174 can have a second isolating layer 236. The second isolating layer 236 can be any suitable material to provide structural integrity to the hot end assembly 174 while thermally isolating the upstream components of the hot end assembly 174. The second isolating layer 236 can provide further heat transfer isolation to any thermal energy that may have transferred upstream of the hot end assembly 174. For example, the second isolating layer 236 can isolate the extrusion housing 172 from heat transferred from the base 216. Suitable materials for the second isolating layer 236 can include treated wood materials exhibiting desired or predetermined heat transfer or isolation characteristics. In some embodiments, Goncalo Alves wood is used for the second isolating layer. Other materials can include thermoplastics exhibiting desired heat transfer isolation characteristics. In particular, materials for the first and second isolating layers 236 should be chosen that exhibit desired or predetermined level of planar flatness on the contact surfaces with other components of the hot end assembly 174 and/or extrusion housing 172.

With reference to FIGS. 13 and 16-19, the hot end assembly 174 can have a filament tube or conduit 238 that guides the filament of the consumable material as discussed herein. The filament tubes 238 can be made of any suitable material to guide the filaments along a desired path while providing a low coefficient of static or kinetic friction between the filament tube 238 and the filament of the consumable material to facilitate movement of the filament by the feed assemblies 114 as discussed herein. Suitable materials can be similar or the same as the materials discussed herein for tubes along the feed lines 123. Other materials with desired heat transfer and frictional characteristics may be used.

With reference to FIG. 13, the extrusion assembly 112 and/or hot end assembly 174 can have springs 239 sized and positioned upstream of the filament tube 238. The springs 239 can be configured to press against the filament tubes 238 to retain the position of the filament tubes 238 in a desired or predetermined position within the hot end assembly 174 as discussed herein. For example, when the tubes along feed lines 123 are secured with the feeding bracket 175 as discussed herein, the tubes (or fixtures on the tubes) along feed lines 123 can come against and press on the springs As illustrated in FIG. 19A, the sleeve 226 can have a tube opening 240 (e.g., a divot in the sleeve 226) with a sleeve flange 242. The tube opening 240 can be sized to accommodate or accept (e.g., connect to, engage, or mate with) the filament tube 238. The sleeve flange 242 can extend inwardly into the tube opening 240. The sleeve flange 242 can be sized and extend into the tube opening 240 to provide a stop to how far the filament tube 238 can extend into the sleeve 226. In some embodiments, the sleeve flange 242 and tube opening 240 of FIG. 19A are approximately 6.35 millimeters (0.25 inches) in diameter. The sleeve flange 242 can inhibit or substantially prevent direct contact between the filament tube 238 and the base 216. Stated differently, the sleeve flange 242 can thermally isolate the filament tube 238 from the base 216. Accordingly, when the base 216 (and the tip 212) are heated to liquefy the consumable material as discussed herein, the filament tube 238 is isolated from the heat to inhibit or substantially prevent deformation and melting of the filament tube 238.

Figure 19B:
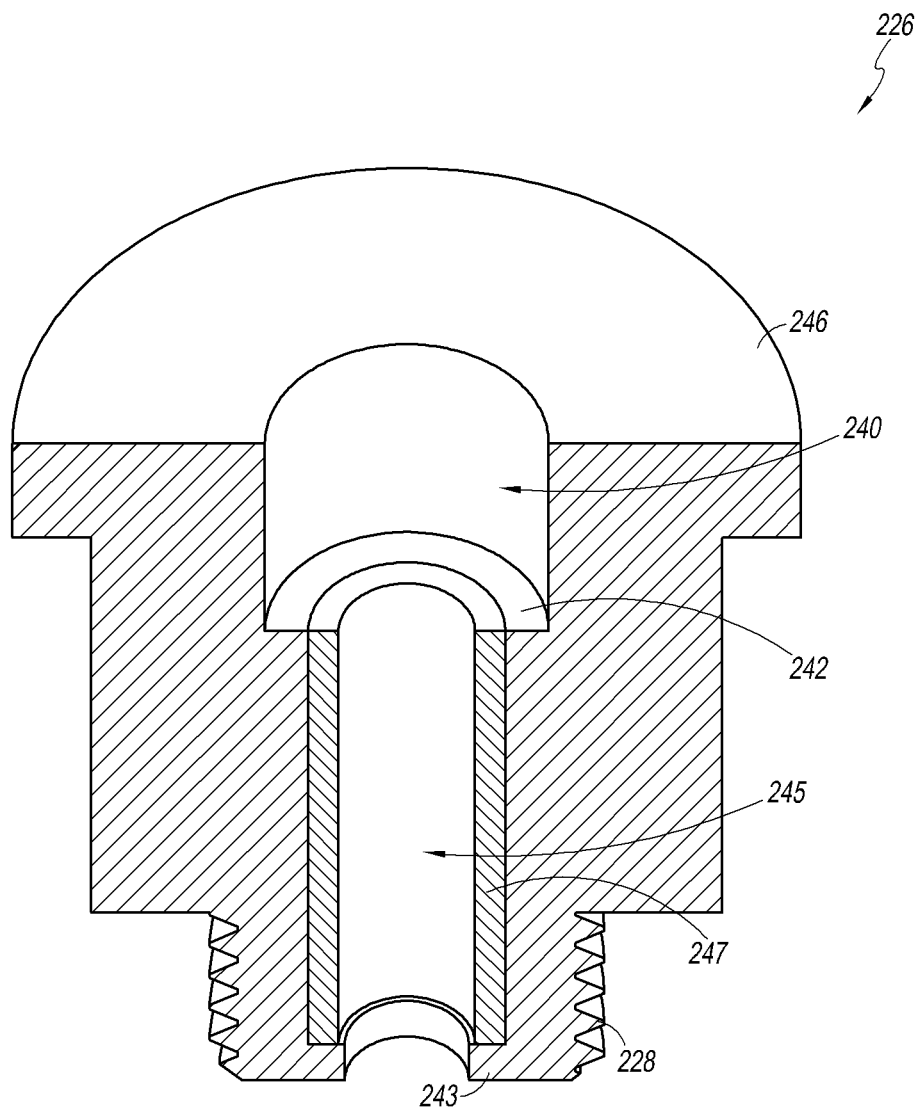
FIG. 19B illustrates an exploded, side, top, perspective, cross-sectional view of an embodiment of a sleeve.

FIG. 19B illustrates an exploded, side, top, perspective, cross-sectional view of an embodiment of a sleeve 226. The sleeve 226 illustrated in FIG. 19B can have similar or same features as discussed herein for sleeve 226 illustrated in FIG. 19A. As illustrated in FIG. 19B, the sleeve flange 242 can extend farther up the sleeve 226 (e.g., upstream) to push or position the filament tube 238 upstream, farther away from the heat source (e.g., heating element) and/or base 216 as well as to provide further structural stability to the sleeve 226. In some embodiments, the sleeve flange 242 illustrated in FIG. 19B can be approximately 6.35 millimeters (0.25 inches) in diameter and recessed approximately 6.70 millimeters (0.264 inches) from the top of the support flange 246.

As illustrated in FIG. 19B, the sleeve 226 can have a second sleeve flange 243. The second sleeve flange 243 can be approximately 4.763 millimeters (0.188 inches) in diameter (e.g., to the wall of the first channel opening 240). The sleeve flange 243 can extend down from the first sleeve flange 242 approximately 13.8 millimeters (0.543 inches). Such an arrangement leaves or provides approximately 1.16 millimeters (0.046 inches) of sleeve material (Meldin for example) at the base of the sleeve 226 (e.g., second sleeve 243 and extending radially) with a bore (internal diameter at the second sleeve 243) of approximately 3.175 millimeters (0.125 inches) in diameter. The base of the sleeve 226, as also discussed in reference to FIG. 19A, can be in direct contact with the base 216, providing thermal insulation from the base 216 to upstream components of the hot end assembly 174. In some embodiments, perimeters or peripheries of openings and conduits discussed herein can correspond to the diameters of the openings and conduits.

With continued reference to FIG. 19B, the sleeve 226 can have two channels or openings through which the filament consumable material passes through. The sleeve can have a first channel (e.g., tube opening) 240 as discussed herein corresponding to the first sleeve flange 242. The first channel 240 (e.g., a conduit or opening) can be approximately 6.35 millimeters (0.25 inches) in diameter to, for example, house or direct the filament tube 238. The sleeve 226 can have a second channel (e.g., internal sleeve opening or conduit) 245 extending (e.g., downstream) closer to the base 216 corresponding to the second sleeve flange 243. The second channel 245 can be approximately 4.763 millimeters (0.188 inches) in diameter.

The second channel 245 may contain an internal sleeve 247 (e.g., a internal filament tube, internal tube, or filament tube and/or an internal filament lining, internal lining, or filament lining) that is separate from and/or made from different materials than the materials of the sleeve 226. The internal sleeve 247 can be made of material having relatively low static and/or dynamic coefficients of friction with or against, for example, the filament consumable material. Further, the internal sleeve 247 can be made of material having a high temperature resistance relative to, for example, the filament tube 238. For example, the material of the internal sleeve 247 can better maintain a desired shape and its mechanical properties at elevated temperatures (e.g., having a relatively higher melting or glass transition temperature) relative to, for example, the material of the filament tube 238 while providing reduced friction with the filament consumable material relative to the material of the sleeve 226.

The internal sleeve 247 can have an approximately 3.175 millimeters (0.125 inches) diameter opening or lumen (e.g., internal diameter) to allow filament to pass through, which can be substantially the same or correspond to the diameter of the filament tube 233. Such a diameter can be a substantially constant diameter passageway (e.g., internal conduit or bore) for the filament consumable material passing through the various features of the hot end assembly 174 as discussed herein (e.g., along extrusion direction 229). The diameters and lengths of various features, including that of the sleeve 247, discussed herein may vary depending on application (e.g., heating temperatures), and in particular, the type and/or diameter of filament. The internal sleeve 247 can have an external diameter of approximately 4.763 millimeters (0.188 inches) (corresponding to the second channel 245) that is smaller than an internal diameter of the tube opening 240 corresponding to the filament tube 238 as discussed herein. For example, the filament tube 238 can have an external diameter of approximately 6.35 millimeters (0.25 inches). Accordingly, the relatively smaller diameter of the internal sleeve 247 can provide a larger thickness of material of the sleeve 226 (e.g., radially extending from the second channel 245) while providing the beneficial characteristics of a low friction coefficient of the internal sleeve 247 with filament consumable material.

In some embodiments, the internal sleeve 247 may be made from PTFE to reduce friction and insulate the filament consumable material from the heat source (e.g., heating element). The material of the internal sleeve 247 can be the same as the material of the filament tube 238. The reduction in friction (e.g., relative to the friction between the sleeve 226 and the filament consumable material) can help alleviate, mitigate, or substantially prevent jamming of the filament through the sleeve 226 and/or hot end assembly 174. In some embodiments, steel and/or aluminum tubes, as well as other materials with a higher melting or glass transition temperature (e.g., relative to the PTFE), may be used. Accordingly, the sleeve 226 illustrated in FIGS. 19A and 19B can allow for high operating temperatures of the hot end assembly 174 while thermally insulating as needed or to a desired/predetermined level the filament tubes 238 and the filament consumable material from the high operating temperatures.

With reference to FIGS. 13 and 16-19, the hot end assembly 174 can have a finned heat exchanger 244. The finned heat exchanger 244 can be sized and shaped to be positioned about the filament tube 238. The finned heat exchanger 178 can have heat exchange fins to facilitate radiating heat away via, for example, forced air convection as discussed herein through the heat exchanger opening 194 as discussed herein. Other embodiment heat exchangers may be used, such as a bell heat exchanger. The finned exchanger 244 can facilitate heat transfer from the filament tube 238 that may have transferred up from the base 216. The finned heat exchangers 244 can help prevent premature liquefaction of the filament that may be present in the filament tube 238, whether the filament consumable material is resting in the filament tube 238 (while not printing from an associated nozzle 214) or being pushed through the filament tube 238 by the feed assemblies 114. Suitable materials for the finned heat exchanger 244 can include the same or similar materials as the materials discussed herein for the tip 212 and the base 216. Other materials with desired heat transfer characteristics may be used, such as copper.

As illustrated in FIG. 19A, the sleeve 226 can have a support flange 246 that radiates outwardly from the sleeve 226. The support flange 246 can rest against the heat transfer layer 234. The support flange 246 can also provide a resting surface for the finned heat exchanger 244. The support flange 246 can thermally isolate the heat transfer layer 234 and the finned exchanger 244 to facilitate desired heat transfer (e.g., inhibit heat transfer beyond a desired or predetermined level) as discussed herein to, for example, inhibit or prevent premature melting of the filament consumable material.

The hot end assembly 174 described herein is designed for relatively fast extrusion and multiple material compatibility. The hot end assembly 174 has a heating component (e.g., base 216) and a cooling component (e.g., finned heat exchanger 244). The heating component is used to soften the material for 3D layering, while the cooling component keeps the material below glass transition temperature before entering the heating component to help ensure the material is correctly extruded.

As illustrated in FIGS. 13 and 16-19, openings and conduits of the hot end assembly 174 (e.g., tip internal conduit 218) through which the filament consumable material travels can be aligned to facilitate or promote smooth material filament flow through the hot end assembly 174. A break or space may be included in the hot end assembly 174 at the connection between the base 216 and tip 212 to account for potential misalignment of surfaces.

Filament consumable material is heated to be flowable in hot end assembly 174, while at the same time a portion of filament entering the hot end assembly 174 remains solid.

The strand of filament acts like a piston, and resulting pressurization impels molten material out of extrusion tip 212. The flow rate of material extruded from extrusion tip 212 is controlled by the rate at which filament enters liquefier assembly 38. The material is deposited from extrusion tip 44 in "roads" according to tool paths generated from design data, and the deposited material solidifies to form the model. Any deviations between the deposited roads and a desired extrusion profile may impair the model quality. To build a 3D model which accurately matches the design data, it is thus desirable to accurately predict the flow rate of extruded material.

Figure 20:
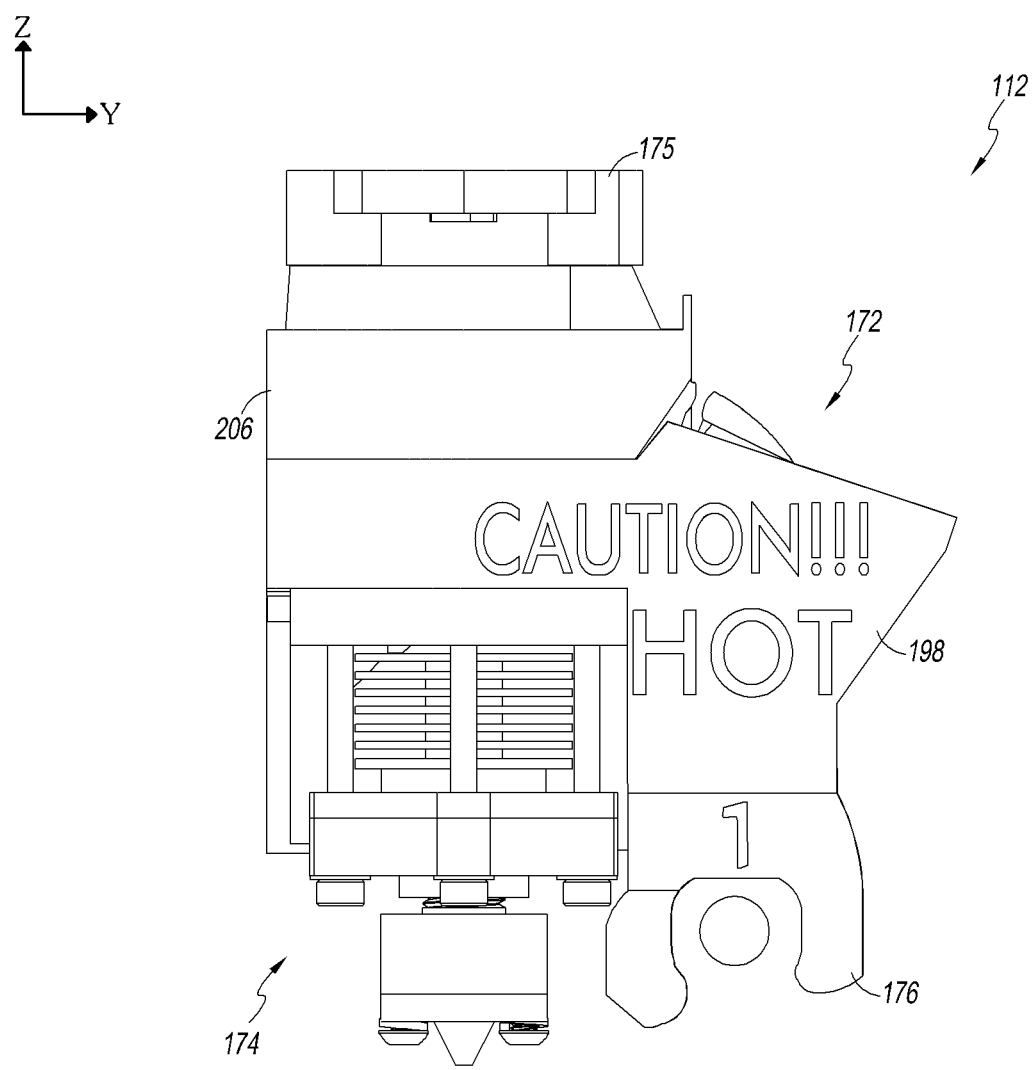
FIGS. 20-22 illustrate an embodiment of the extrusion assembly with a hot end assembly.
Figure 21:
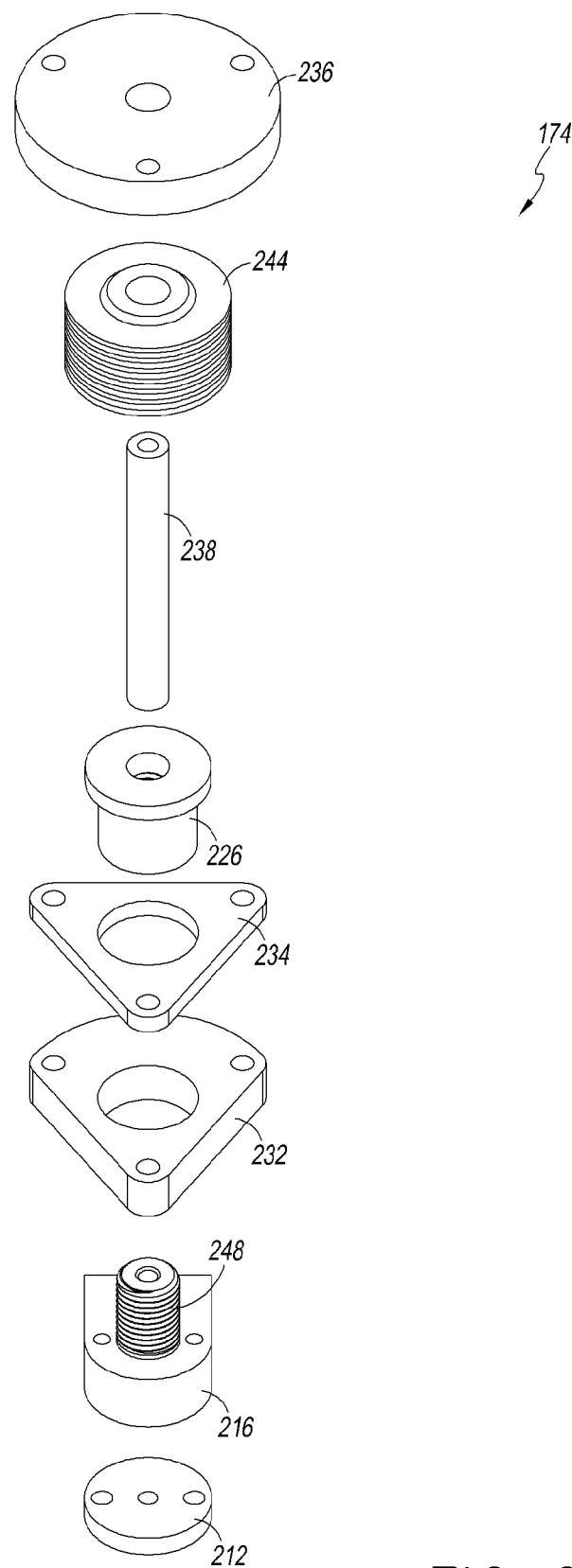
Figure 22:
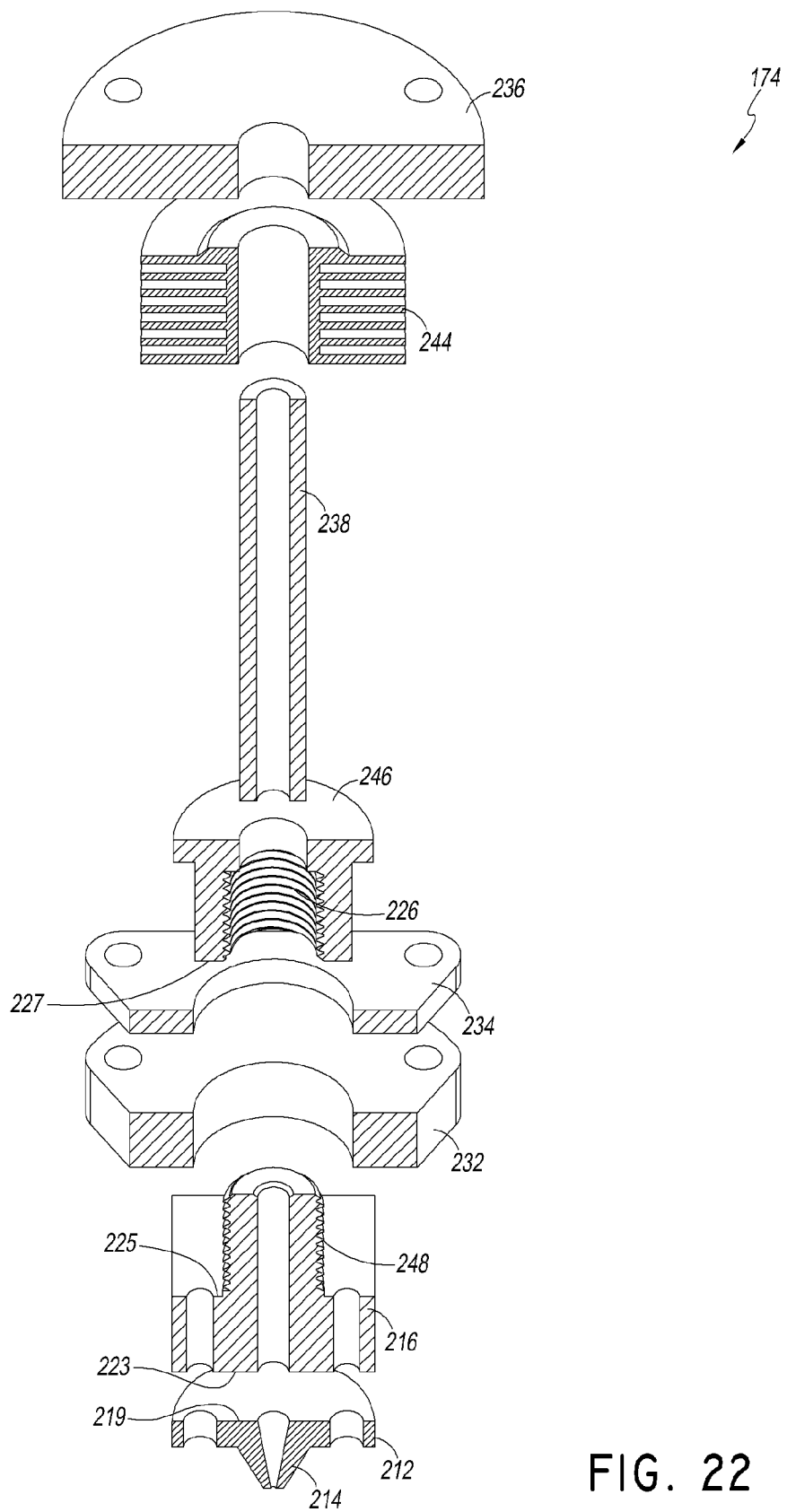

FIGS. 20-22 illustrate an embodiment of the extrusion assembly 112 with a hot end assembly 174 having a single print head (e.g., nozzle 214). The various features and components as discussed herein for the dual printer heads (e.g., two nozzles 214) of FIGS. 7-19. Further, the various features and components illustrated in FIGS. 20-22 are further discussed in U.S. Provisional Application No. 61/890,932, filed Oct. 14, 2013, titled "Heating Component of a 3D Printer," the entirety of which is incorporated by reference and made a part of this specification. For example, the base 216 can have a base threaded extender 248 when an extended heating zone for the filament consumable material is desired. Similar speeds can be achieved for extruded flow rate, including 100 millimeters/second, but a threaded extender 248 may be used where more thermal energy/heat application is desired be applied to the consumable materials. In some embodiments, the filament may be withdrawn from the heating zone by the feeding assembly 114 up to 40 mm from the end of the nozzle 214 as discussed herein. The withdrawal range can include about 20 to 40 millimeters, including about 30 millimeters, including the foregoing values and ranges bordering therein.

As illustrated in FIGS. 21 and 22, a top or upstream surface/side 225 of the base 216 can extend directly from the threads of the threaded extender 248 of the base 216 (e.g., an outer perimeter or periphery of the threaded extender 248). Correspondingly, a bottom or downstream surface/side 227 of the sleeve 226 can extend directly from the opening of the threaded portion of the sleeve 226 configured to engage the threaded extender 248 (e.g., a perimeter or periphery of the opening of the threaded portion of the sleeve 226). As illustrated in FIG. 22, the bore of the tip 212 (e.g., internal conduit 218 as discussed herein) can start to taper at or about the upstream side 219 of the tip 212 and continuously taper to the end of the nozzle 214 where the consumable material is extruded (e.g., through an entire length of the bore through the tip 212 along the extrusion direction). In some embodiments, the end of the bore can also include a substantially constant diameter bore near the end of the nozzle 214 where the consumable material is extruded (e.g., a 0.5 millimeter diameter bore as discussed herein).

Figure 23:
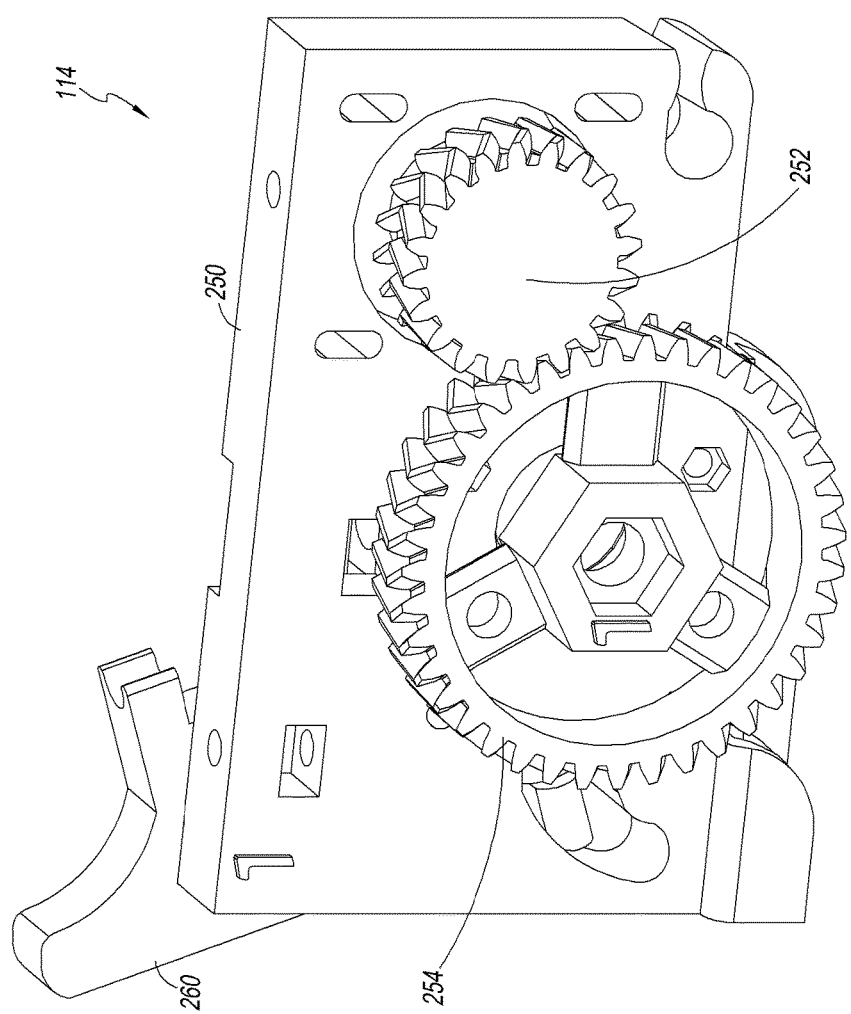
FIGS. 23 and 24 illustrate side, top, perspective views of an embodiment a feed assembly.

FIG. 23 illustrates a side, top, perspective view of an embodiment a feed assembly 114. The feed assembly 114 can supply filament consumable material to the extrusion assembly 112 via tubes along feed lines 123 as discussed herein. The feed assembly 114 can have a feed housing 250 that can support components of the feed assembly 114 as discussed herein. The feed housing 250 can support and position a driver gear 252 in a desired or predetermined position. The drive gear 252 can be connected to a driver motor that is controlled by signals from a controller. The drive motor can include any suitable motor for controlling an amount of filament delivered to the extrusion assembly 112 as discussed herein, including a servo motor, for example.

The feed housing 250 can support and position a driven gear 254 in a desired or predetermined position, for example, relative to the drive gear 252. As illustrated in FIG. 23, the drive gear 252 can be smaller in diameter than the driven gear 254. The larger driven gear 254 enables greater positive control over the amount of rotation on the driven gear 254 via the drive gear 252 and accordingly, greater control over an amount or length of the filament (e.g., strand of filament) fed or pushed to the extrusion assembly 112 as discussed herein. Further, the drive gear 252 and the driven gear 254 can have interlocking chevron teeth. The chevron teeth can provide for a more secure and true engagement between the drive gear 252 and the driven gear 254 to provide further control over the amount of rotation and accordingly, greater control over an amount or length of the filament fed or pushed to the extrusion assembly 112.

Figure 24:
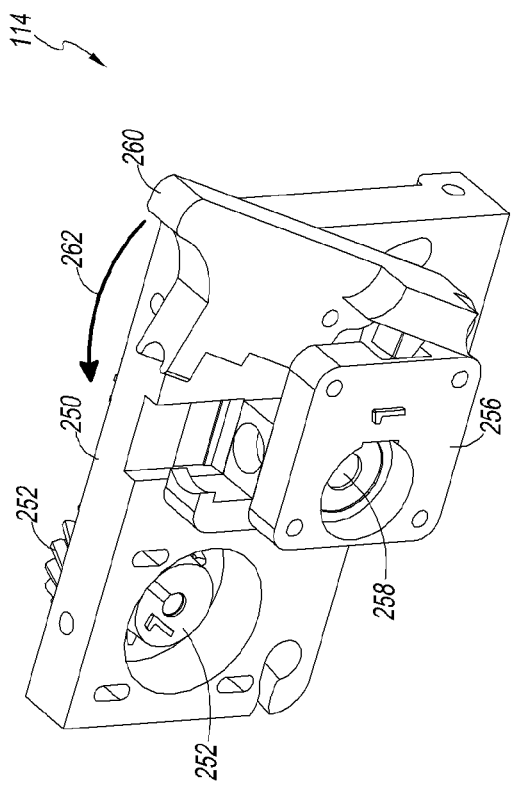

FIG. 24 illustrates a side, top, perspective view of an embodiment a feed assembly 114. The feed housing 250 can support and position a feed bearing 256 in a desired or predetermined position. The feed bearing 256 can have an axle opening 258 that supports an axle connected to the driven gear 254. The axle connected to the driven gear 254 can drive a driver that engages the filament consumable material to push the filament as discussed herein. The driver that engages the filament can have teeth to engage the filament while the driver is rotated by the axle connected to the driven gear 254.

The feed housing 250 can support and position an adjustable arm 260. The adjustable arm 260 can support and position a roller. The adjustable arm 260 can be moved in a locking direction 262. As the adjustable arm 260 is moved in the locking direction 262, the roller can press or move the filament against the driver connected to the axle connected driven gear 254. As the roller presses or moves (e.g., pinches) the filament against the driver, the filament can be moved or pushed to the extrusion assembly 112 as discussed herein when the driver rotates. The roller on the adjustable arm 260 can be positioned on springs to accommodate different sizes or diameters of filament.

Accordingly, while the roller is free to rotate, the roller applies pressure to the filament on a side opposite the driver that is rotated by the driven gear 256 that is in turn rotated by the drive gear 254 connected to the motor. The roller compresses the filament into the driver and allows the driver to advance the filament in a desired direction. As a result of the compression of the roller on filament, the driver or teeth of the driver series can grip or bite into the opposite side of the filament and control its advancement.

Figure 25:
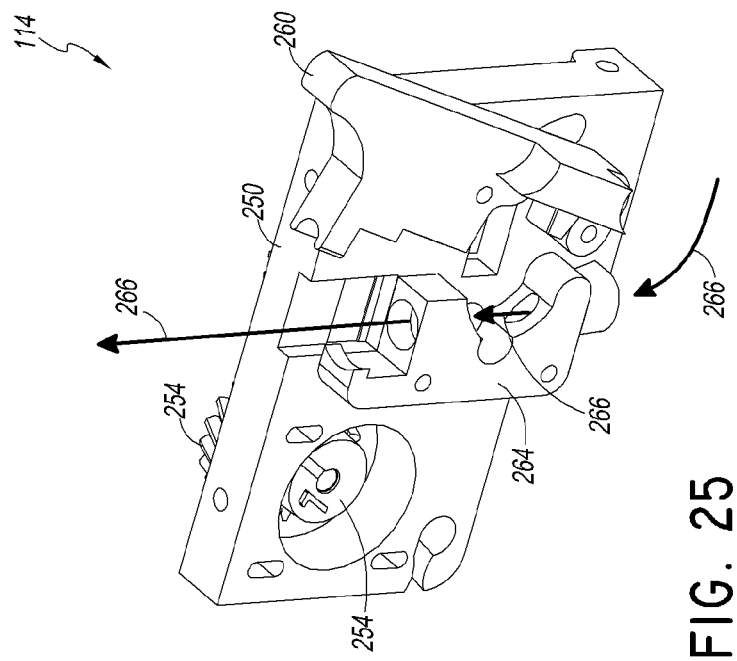
FIG. 25 illustrates a side, top, perspective view of an embodiment a feed assembly.

FIG. 25 illustrates a side, top, perspective view of an embodiment a feed assembly 114. FIG. 25 illustrates the feed assembly without the feed bearing 256 for illustration purposes. The feed housing 250 can support and position a fixed arm 264. The fixed arm 264 can support and position the driver connected to the axle connected to the driven gear 254. The fixed arm 264 can be connected to the feed housing 250 to maintain a fixed position relative to the feed housing and driver for the driven gear 254 to rotate the driver via the axle as desired or at a predetermined accuracy. The fixed arm 264 can have openings or conduits to guide the filament (e.g., strand of filament) along a feed direction 266 as illustrated in FIG. 25. The feed direction 266 passes filament between the driver and the roller to push the filament therebetween as discussed herein.

Figure 26:
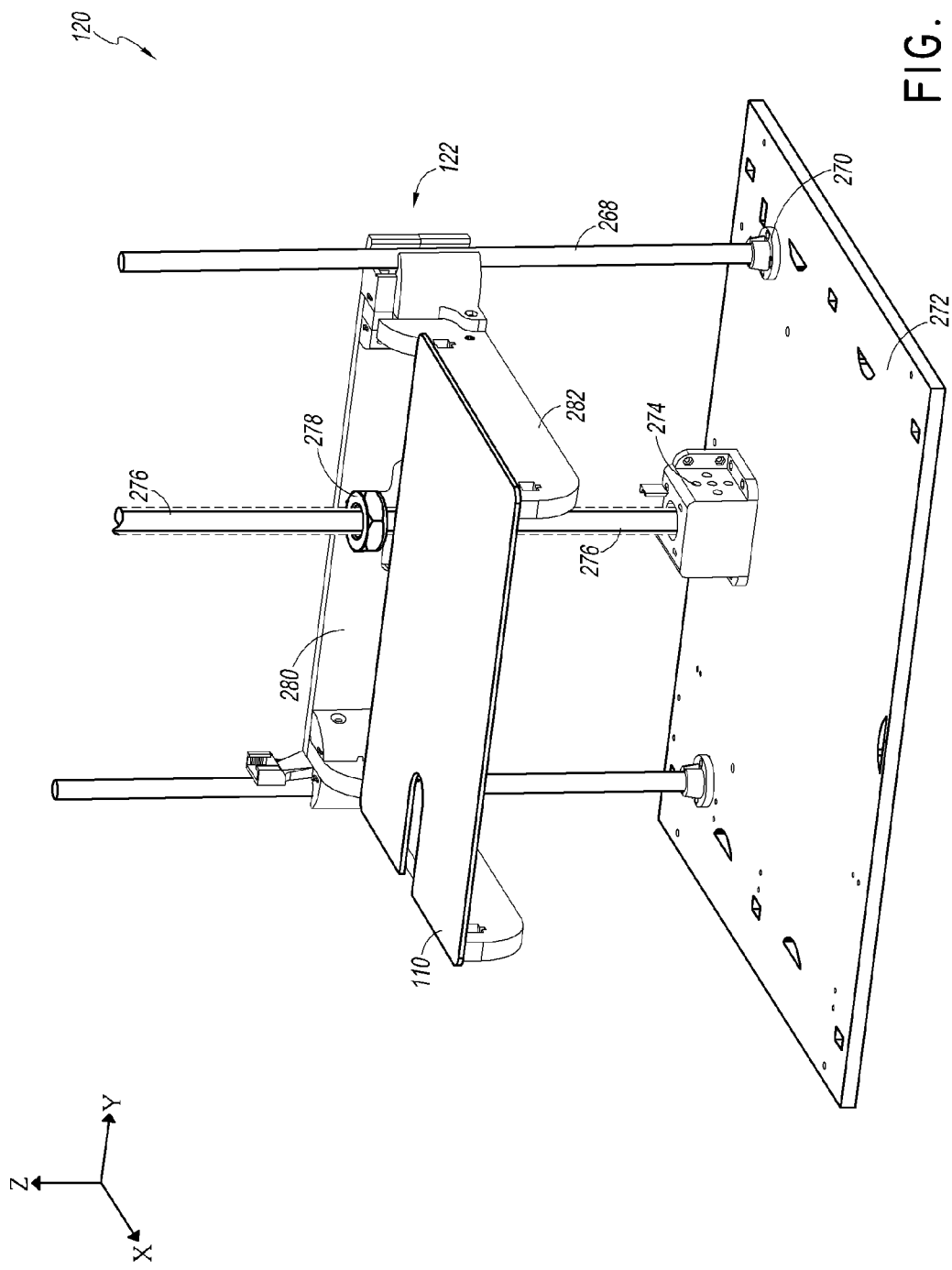
FIG. 26 illustrates a side, top, perspective view of an embodiment of a bed guide assembly.

FIG. 26 illustrates a side, top, perspective view of an embodiment of a bed guide assembly 120. The bed guide assembly 120 can include bed bracket assemblies 122 supporting the bed 110. The bed guide assembly 120 can include z-rods 268 to guide the bed 110 as discussed herein in the x-axis. The z-rods 268 can be supported and positioned in z-rod holders 270. The z-rod holders 270 can connect to, engage, or mate with the z-rods 270 to maintain the z-rods 270 in a substantially vertical position to guide the bed bracket assemblies in a substantially vertical direction along the z-axis. The z-rod holders 270 can connect to, engage, or mate with a bottom panel 272 of the enclosure 104 to support the z-rod holders 270 in a desired or predetermined position.

The bottom panel 272 can connect to, engage, or mate with a z-motor housing 274. The z-motor housing 274 can connect to, engage, or mate with a z-driver rod 276. The z-motor housing 274 can house or contain a motor for driving or rotating the z-driver rod 276. The motor can be any suitable motor as discussed herein, including a stepper motor. The z-driver rod 276 can be threaded such that when the z-driver rod 276 is driven or rotated, the bed 110 is raised or lowered in the z-axis as discussed herein.

The z-driver rod 276 can engage a driver nut 278. The driver nut 278 is correspondingly threaded with the z-driver rod 276. The driver nut 278 is connected to, engaged with, or mated with the bed 110. Accordingly, when the z-driver rod 276 is rotated by the motor, the driver nut 278 moves up and down on the z-driver rod 276, moving the bed 110 correspondingly up and down (e.g., vertically) in the z-axis. The driver nut 278 can connect to, engage, or mate with a z-plate 280. The z-plate 280 can be connected to bed 110 or the bed guide assemblies 120 as discussed herein. Accordingly, as the driver nut 276 is moved up and down, the z-plate 280 is moved up and down, and correspondingly, the bed 110 is moved up and down (e.g., vertically) in the z-axis.

In some embodiments, the bed 110 may be heated to inhibit or prevent curling up of the edges of the base of the 3D object. Curling may result from lower temperatures at the sides of the 3D object during printing. The cooled sides may shrink in relation to the center of the 3D object. The bed 110 being heated may help inhibit or substantially prevent curling at the sides. The bed 110 may incorporate or have a heating pad (e.g., heating elements) made from, for example, a printed circuit board with copper traces.

Figure 27:
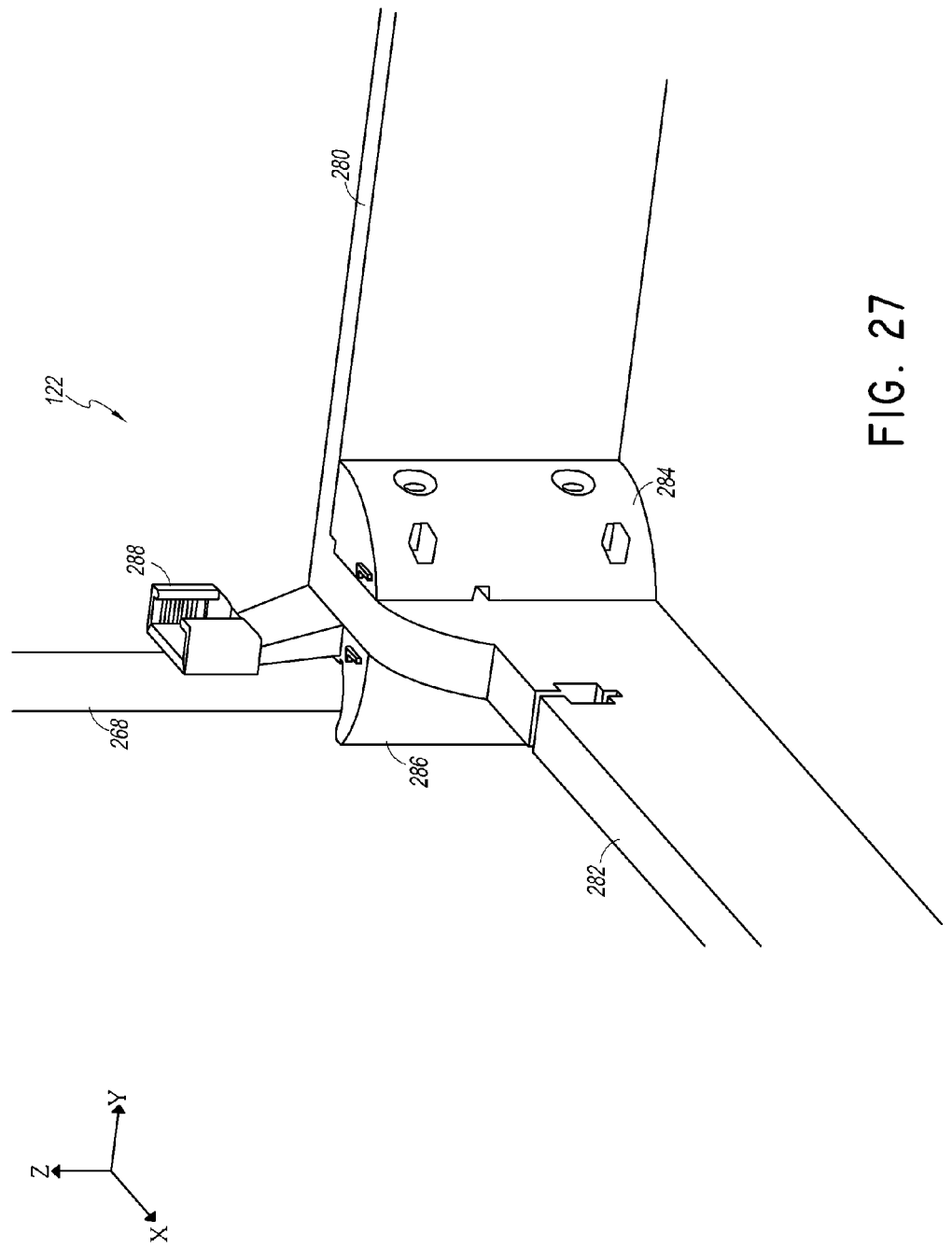
FIG. 27 illustrates a side, top, perspective view of an embodiment of bed bracket assemblies.
Figure 28:
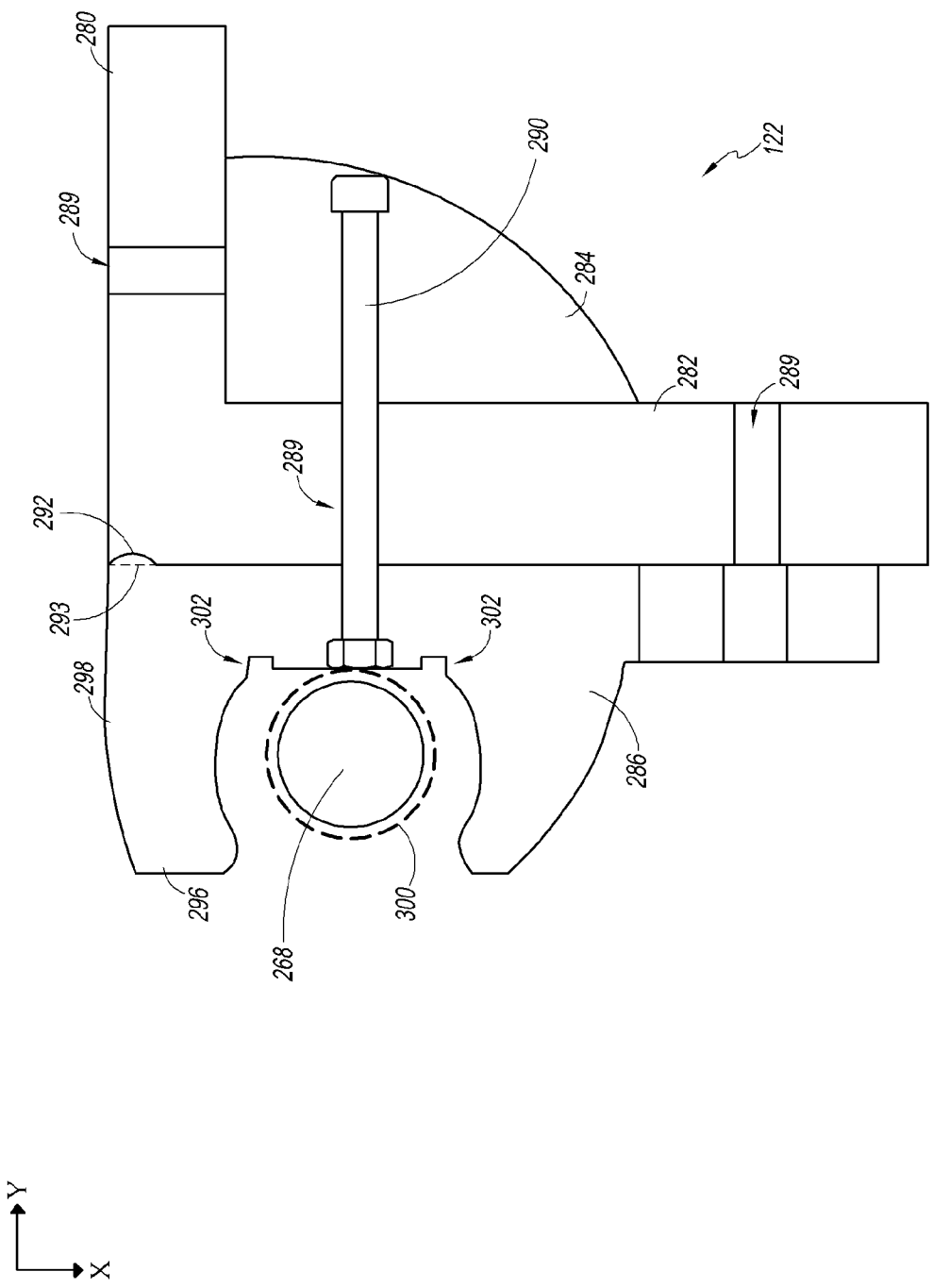
FIG. 28 illustrates a top cross-sectional view of an embodiment of a bed bracket assembly.

As illustrated in FIG. 26, the bed 110 may be connected to z-arms 282. The z-arms 282 can be connected to the bed guide assemblies 120 to support the bed 110 in a cantilevered position as discussed herein. FIG. 27 illustrates a side, top, perspective view of an embodiment of the bed bracket assemblies 122. FIG. 28, illustrates a top cross-sectional view of an embodiment of a bed bracket assembly 122.

As illustrated in FIGS. 27 and 28, the bed bracket assembly 122 can include a bed bracket 284 and a z-rod bracket 286. The z-rod bracket 286 can include a stop switch bracket 288. The stop switch bracket 288 can connect to, engage, or mate with a stop switch sensor. The stop switch sensor can be positioned within (e.g., interference fit) stop switch bracket 288 such that when the bed 110 or bed guide assembly 120 is at an upper most or highest point on the z-axis, the stop switch sensor contacts a surface of, for example, the enclosure 104. Upon contact, the stop switch sensor can send a signal to a controller that can stop the motor connected to the z-driver rod 276 to prevent the bed 110 or bed guide from being driven further up the z-driver rod 276, and accordingly, further along the z-axis. Similar types of arrangements and stop switch sensors can be used elsewhere in the printer 102. For example, stop switch sensors can be used with the extrusion guide assembly 118 to limit movement in the x-y plane.

FIGS. 27 and 28 illustrate that the z-arms 282 can be connected or engaged between the bed bracket 284 and the z-rod bracket 286. The z-arms 282 can include through openings 289 to allow a bolt and nut assembly 290 to pass therethrough. The bed bracket 284 and the z-rod bracket 286 can be connected together with the bolt and nut assembly 290 with the z-arms 282 in between.

As illustrated in FIG. 28, the z-rod bracket 286 can have a tightening flange or rib 292. The tightening flange 292 can protrude from an otherwise planar surface of the z-rod bracket 286 in contact with the z-arm 282. The tightening flange 292 can extend along a vertical dimension (along the z-axis) of the z-rod bracket 286. The tightening flange 292 can extend along a substantial entirety of the vertical dimension along the z-axis. As the bed bracket 284, the z-arm 282, the z-rod bracket 286 are tightened into tight engagement with each other via the nut and bolt assembly 290, the tightening flange 292 is pressed against the surface of the z-arm 282 (or surface of the z-plate 280), causing the immediate surface and material of the z-rod bracket 286 to bend and flex to accommodate the tightening flange 292 protruding from the z-rod bracket 286. As the z-rod bracket 286 flexes to accommodate the tightening flange 292, a clamp arm 296 of a z-rod clamp 298 flexes inward toward the z-rod.

While the tightening flange 292 is illustrated as protruding into the wall of the z-arm 282 (or surface of the z-plate 280), the material of the wall can be made of sufficiently hard material to substantially resist deformation that may be caused by the tightening flange 292. Accordingly, the wall of the z-arm 282 (or surface of the z-plate 280) may remain along the dashed line 293 (e.g., remain substantially straight, flat, or planar) as the tightening flange 292 is pressed against the wall as discussed herein. In some embodiments, the wall of the z-arm 282 (or surface of the z-plate 280) may slightly flex or give (deform elastically or inelastically) to have a wall surface outline between dashed line 293 and the outer perimeter outline of tightening flange 292 illustrated in FIG. 28.

When the bed bracket 284, the z-arm 282, the z-rod bracket 286 are tightened into tight engagement with each other via the nut and bolt assembly 290, the clamp arm 296 has moved inwardly and presses against the z-rod 268. As illustrated in FIG. 28, the z-rod clamp 298 can accommodate a bearing 300, which can be any suitable bearing discussed herein that facilitates translational movement or sliding along the z-rod 268. With the clamp arm 296 moved inwardly and pressed against the z-rod 268, the z-rod clamp 298 may be in sufficient or desired tight engagement such that the z-rod clamp 298 cannot be removed from engagement with the z-rod 268 or engagement with the bearing 300. In some embodiments, the bearing 300 is an LM12LUU linear ball bearing.

As illustrated in FIG. 28, to further facilitate and accommodate the inward movement of the clamp arm 296, the z-rod bracket 286 can have flex notches or cutouts 302 along a substantial entirety of the vertical dimension along the z-axis of z-rod bracket 286. The flex notches 302 remove material from z-rod bracket 286 at predetermined flexing points to accommodate the flexing of the z-rod clamp 298 with the tightening flange 292 as discussed herein.

The bed bracket assembly 122 having a z-rod clamp 298 that tightly and securely grips the bearing 300 allows for the bed 110 to be suspended or cantilevered on two z-arms 282 as illustrated in FIG. 26. In some embodiments, the z-rod clamp 298 cannot be removed from the bearing 300 without substantially deforming or breaking the z-rod clamp 298, which achieves a relatively rigid support for the beds 106 with two bed bracket assembly 122. Accordingly, a desired quality of product can be achieved with the bed 110 being rigid while allowing for complimentary movements with the extrusion assembly 112 to print the 3D object onto the bed 110. Minimizing, inhibiting, or preventing, for example, movement of the bed 110 can increase precision and accuracy while printing.

It is contemplated that various combinations or subcombinations of the specific features and aspects of the embodiments disclosed above may be made and still fall within one or more of the inventions. Further, the disclosure herein of any particular feature, aspect, method, property, characteristic, quality, attribute, element, or the like in connection with an embodiment can be used in all other embodiments set forth herein. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above. Moreover, while the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents, and alternatives falling within the spirit and scope of the various embodiments described and the appended claims. Any methods disclosed herein need not be performed in the order recited. The methods disclosed herein include certain actions taken by a practitioner; however, they can also include any third-party instruction of those actions, either expressly or by implication. For example, actions such as "passing a suspension line through the base of the tongue" include "instructing the passing of a suspension line through the base of the tongue." It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. The ranges disclosed herein also encompass any and all overlap, sub-ranges, and combinations thereof. Language such as "up to," "at least," "greater than," "less than," "between," and the like includes the number recited. Numbers preceded by a term such as "approximately", "about", and "substantially" as used herein include the recited numbers, and also represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced embodiment recitation is intended, such an intent will be explicitly recited in the embodiment, and in the absence of such recitation no such intent is present. For example, as an aid to understanding, the disclosure may contain usage of the introductory phrases "at least one" and "one or more" to introduce embodiment recitations. However, the use of such phrases should not be construed to imply that the introduction of an embodiment recitation by the indefinite articles "a" or "an" limits any particular embodiment containing such introduced embodiment recitation to embodiments containing only one such recitation, even when the same embodiment includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, embodiments, or drawings, should be understood to contemplate the possibilities of including one of the terms, either of the terms, or both terms. For example, the phrase "A or B" will be understood to include the possibilities of "A" or "B" or "A and B."

Although the present subject matter has been described herein in terms of certain embodiments, and certain exemplary methods, it is to be understood that the scope of the subject matter is not to be limited thereby. Instead, the Applicant intends that variations on the methods and materials disclosed herein which are apparent to those of skill in the art will fall within the scope of the disclosed subject matter.

What is claimed is:

1. A hot end for building three-dimensional objects from layered consumable material, the hot end comprising:
   an extruder comprising an extrusion channel configured to direct consumable material through the extruder;

a heating element in thermal communication with the extruder, the heating element configured to heat the consumable material passing through the extruder;

an isolator comprising an isolator channel configured to direct the consumable material toward the extruder, the isolator being less thermally conductive relative to the extruder, wherein the isolator is sized to accept a filament tube within the isolator channel through at least a part of a length of the isolator channel along an extrusion direction of the consumable material through the hot end, the filament tube configured to direct the consumable material into the isolator; and a lining positioned within the isolator channel downstream of the filament tube along the extrusion direction, the internal tube configured to direct the consumable material along the isolator channel toward the extruder, wherein the lining has a higher melting or glass transition temperature relative to the filament tube, wherein when layering the consumable material to build a three-dimensional object, the heating element generates heat that is conducted through the extruder to the consumable material passing through the extrusion channel while the isolator mitigates heat transfer to the consumable material passing through the isolator channel.

2. The hot end of claim 1, wherein a material of the isolator is capable of being heated above 300 degrees Celsius without deforming the isolator, the material of the isolator comprising a thermoplastic.

3. An extrusion assembly for a three-dimensional printer configured to build three-dimensional objects from layered consumable material, the extrusion assembly comprising:

an extrusion housing configured to connect to a support configured to move the extrusion housing; and a hot end assembly configured to connect to the extrusion housing, the hot end assembly comprising:

an extruder comprising an extrusion channel configured to extrude consumable material through the extruder;

a heating element in thermal communication with the extruder, the heating element configured to heat the consumable material passing through the extruder;

an isolator comprising an isolator channel configured to direct the consumable material toward the extruder, the isolator being less thermally conductive relative to the extruder, wherein the isolator is sized to accept a filament tube within the isolator channel through at least a part of a length of the isolator channel along an extrusion direction of the consumable material through the hot end assembly, the filament tube configured to direct the consumable material into the isolator; and a lining positioned within the isolator channel downstream of the filament tube along the extrusion direction, the lining configured to direct the consumable material along the isolator channel toward the extruder, wherein the lining has a higher melting or glass transition temperature relative to the filament tube, wherein when layering the consumable material to build a three-dimensional object while the hot end assembly is moved via the support moving the extrusion housing connected to the hot end assembly, the heating element generates heat that is conducted through the extruder to the consumable material passing through the extrusion channel while the isolator mitigates heat transfer to the consumable material passing through the isolator channel.

4. The extrusion assembly claim 3, further comprising a heat exchanger disposed about the filament tube and in thermal communication with the filament tube, the heat exchanger configured to transfer heat away from the filament tube.

5. The extrusion assembly of claim 4, wherein the extrusion housing comprises a flow control device and a flow conduit configured to direct a cooling fluid to the heat exchanger for the heat exchanger to transfer heat from the filament tube to the cooling fluid when the hot end assembly is connected to the extrusion housing.

6. The extrusion assembly of claim 5, wherein the flow control device comprises a fan, and the cooling fluid comprises air, wherein the fan directs the air through the flow conduit over the heat exchanger to cool the filament tube via forced convection.

7. The extrusion assembly of claim 5, wherein the flow conduit branches to direct the cooling fluid to cool the three-dimensional object while the three-dimensional object is being built.

8. The extrusion assembly of claim 4, further comprising a thermal isolating layer positioned about the isolator and extending outwardly from the isolator, the thermal isolating layer configured to inhibit heat transfer to the heat exchanger.

9. The extrusion assembly of claim 8, further comprising a heat transfer layer positioned about the isolator and extending outwardly from the isolator, the heat transfer layer positioned upstream of the thermal isolating layer along the extrusion direction and in thermal communication with the thermal isolating layer, the heat transfer layer configured to transfer heat from the thermal isolating layer toward the heat exchanger.

10. The extrusion assembly of claim 9, wherein the isolator comprises a support flange extending radially outward from the isolator, the support flange engaging the heat transfer layer to secure the heat transfer layer in a predetermined position along the extrusion direction.

11. The extrusion assembly of claim 4, further comprising a thermal isolating layer positioned about the filament tube and extending outwardly from filament tube, the thermal isolating layer configured to inhibit heat transfer from the heat exchanger to the extrusion housing.

12. The extrusion assembly of claim 3, further comprising an other hot end assembly configured to connect to the extrusion housing, the other hot end assembly comprising:

an other extruder comprising an other extrusion channel configured to extrude the consumable material through the other extruder; and an other isolator comprising an other isolator channel configured to direct the consumable material through the other isolator toward the other extruder.

13. The extrusion assembly of claim 12, wherein the extrusion housing comprises a leveling mechanism configured to level the hot end assembly with the other hot end assembly in an y-z plane of the extrusion assembly, the y-z plane substantially parallel to an extrusion direction of the consumable material through the hot end assembly and the other hot end assembly, with an z-axis of the y-z plane parallel to the extrusion direction.

14. The extrusion assembly of claim 13, wherein the extrusion housing comprises a clamp configured to removably engage the support for the support to move the extrusion housing in an x-y plane that is substantially perpendicular to the extrusion direction.

15. The extrusion assembly of claim 14, wherein the clamp comprises a leveling wall disposed at an angle relative to the support when the clamp is engaged with the support, wherein movement of the leveling wall along a y-axis of the y-z plane relative to the support tilts the extrusion housing in the y-z plane to level the hot end assembly with the other hot end assembly when the extrusion housing is connected to the hot end assembly and the other hot end assembly.

16. The extrusion assembly of claim 15, wherein the support comprises a rod and a bearing, the rod extending along the y-axis beyond a perimeter of the clamp in the y-z plane, the bearing positioned within the perimeter of the clamp when the clamp is engaged with the support, wherein the hot end assembly and the other hot end assembly are connected to the extrusion housing with the extruder and the other extruder aligned along the y-axis, and wherein moving the leveling wall in the y-axis relative to the bearing changes a contact point on the leveling wall with the bearing to level the hot end assembly and the other hot end assembly in the y-z plane when the clamp is engaged with the support.

17. A hot end for building three-dimensional objects from layered consumable material, the hot end comprising:
  an extruder comprising an extrusion channel configured to direct consumable material through the extruder;
  a heating element in thermal communication with the extruder, the heating element configured to heat the consumable material passing through the extruder;
  an isolator comprising an isolator channel configured to direct the consumable material toward the extruder, the isolator being less thermally conductive relative to the extruder, wherein the isolator is sized to accept a filament tube within the isolator channel through at least a part of a length of the isolator channel along an extrusion direction of the consumable material passing through the hot end, the filament tube configured to direct the consumable material into the isolator; and
  a lining positioned within the isolator channel following a perimeter of the isolator channel, the lining configured to direct the consumable material along the isolator channel toward the extruder, wherein the lining has a higher melting or glass transition temperature relative to the filament tube,
  wherein when layering the consumable material to build a three-dimensional object, the heating element generates heat that is conducted through the extruder to the consumable material passing through the extrusion channel while the isolator mitigates heat transfer to the consumable material passing through the isolator channel.

18. The hot end of claim 17, wherein the extrusion channel tapers to have a diameter that decreases along an extrusion direction of the consumable material through the hot end to promote flow of the consumable material.

* * * * *